(12) United States Patent
Pahlman et al.

(10) Patent No.: US 6,610,263 B2
(45) Date of Patent: Aug. 26, 2003

(54) SYSTEM AND PROCESS FOR REMOVAL OF POLLUTANTS FROM A GAS STREAM

(75) Inventors: John E. Pahlman, deceased, late of Bloomington, MN (US), by Kathleen S. Pahlman, administrator; Steve C. Carlton, Emily, MN (US); Ray V. Huff, Florence, AL (US); Charles F. Hammel, Escondido, CA (US); Richard M. Boren, Bakersfield, CA (US); Kevin P. Kronbeck, Baxter, MN (US); Joshua E. Larson, Burnsville, MN (US); Patrick A. Tuzinski, Bloomington, MN (US); Steve G. Axen, Golden, CO (US)

(73) Assignee: EnviroScrub Technologies Corporation, Minneapolis, MN (US)

( * ) Notice: Subject to any disclaimer, the term of this patent is extended or adjusted under 35 U.S.C. 154(b) by 0 days.

(21) Appl. No.: 09/919,600

(22) Filed: Jul. 31, 2001

(65) Prior Publication Data

US 2002/0168302 A1 Nov. 14, 2002

Related U.S. Application Data

(60) Provisional application No. 60/222,236, filed on Aug. 1, 2000, provisional application No. 60/232,049, filed on Sep. 12, 2000, provisional application No. 60/232,097, filed on Sep. 12, 2000, provisional application No. 60/238,105, filed on Oct. 4, 2000, provisional application No. 60/239,422, filed on Oct. 10, 2000, provisional application No. 60/239,435, filed on Oct. 10, 2000, provisional application No. 60/242,830, filed on Oct. 23, 2000, provisional application No. 60/243,090, filed on Oct. 24, 2000, provisional application No. 60/244,948, filed on Nov. 1, 2000, provisional application No. 60/288,166, filed on May 2, 2001, provisional application No. 60/288,165, filed on May 2, 2001, provisional application No. 60/288,237, filed on May 2, 2001, provisional application No. 60/288,245, filed on May 2, 2001, provisional application No. 60/288,243, filed on May 2, 2001, provisional application No. 60/288,242, filed on May 2, 2001, provisional application No. 60/288,168, filed on May 2, 2001, provisional application No. 60/288,167, filed on May 2, 2001, provisional application No. 60/295,930, filed on Jun. 5, 2001, provisional application No. 60/296,006, filed on Jun. 5, 2001, provisional application No. 60/296,005, filed on Jun. 5, 2001, provisional application No. 60/296,004, filed on Jun. 5, 2001, provisional application No. 60/296,007, filed on Jun. 5, 2001, provisional application No. 60/296,003, filed on Jun. 5, 2001, provisional application No. 60/299,362, filed on Jun. 19, 2001, and provisional application No. 60/299,363, filed on Jun. 19, 2001.

(51) Int. Cl.[7] .............................................. B01D 53/60
(52) U.S. Cl. ........................... 423/239.1; 423/244.06; 423/393; 423/395; 423/400; 423/522; 423/544; 423/548; 423/DIG. 5
(58) Field of Search ..................... 95/22, 23; 96/113, 96/114; 423/210, 215.5, 244.06, 239.1, DIG. 5, 230, 393, 522, 541.1, 548, 544, 395, 400

(56) References Cited

U.S. PATENT DOCUMENTS

| | | | |
|---|---|---|---|
| 1,178,927 A | 11/1916 | Kaplan | |
| 1,275,666 A | 8/1918 | Ellis et al. | |
| 1,293,461 A | 2/1919 | Kaplan | |
| 1,851,312 A | 3/1932 | Huff | |
| 2,123,250 A | 7/1938 | Muller et al. | 23/145 |
| 2,486,530 A | 11/1949 | Jenness | 252/186 |
| 2,608,466 A | 8/1952 | Fox | 23/145 |
| 2,956,860 A | 10/1960 | Welsh | 23/145 |
| 2,984,545 A | 5/1961 | Tarbutton et al. | 23/178 |
| 3,011,867 A | 5/1961 | Welsh | 23/61 |
| 3,150,923 A | 9/1964 | Bienstock et al. | |
| 3,226,192 A | 12/1965 | Atsukawa et al. | 23/167 |
| 3,251,649 A | 5/1966 | Atsukawa et al. | 23/167 |
| 3,330,096 A | 7/1967 | Zimmerley | 55/73 |
| 3,427,128 A | 2/1969 | Schmier | 23/145 |
| 3,723,598 A | 3/1973 | Spedden | 423/244 |
| 3,780,158 A | 12/1973 | Welsh | 423/49 |
| 3,798,310 A | 3/1974 | Atsukawa et al. | 423/244 |
| 3,898,320 A | 8/1975 | Atsukawa et al. | 423/605 |
| 3,933,128 A | 1/1976 | Cramer | 122/4 R |
| 3,951,765 A | 4/1976 | Everett | 204/96 |
| 3,956,189 A | 5/1976 | Warshaw et al. | 252/466 J |
| 3,957,949 A | 5/1976 | Senjo et al. | 423/235 |
| 3,981,971 A | 9/1976 | Saito et al. | 423/239 |
| 4,006,217 A | 2/1977 | Faber et al. | 423/605 |

| Patent No. | Date | Inventor | Class |
|---|---|---|---|
| 4,008,169 A | 2/1977 | McGauley | 252/191 |
| 4,011,298 A | 3/1977 | Fukui et al. | 423/235 |
| 4,012,487 A | 3/1977 | Merkl | 423/242 |
| 4,014,982 A | 3/1977 | Paull et al. | 423/528 |
| 4,017,586 A | 4/1977 | Reeves | 423/242 |
| 4,029,752 A | 6/1977 | Cahn | 423/563 |
| 4,033,113 A | 7/1977 | Cramer | 60/39.02 |
| 4,070,441 A | 1/1978 | Pessel | 423/242 |
| 4,081,509 A | 3/1978 | Hishinuma et al. | 423/235 |
| 4,087,372 A | 5/1978 | Saitoh et al. | 252/184 |
| 4,091,075 A | 5/1978 | Pessel | 423/242 |
| 4,102,982 A | 7/1978 | Weir, Jr. | 423/242 |
| 4,108,969 A | 8/1978 | Merkl | 423/560 |
| 4,112,053 A | 9/1978 | Sanada et al. | 423/239 |
| 4,123,499 A | 10/1978 | Welsh et al. | 423/35 |
| 4,123,507 A | 10/1978 | Hass | 423/573 G |
| 4,153,429 A | 5/1979 | Matthews et al. | 55/68 |
| 4,162,207 A | 7/1979 | Boyer et al. | 204/157.1 R |
| 4,164,545 A | 8/1979 | Scott | 423/239 |
| 4,233,188 A | 11/1980 | Gandhi et al. | 252/470 |
| 4,250,149 A | 2/1981 | Welsh | 423/50 |
| 4,276,268 A | 6/1981 | Welsh et al. | 423/49 |
| 4,277,255 A * | 7/1981 | Apelgren | 55/20 |
| 4,277,360 A | 7/1981 | Mellors et al. | 252/182.1 |
| 4,309,386 A | 1/1982 | Pirsh | 422/177 |
| 4,309,392 A | 1/1982 | Shaw et al. | 423/239 |
| 4,310,494 A | 1/1982 | Welsh | 423/49 |
| 4,369,108 A | 1/1983 | Bertolacini et al. | 208/120 |
| 4,369,130 A | 1/1983 | Bertolacini et al. | 252/455 Z |
| 4,369,167 A | 1/1983 | Weir, Jr. | 423/210 |
| 4,376,103 A | 3/1983 | Bertolacini et al. | 423/244 |
| 4,381,991 A | 5/1983 | Bertolacini et al. | 208/113 |
| 4,400,362 A | 8/1983 | Lerner | 423/235 |
| 4,402,931 A | 9/1983 | Tanabe et al. | 423/605 |
| 4,411,878 A | 10/1983 | Welsh | 423/605 |
| 4,423,019 A | 12/1983 | Bertolacini et al. | 423/244 |
| 4,448,760 A | 5/1984 | Welsh et al. | 423/605 |
| 4,450,148 A | 5/1984 | Welsh | 423/605 |
| 4,476,104 A | 10/1984 | Mellors | 423/605 |
| 4,479,877 A | 10/1984 | Guter | 210/670 |
| 4,497,902 A | 2/1985 | Bertolacini et al. | 502/65 |
| 4,500,281 A | 2/1985 | Beardmore | 431/3 |
| 4,542,116 A | 9/1985 | Bertolacini et al. | 502/65 |
| 4,550,098 A | 10/1985 | Gens | 502/324 |
| 4,551,254 A | 11/1985 | Imada et al. | 210/688 |
| 4,552,734 A | 11/1985 | Iannicelli et al. | 423/230 |
| 4,552,735 A | 11/1985 | Iannicelli et al. | 423/224 |
| 4,581,210 A | 4/1986 | Teller | 423/242 |
| 4,581,219 A | 4/1986 | Imada et al. | 423/605 |
| 4,713,225 A | 12/1987 | Iannicelli | 423/230 |
| 4,719,791 A * | 1/1988 | Greiner et al. | 73/38 |
| 4,755,499 A | 7/1988 | Neal et al. | 502/415 |
| 4,798,711 A | 1/1989 | Neal et al. | 423/239 |
| 4,836,993 A | 6/1989 | Bertolacini et al. | 423/244 |
| 4,843,980 A | 7/1989 | Markham et al. | 110/342 |
| 4,871,522 A | 10/1989 | Doyle | 423/239 |
| 4,872,989 A | 10/1989 | Pirotta | 210/638 |
| 4,883,647 A | 11/1989 | Kainer et al. | 423/239 |
| 4,908,194 A | 3/1990 | Hooper | 423/235 |
| 4,915,922 A | 4/1990 | Filss | 423/239 |
| 4,921,689 A | 5/1990 | Walker et al. | 423/605 |
| 4,923,688 A | 5/1990 | Iannicelli | 423/224 |
| 4,925,633 A | 5/1990 | Doyle | 422/171 |
| 4,940,569 A | 7/1990 | Neal et al. | 423/239 |
| 4,944,878 A | 7/1990 | Lockridge et al. | 210/683 |
| 4,954,324 A | 9/1990 | Hooper | 423/239 |
| 5,000,930 A | 3/1991 | Boguslawski | 423/239 |
| 5,009,872 A | 4/1991 | Chuang et al. | 423/245.3 |
| 5,023,063 A | 6/1991 | Stiles | 423/239 |
| 5,059,406 A | 10/1991 | Sheth et al. | 423/244 |
| 5,112,796 A | 5/1992 | Iannicelli | 502/402 |
| 5,176,888 A | 1/1993 | Stiles | 423/239 |
| 5,192,515 A | 3/1993 | Gardner-Chavis et al. | 423/213.2 |
| 5,199,263 A | 4/1993 | Green et al. | 60/670 |
| 5,200,160 A | 4/1993 | Benson et al. | 423/235 |
| 5,246,554 A | 9/1993 | Cha | 204/157.3 |
| 5,277,890 A | 1/1994 | Wang et al. | 423/605 |
| 5,348,726 A | 9/1994 | Wang et al. | 423/605 |
| 5,366,710 A | 11/1994 | Chou et al. | 423/235 |
| 5,384,301 A | 1/1995 | Flytzani-Stephanopoulos et al. | 502/304 |
| 5,391,218 A * | 2/1995 | Jorgenson et al. | 95/20 |
| 5,391,365 A | 2/1995 | Wang et al. | 423/605 |
| 5,439,658 A | 8/1995 | Johnson et al. | 423/243.07 |
| 5,456,892 A | 10/1995 | Yang et al. | 423/239.1 |
| 5,505,766 A | 4/1996 | Chang | 95/134 |
| 5,607,496 A | 3/1997 | Brooks | 75/670 |
| 5,658,544 A | 8/1997 | Goodes et al. | 423/230 |
| 5,672,323 A | 9/1997 | Bhat et al. | 422/172 |
| 5,700,439 A | 12/1997 | Goyette et al. | 423/230 |
| 5,711,785 A * | 1/1998 | Maxwell | 95/15 |
| 5,780,000 A | 7/1998 | Strickland | 423/220 |
| 5,798,088 A | 8/1998 | Dorchak et al. | 423/567.1 |
| 5,853,684 A | 12/1998 | Fang et al. | 423/244.1 |
| 5,888,926 A | 3/1999 | Biswas et al. | 502/406 |
| 6,010,666 A | 1/2000 | Kurokawa et al. | 422/122 |
| 6,039,783 A | 3/2000 | Lueck et al. | 71/59 |
| 6,066,590 A | 5/2000 | Horii et al. | 502/324 |
| 6,132,692 A | 10/2000 | Alix et al. | 423/210 |
| 6,162,530 A | 12/2000 | Xiao et al. | 428/292.1 |
| 6,214,304 B1 | 4/2001 | Rosenthal et al. | 423/210 |

FOREIGN PATENT DOCUMENTS

| | | | |
|---|---|---|---|
| DE | 33 12 890 A1 | 10/1984 | B01D/53/34 |
| DE | 3731889 | 4/1989 | |
| DE | 40 12 982 A1 | 10/1991 | |
| DE | 197 15 244 A1 | 10/1998 | |
| EP | 0 428 389 A2 | 5/1991 | |
| EP | 0 476 300 A1 | 3/1992 | |
| JP | 08266859 | 10/1996 | |
| WO | WO86/02918 | 5/1986 | C01B/17/00 |

OTHER PUBLICATIONS

De Bruijn, et al, "Thermal Decomposition of Aqueous Manganese Nitrate Solutions", Thermal Analysis, ICTA, Berkhaeuser, Verlag, Basel, Boston, Stuttgart, 1980: 393–398.

Elvers, Barbara, "Manganese," Ullmans Encyclopedia of Industrial Chemistry, Basel, Switzerland? Ed. ISBN 3–527–201116–5; 1990; vol. A 16; pp. 123–141.

Il'chenko, Kucha, Chernomordik, Andreeva, Ivabova, "Path and Products of Thermal Decomposition of Mn(NO3)2 in Aqueous Nitric Acid Solutions," Plenum Publishing Corp., 1985, Northwest Correspondence Polytechnic Institute, Zhurnal Prikladnoi Khimii, vol. 58, May 21, 1984: pp. 984–989.

Karlsson and Rosenberg, "Flue Gas Denitrification. Selective Catalytic Oxidation of NO and NO2 Am. Chem. Soc.", published in Ind. Chem. Process Des. Dev., 1984: No. 23, pp. 808–814.

Stiles, et. al., "Selective Catalytic Reduction of NOx in the Presence of Oxygen," Ind. Chem. Res.., 1994: 33, pp. 2259–2264.

Uno, et. al., "A New Dry Process of SO2 Removal From Flue Gas Proceedings," 7th world petroleum congress, vol. 9, pp. 289–295, Elsivier publishing Co, 1967.

Vadjic, et. al., "The Effect of MnO2 and Some Mn Salts on the Behaviour of SO2 in the Air," The Science of the Total Environment, 44 (Feb. 18, 1985) 245–251, Elsevier Publishers.

Kanungo, Parida and Sant, "Studies on MnO2—II: Relationship Between Physico . . . Activity . . . Synthetic Mn" Electrochemiica Acta, 26 (8), pp. 1147–1156, 1981?.

Lawn, et. al., "The Effects of High–Energy Milling on the Catalytic Behaviour of MnO2," Power Technology 20 (1987) 207–210, Elsevier Sequoia, S.A.

Strobel and Charenton, "Influence of Foreign Cations on the Synthesis of Various Non–stoichiometric Forms of MnO2," Revue de Chimie Minerale, t. 23, (1986), pp. 125–137.

Parida, Kanungo and Sant, "Studies on MnO2—I: Chemical Composition, Microstructure, and Other Cjaracteristics of Some Synthetic MnO2 of Various Crystalline Modifications," Electrochemiica Acta, vol. 26, pp. 435–443, Pergamon Press Ltd., 1981 Jan. 2, 1980.

Pattanayak and Sitakara Rao, "Preparation and Thermal Stability of Manganese Oxides Obtained by Precipitation from Aqueous Manganese Sulphate Solution," Thermochimica Acta, 153, (1989) pp. 193–204, Elsivier Science Publishers B.V., Amsterdam.

R.M. McKenzie, "The synthesis of birnessite, cryptomelane, and some other oxides and hydroxides of manganese," Mineralogical Magazine, Dec. 1971, vol. 38, pp. 493–502.

Li, Rothfus, and Adey, "Effect of Macroscopic Properties of Manganese Oxides on Absorption of Sulfur Dioxide," Environment Science and Technology, vol. 2, No. 8, 1968, pp. 619–621.

Kolta, Azim, and Girgis, "Application of B.E.T. Method to Differentiating Manganese Dioxide Modifications," J. Appl. Chem. Biotechnol, 1971, vol. 21, Jun., pp. 154–158.

Tarbutton, Jones, Gray and Smith, "Recovery of Sulfur Dioxide from Flue Gases," Industrial and Engineering Chemistry, vol. 49, No. 3, Mar. 1957, pp. 392–395.

Nohman, Duprez, Kappenstein, Mansour, and Zaki, "Preparation of Manganese Oxide Catalysts Using Novel NH4MnO4 and Manganese Hydroxide Precursors." Comparison of Unsupported and Alumina–Supported Catalysts. Preparation of Catalysts V, 1991, Elsevier Publishers, 1991, pp. 617–626.

Kiang, Li, and Rothfus, "Kinetic Studies of Sulfur Dixiode Absorption by Manganese Dioxide," *Environmental Science and Technology* vol. 10, No. 9 (1976) pp. 886–893.

Sherwood, Pigford, and Wilke, "The Reactions of NOx With Water and Aqueous Solutions," Mass Transfer, McGraw Hill, 1975, pp. 346–361.

Hypolito, Valarelli, Giovanoli, Netto, "Gibbs Free Energy of Formation of Synthetic Cryptomelane," Chimia 38 (1984) No. 12 (Dec.), pp. 427–429.

Myrkova, Andriiko, and Kuz'minskii, "Oxidation of Mn(II) Ions in Nitrate Solutions_Kinetic Study," Ukrainskii Khimicheskii Zhurnal, vol. 60, No. 7–8, pp. 540–544, 1994.

Fernandes, Desai, and Dalal, "Studies on Chemically–Precipitated Mn(IV) Oxides–I," Electrochimia Acta, vol. 28, No. 3, pp. 309–315, 1983.

Kanungo and Sant, "Preparation and Properties of Manganese Dioxide for Dry Cells," J. Scient. Inc. Res., vol. 31, May 1972, pp. 264–272.

Kanungo, "Physicochemical Properties of MnO2 and MnO2–CuO and Their Relationship With the Catalytic Activity for H2O2 Decomposition and CO Oxidation," Journal of Catalysis, vol. 58, pp. 419–435, 1979.

Bricker, "Some Stability Relationships in the System Mn–O2–H2O and One Atmosphere Total Pressure," The American Mineralogist, vol. 50, Sep., 1965, pp. 1296–1354.

"Commercial Demonstration of the NOXSO SO2/NO2 Removal flue Gas Clean–up System," Quarterly Technical Progress Report No. 16 Contract No. DE–FC22–91PC90549 date—stamped Dec. 11, 1996.

Kalagnanam, J. & Rubin ES, "Development of Integrated Environmental Control Model," Quarterly Progress Report DE–AC22–92PC91346–12 Oct. 1995.

Boris E. Reyes and Timothy R. Catshaw, "SCONOX™ Catalytic Absorption System," Goal Line Environmental Technologies Dec. 8, 1998.

Wu, Shu–Chuan, et al., "Use of Deep Sea Manganese Nodules as Catalysts for Reduction of Nitric Oxide with Ammonia," Atmospheric Environment, Pergamon Press (1972), vol. 6, pp. 309–317.

Kinetics of Mn(II) Ion Oxidation in Nitrate Solutions; (to be translated—Russian) ISSN 0041–6045 Jul./Aug. 1994, T. 60, N 8, pp. 540–544?.

Kijlstra, et. Al., "Mechanism of the SCR of NO by NH3 Over MnOx / Al2O3—Part I; Adsorption and Desorption of Single Reaction Components," Journal of Catalysis, 171, pp. 208–218, Jun. 2, 1997, article No. CA971788.

Kijlstra, et. al., "Mechanism of the SCR of NO by NH3 Over MnOx/Al2O3—Part II; Reactivity of Adsorbed NH3 and NO Complexes," Journal of Catalysis, 171, pp. 219–230, Jun. 2, 1997, article No. CA971789.

Kapteijn, et. al., "Alumina–Supported Manganese Oxide Catalysts—Part I: Characterization: Effect Precursor and Loading," Journal of Catalysis, 150, pp. 94–104, Apr. 13, 1994.

Kapteijn, et. al., "Alumina–Supported Manganese Oxide Catalysts—Part II: Surface Characterization and Adsorption of Ammonia and Nitric Oxide," Journal of Catalysis, 150, (May 12, 1994), pp. 105–116.

Singoredjo, Kapteijn, et. al., "Alumina–Supported Mn Oxides for the Low–Temp. SCR of NO with Ammonia Applied Catalysis B," Environmental, 1 (Aug. 5, 1992) 297–316.

Vadjic, et. al., "The Effect of MnO2 and Some Mn Salts on the Behaviour of SO2 in the Air," The Science of the Total Environment, 44 (Feb. 18, 1985) 245–251, Elsevier Publishers.

Pourbaix, Moussard, Brenet, Van Muylder, "Manganese Atlas of Electrochemical Equilibria in Aqueous Solutions," pp. 286–293, National Association of Corrosion Engineers, Houston, TX., USA.

Picquet and Davis, "A New Generation of CMD Tailored for Specific Applications Proceedings," The Electrochemical Society, v. 85–4, p. 247–261 (1985).

Mourad, et. al., "Preparation and Characterization of Doped Manganese Dioxides," Journal of Applied Electrochemistry 10 (1980?) pp. 309–313 May 11, 1979.

Yamashita, Takemura, Konishi, and Kozawa, "BET Surface Area Measurements for I.C. and IBA MnO2," Samples Progress in Batteries and Solar Cells, vol. 7, (1988), IBA Hawaii Meeting Paper, pp. 66–72.

Xiao, P.R. Strutt, M. Benaissa, H. Chen, and B.H. Kear, "Synthesis of High Ative–Site Density Nanofiberous MnO2–Base Materials . . . " Inframat Corp., North Haven, CT., Nanostructural Material (1998), 10 (6), pp. 1051–1061, Coden: NMAEE7; ISSN:0965–9773 T.D.

Akiya Kozawa, "A New Hypothesis to Explain Unusual Gas Adsorption Behaviour by MnO2," Progress in Batteries and Solar Cells, vol. 7, (1988), IBA Hawaii Meeting Paper, pp. 59–64.

Fernandes, Desai and Dalal, "Studies on Chemically–Precipitated Mn(IV) Oxides IV: Effect of Dopants / Impurities on the Discharge Behaviour of CMD in Alkaline Medium and the Applicability of the Atlung–Jacobson model to the (MnO2)1–r(MnOOH)r System," Journal of Applied Electrochemistry, 15, (1985), pp. 351–363.

Williams, Morosin and Graham, "Influence of Shock Compression on the Specific Surface Area of Inorganic Powders," Chemical and Nuclear Engineering, Univ. of New Mexico, Albuquerque, NM, pp. 1013–1022 (No date).

Pourbaix, Moussard, Brenet, Van Muylder, "Nitrogen—Atlas of Electrochemical Equilibria in Aqueous Solutions," Atlas of Electrochemical Equilibria in Aqueous Solutions, pp. 493–503, National Association of Corrosion Engineers, Houston, TX, USA (No date).

Pourbaix, Moussard, Brenet, Van Muylder, "Sulphur—Atlas of Electrochemical Equilibria in Aqueous Solutions," Atlas of Electrochemical Equilibria in Aqueous Solutions, pp. 545–553, National Association of Corrosion Engineers, Houston, TX, USA.

Clapper, TW, "Manganese," Encyclopedia of Chemical Processing and Design, 1988, pp. 102–107.

Kapteijn, Singoredjo, and Andreini, "Activity and Selectivity of Pure Mn Oxides in the SCR of NO with NH4," Applied Catalysis B: Environmental, 3 (1994) 173–189, Elsevier Science Publishers.

Ambrose, Covington and Thirsk, "Electrode Potentials and related Properties of Some Potassium–Containing alpha Manganese Dioxides," Power Sources, 1970, 2, pp. 303–318.

Shen, Zerger, DeGuzman, Suib, McCurdy, Potter, and O'Young, "Manganese Oxide Octahedral Molecular Sieves: Preparation, Characterization, and Applications," Science, vol. 260, Apr. 1993, pp. 511–515.

Bystrom and Bystrom, "The Crystal Structure of Hollandite, the Related Manganese Oxide Minerals, and alpha–MnO2," Acta. Cryst., (1950), vol. 3, pp. 146–154.

Wadsley, A.D., "A Hydrous Manganese Oxied with Exchange Properties," J. Am. Chem. Soc., 1950, vol. 72, pp. 1781–1784.

Xiao, Bokhimi, Benaissa, Perez, Strutt, Yacaman, "Microstructural Characteristics of Chemically Processed Manganese Oxied Nanofibers," Acta Mater., vol. 45, NO. 4, pp. 1685–1693, 1997.

Giovanoli, "A Review on Structural Data of Electrochemical and Chemical MnO2 (EMD and CMD)," Manganese Dioxide Symposium, vol. 2, Tokyo, 1980, pp. 113–133.

Mantell, C.L., "Persulfates," Industrial Electrochemistry, Chemical Engineering Series, 3rd edition, 1950, McGraw–Hill, pp. 110–112.

Post, Jeffery E., "Manganese oxide minerals: Crystal structures and economic and environmental significance," Proc. Nat'l. Acad. Sci. USA, vol. 96, pp. 3447–3454, Mar. 1999 colloquium paper.

Powerspan Corp., Powerspan System Overview: ECO™ Technology (Electro–Catalytic Oxidation) www.powerspan-corp.com/news/release–11.shtml downloaded Jan. 11, 2002.

Kaptijn, F., et al., "Activity and Selectivity of Pure Manganese Oxides in the Selective Catalytic reduction of nitric oxide with ammonia," Applied Catalysis B: Environmental, 3 (1994) 173–189, Elsevier Science, B.V., Amsterdam.

S. Lompart, L.T. Yu, J.C. Mas, A. Mendibourne and R. Vignaud, "Oxygen–Regeneration of Discharged Manganese Dioxide Electrode Part I: General Phenomena Observed on Thick Powder Electrodes," Journal of the Electrochemical Society, Electrochemical Science and Technology, Feb., 1990, vol. 137,pp. 371–376.

Yoshio, Murkami, Kurimoto, Noguchi and Kozawa, "Synthesis of EMD for Primary and Secondary Lithium Batteries," Denki Kagaku, 61, No. 12 (1993), p.1449.

P.C. Picquet and Jay Y. Welsh, "A Broader Application of Chemical Manganese Dioxide in the Battery Industry," New Materials and New Processes, vol. 2 (1983), pp. 12–18.

J. Brenet, P.C. Piquet, and J.Y. Welsh, "An Interpretation of the Specific Reactivity of MnO2 Having a Gamma or Gamma–Rho Crystal Structure," The Electrochemical Society, Inc., Manganese Dioxide Symposium, vol. 2 Tokyo, 1980, pp. 214–243.

Burns and Burns, "Structural Relationships Between the Manganese (IV) Oxides," Manganese Dioxide Symposium, vol. 1, Cleveland, 1975, paper 16, pp. 306–327.

Malati, "The Solid State Properties of Manganese Dioxides," Chemistry and Industry, vol. 24, Apr., 1971, pp. 446–451.

* cited by examiner

*Primary Examiner*—Stanley S. Silverman
*Assistant Examiner*—Timothy C. Vanoy
(74) *Attorney, Agent, or Firm*—Fredrikson & Byron, P.A.

(57) ABSTRACT

System for removal of targeted pollutants, such as oxides of sulfur, oxides of nitrogen, mercury compounds and ash, from combustion and other industrial process gases and processes utilizing the system. Oxides of manganese are utilized as the primary sorbent in the system for removal or capture of pollutants. The oxides of manganese are introduced from feeders into reaction zones of the system where they are contacted with a gas from which pollutants are to be removed. With respect to pollutant removal, the sorbent may interact with a pollutant as a catalyst, reactant, adsorbent or absorbent. Removal may occur in single-stage, dual-stage, or multi-stage systems with a variety of different configurations and reaction zones, e.g., bag house, cyclones, fluidized beds, and the like. Process parameters, particularly system differential pressure, are controlled by electronic controls to maintain minimal system differential pressure, and to monitor and adjust pollutant removal efficiencies. Reacted sorbent may be removed from the reaction action zones for recycling or recycled or regenerated with useful and marketable by-products being recovered during regeneration.

18 Claims, 26 Drawing Sheets

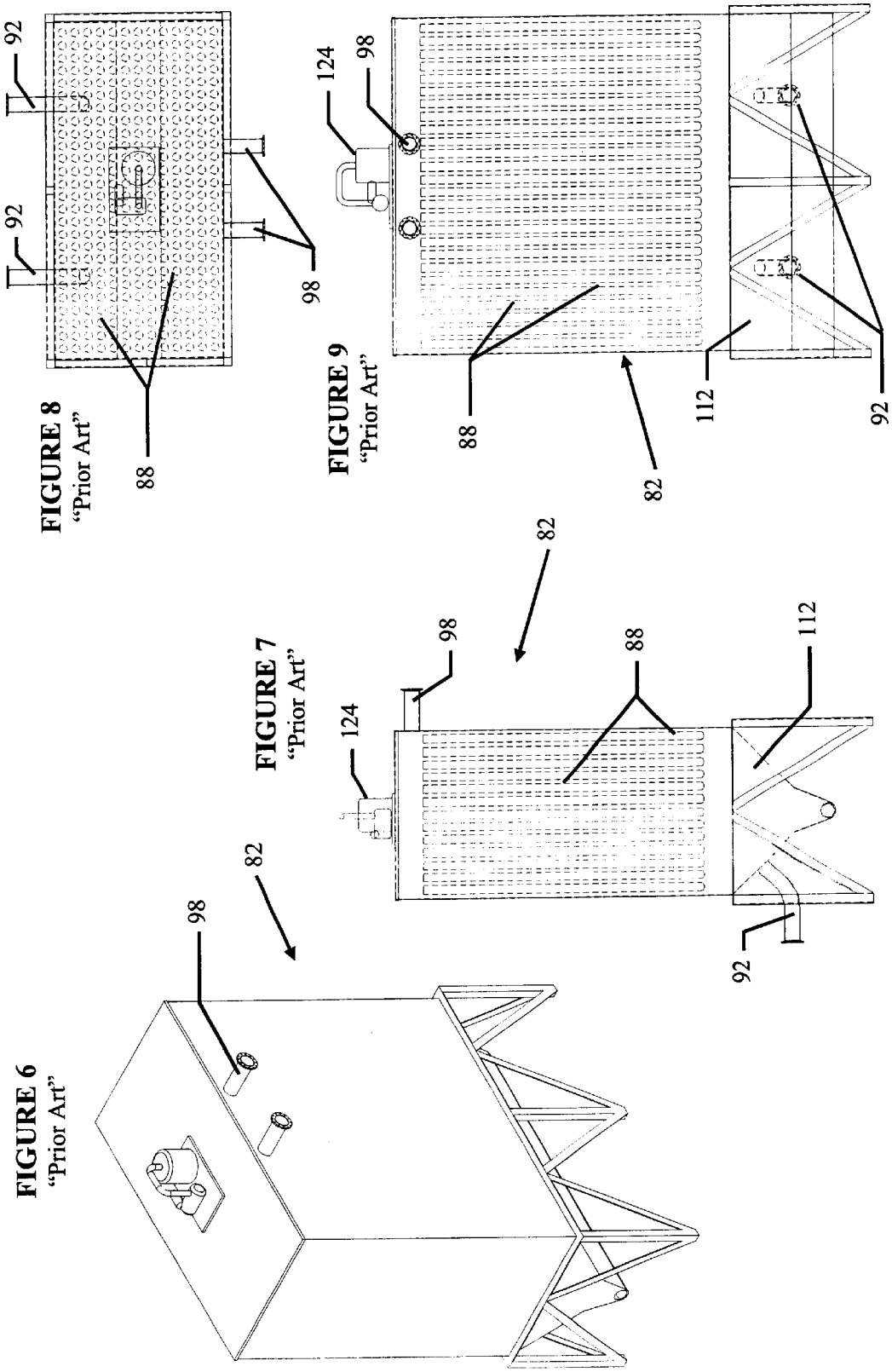

SOFTWARE CONTROL LOOP FOR SIMULTANEOUS $NO_x$, $SO_x$, $\Delta P$ CONTROL, AND VARIABLE VENTURI POSITION CONTROL

FIGURE 26 – CURRENT REGENERATION WET PROCESS

FIGURE 27 – CURRENT REGENERATION DRY PROCESS

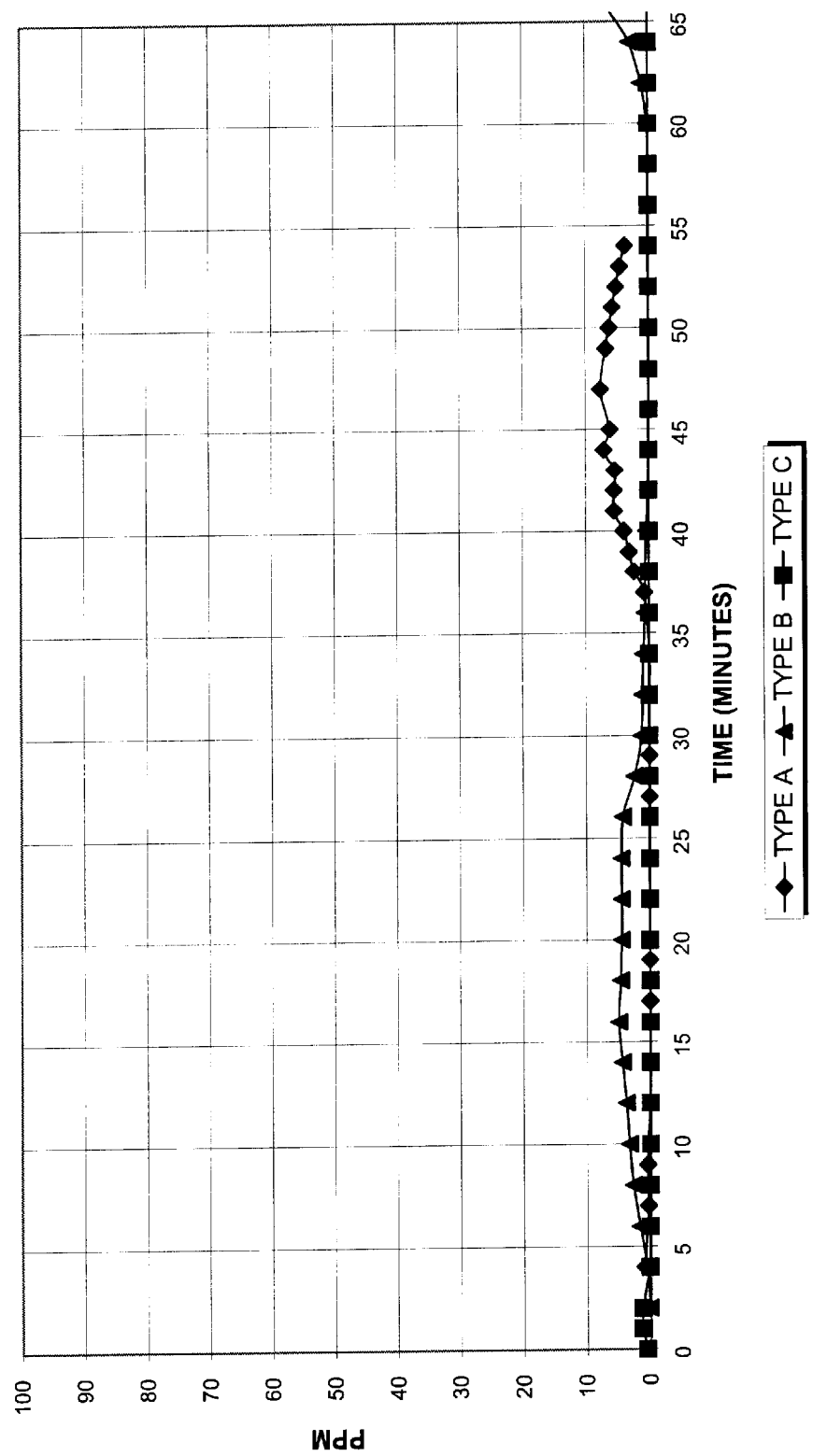

SYSTEM AND PROCESS FOR REMOVAL OF POLLUTANTS FROM A GAS STREAM

RELATED APPLICATIONS

This application claims priority to the following U.S. Provisional Application No. 60/222,236, filed Aug. 1, 2000; Nos. 60/232,049; 60/232,097, both filed Sep. 12, 2000; No. 60/238,105, filed Oct. 4, 2000; Nos. 60/239,422; 60/239,435, both filed Oct. 10, 2000; No. 60/242,830, filed Oct. 23, 2000; No. 60/243,090, filed Oct. 24, 2000; No. 60/244,948, filed Nov. 1, 2000; Nos. 60/288,166; 60/288,165; 60/288,237; 60/288,245; 60/288,243; 60/288,242; 60/288,168; 60/288,167, all filed May 2, 2001; Nos. 60/295,930; 60/296,006; 60/296,005; 60/296,004; 60/296,007; 60/296,003; all filed Jun. 5, 2001; and Nos. 60/299,362; 60/299,363, both filed Jun. 19, 2001, all of which are incorporated herein by reference.

FIELD OF THE INVENTION

The invention relates to the systems and processes for removal of pollutants, such as oxides of sulfur, oxides of nitrogen, fly ash, mercury compounds, and elemental mercury from gases generated from the burning of fossil fuels and other process gases with electronic control of operational parameters such as, differential pressure across the system, gas temperature, and removal efficiency. The systems and processes of the invention employ oxides of manganese as the primary sorbent to effect removal of pollutants, such as oxides of sulfur and/or oxides of nitrogen, and may further employ other sorbent materials and chemical additives separately and in conjunction with oxides of manganese to effect the removal of other target pollutants, e.g., using alumina to remove mercury.

BACKGROUND OF THE INVENTION

During combustion of fuels that contain sulfur compounds, oxides of sulfur ($SO_X$), such as sulfur dioxide ($SO_2$), and sulfur trioxide ($SO_3$) are produced as a result of oxidation of the sulfur. Some fuels may contain nitrogen compounds that contribute to the formation of oxides of nitrogen ($NO_X$), which are primarily formed at high temperatures by the reaction of nitrogen and oxygen from the air used for the reaction with the fuel. These reaction compounds, $SO_X$ and $NO_X$, are reported to form acids that may contribute to "acid rain." Federal and state regulations dictate the amount of these and other pollutants, which may be emitted. The regulations are becoming more stringent and plant operators are facing greater difficulties in meeting the regulatory requirements. Many technologies have been developed for reduction of $SO_X$ and $NO_X$, but few can remove both types of pollutants simultaneously in a dry process or reliably achieve cost effective levels of reduction.

In the past to meet the regulatory requirements, coal-burning power plants have often employed a scrubbing process, which commonly uses calcium compounds to react with $SO_X$ to form gypsum. This waste product is normally discarded as a voluminous liquid slurry in an impoundment and ultimately is capped with a clay barrier, which is then covered with topsoil once the slurry is de-watered over time. Alternatively, some power-plant operators have chosen to burn coal that contains much lower amounts of sulfur to reduce the quantities of $SO_X$ emitted to the atmosphere. In the case of $NO_X$, operators often choose to decrease the temperature at which the coal is burned. This in turn decreases the amount of $NO_X$ produced and therefore emitted; however, low temperature combustion does not utilize the full heating value of the coal, resulting in loss of efficiency.

Turbine plants normally use natural gas, which contains little or no sulfur compounds, to power the turbines, and therefore virtually no $SO_X$ is emitted. On the other hand at the temperature that the turbines are commonly operated, substantial $NO_X$ is produced. In addition to Selective Catalytic Reduction (SCR) processes for conversion of $NO_X$ to nitrogen, water vapor, and oxygen, which can be safely discharged, some operators choose to reduce the temperature at which the turbines are operated and thereby reduce the amount of $NO_X$ emitted. With lower temperatures the full combustion/heating value of natural gas is not realized, resulting in loss of efficiency. Unfortunately for these operators, newer environmental regulation will require even greater reduction of $SO_X$ and $NO_X$ emissions necessitating newer or more effective removal technologies and/or further reductions in efficiency.

Operators of older coal-burning power plants are often running out of space to dispose of solid wastes associated with use of scrubbers that use calcium compounds to form gypsum. Operators of newer plants would choose to eliminate the problem from the outset if the technology were available. Additionally, all power plants, new and old, are faced with upcoming technology requirements of further reducing emissions of $NO_X$ and will have to address this issue in the near future. Thus, plants that currently meet the requirements for $SO_X$ emissions are facing stricter requirements for reduction of $NO_X$ for which there has been little or no economically feasible technology available.

The nitrogen oxides, which are pollutants, are nitric oxide (NO) and nitrogen dioxide ($NO_2$) or its dimer ($N_2O_4$). The relatively inert nitric oxide is often only removed with great difficulty relative to $NO_2$. The lower oxide of nitrogen, nitrous oxide ($N_2O$), is not considered a pollutant at the levels usually found in ambient air, or as usually discharged from air emission sources. Nitric oxide (NO) does however; oxidize in the atmosphere to produce nitrogen dioxide ($NO_2$). The sulfur oxides considered being pollutants are sulfur dioxide ($SO_2$) and sulfur trioxide ($SO_3$).

Typical sources of nitrogen and sulfur oxide pollutants are power plant stack gases, automobile exhaust gases, heating-plant stack gases, and emissions from various industrial process, such as smelting operations and nitric and sulfuric acid plants. Power plant emissions represent an especially formidable source of nitrogen oxides and sulfur oxides, by virtue of the very large tonnage of these pollutants and such emissions discharged into the atmosphere annually. Moreover, because of the low concentration of the pollutants in such emissions, typically 500 ppm or less for nitrogen oxides and 3,000 ppm or less for sulfur dioxide, their removal is difficult because very large volumes of gas must be treated.

Of the few practical systems, which have hitherto been proposed for the removal of nitrogen oxides from power plant flue gases, all have certain disadvantages. Various methods have been proposed for the removal of sulfur dioxide from power plant flue gases, but they too have disadvantages. For example, wet scrubbing systems based on aqueous alkaline materials, such as solutions of sodium carbonate or sodium sulfite, or slurries of magnesia, lime or limestone, usually necessitate cooling the flue gas to about 55° C. in order to establish a water phase. At these temperatures, the treated gas requires reheating in order to develop enough buoyancy to obtain an adequate plume rise from the stack. U.S. Pat. No. 4,369,167 teaches removing pollutant gases and trace metals with a lime slurry. A wet scrubbing method using a limestone solution is described in U.S. Pat. No. 5,199,263.

Considerable work has also been done in an attempt to reduce $NO_X$ pollutants by the addition of combustion catalysts, usually organo-metallic compounds, to the fuel during combustion. However, the results of such attempts have been less successful than staged combustion. $NO_X$ oxidation to $N_2$ is facilitated by ammonia, methane, et al. which is not effected by $SO_X$ is described in U.S. Pat. No. 4,112,053. U.S. Pat. No. 4,500,281 teaches the limitations of organo-metallic catalysts for $NO_X$ removal versus staged combustion. Heavy metal sulfide with ammonia is described for reducing $NO_X$ in stack gases in U.S. Pat. No. 3,981,971.

Many fuels, and particularly those normally solid fuels such as coal, lignite, etc., also contain substantial amounts of bound or fuel sulfur with the result that conventional combustion produces substantial amounts of $SO_X$ pollutants which are also subject to pollution control. It has generally been the opinion of workers in the art that those conditions employed in staged combustion, particularly two-stage rich-lean combustion for $NO_X$ reduction, will likewise lower the level of $SO_X$ emissions. However, it has been found that little or no reduction in $SO_X$ emissions can be obtained in a two-stage, rich-lean combustion process. Indeed, it has been found that the presence of substantial amounts of sulfur in a fuel also has a detrimental effect on $NO_X$ reduction in a two-stage, rich-lean process.

Considerable effort has been expended to remove sulfur from normally solid fuels, such as coal, lignite, etc. Such processes include wet scrubbing of stack gases from coal-fired burners. However, such systems are capital intensive and the disposal of wet sulfite sludge, which is produced as a result of such scrubbing techniques, is also a problem. Cost inefficiencies result from the often-large differential pressures across a wet scrubber removal system; differential pressures in excess of 30 inches of water column (WC) are not unusual. Also, the flue gases must be reheated after scrubbing in order to send them up the stack, thus reducing the efficiency of the system. Both U.S. Pat. Nos. 4,102,982 and 5,366,710 describe the wet scrubbing of $SO_X$ and $NO_X$.

In accordance with other techniques, sulfur scavengers are utilized, usually in fluidized bed burners, to act as scavengers for the sulfur and convert the same to solid compounds which are removed with the ash. The usual scavengers in this type of operation include limestone (calcium carbonate) and dolomite (magnesium-calcium carbonate) because of availability and cost. However, the burning techniques are complex and expensive to operate and control; and the burner equipment is comparatively expensive. Dissolving coal or like material in a molten salt compound is described in U.S. Pat. No. 4,033,113. U.S. Pat. No. 4,843,980 teaches using alkali metal salt during the combustion of coal or other carbonaceous material with further efficiency by adding a metal oxide. A sulfur scavenger added upstream to a combustion zone is described in U.S. Pat. No. 4,500,281.

The combustion gas stream from a coal-burning power plant is also a major source of airborne acid gases, fly ash, mercury compounds, and elemental mercury in vapor form. Coal contains various sulfides, including mercury sulfide. Mercury sulfide reacts to form elemental mercury and $SO_X$ in the combustion boiler. At the same time other sulfides are oxidized to $SO_X$ and the nitrogen in the combustion air is oxidized to $NO_X$. Downstream of the boiler, in the ducts and stack of the combustion system, and then in the atmosphere, part of the elemental mercury is re-oxidized, primarily to mercuric chloride ($HgCl_2$). This occurs by reactions with chloride ions or the like normally present in combustion reaction gases flowing through the combustion system of a coal-burning power plant.

Many power plants emit daily amounts of up to a pound of mercury, as elemental mercury and mercury compounds. The concentration of mercury in the stream of combustion gas is about 4.7 parts per billion (ppb) or 0.0047 parts per million (ppm). Past efforts to remove mercury from the stream of combustion gas, before it leaves the stack of a power plant, include: (a) injection, into the combustion gas stream, of activated carbon particles or particulate sodium sulfide or activated alumina without sulfur; and (b) flowing the combustion gas stream through a bed of activated particles. When activated carbon particle injection is employed, the mercuric chloride in the gas stream is removed from the gas stream in a bag house and collected as part of a powder containing other pollutants in particulate form. Mercuric chloride and other particulate mercury compounds that may be in the gas stream can be more readily removed from the gas stream at a bag house than can elemental mercury. Activated carbon injection for mercury removal along with an activated particle bed is described in U.S. Pat. No. 5,672,323.

When the gas stream flows through a bed of activated carbon particles, mercury compounds are adsorbed on the surface of the activated carbon particles and remain there. Elemental mercury, usually present in vapor form in combustion gases, is not adsorbed on the activated carbon to any substantial extent without first being oxidized into a compound of mercury. U.S. Pat. No. 5,607,496 teaches the oxidation of mercury and subsequent absorption to particles and utilization of alumina are described therein.

Sodium sulfide particle injection can be utilized to form mercuric sulfide (HgS), which is more readily removable from the gas stream at a bag house than is elemental mercury. The conversion of mercury to a sulfide compound with subsequent capture in a dust separator is detailed in U.S. Pat. No. 6,214,304.

Essentially, all of the above techniques create solid waste disposal problems. The solids or particulates, including fly ash, collected at the bag house and the spent activated carbon removed from the bed of activated carbon, all contain mercury compounds and thus pose special problems with respect to burial at landfills where strictly localized containment of the mercury compounds is imperative. The concentration of mercury compounds in particulates or solids collected from a bag house is relatively minute; therefore, a very small quantity of mercury would be dispersed throughout relatively massive volumes of a landfill, wherever the bag house solids or particulates are dumped. Moreover, with respect to activated carbon, that material is relatively expensive, and once spent activated carbon particles are removed from an adsorbent bed, they cannot be easily regenerated and used again.

In the activated alumina process, mercury compounds in the gas stream can be adsorbed and retained on the surface of activated particles, but much of the elemental mercury will not be so affected. Thus elemental mercury in the combustion gas stream is oxidized to form mercury compounds (e.g. mercuric chloride), and catalysts are employed to promote the oxidation process. However, such processes do not capture $SO_X$ and $NO_X$.

The use of oxides of manganese to remove sulfur compounds from gas streams is known in the art. Oxides of manganese are known to form sulfates of manganese from $SO_X$ and nitrates of manganese from $NO_X$ when contacted with a gas containing these pollutants. U.S. Pat. No. 1,851,312 describes an early use of oxides of manganese to remove sulfur compounds from a combustible gas stream. U.S. Pat.

No. 3,150,923 describes a dry bed of oxides of manganese to remove $SO_X$. A wet method to remove $SO_X$ with oxides of manganese is described in U.S. Pat. No. 2,984,545. A special filter impregnated with manganese oxide to remove totally reduced sulfur compounds is described in U.S. Pat. No. 5,112,796. Another method in U.S. Pat. No. 4,164,545 describes using an ion exchange resin to trap the products of manganese oxide and $SO_X$ and $NO_X$. The use of certain types of oxides of manganese to remove $SO_X$ is disclosed U.S. Pat. Nos. 3,723,598 and 3,898,320. Some of the known methods of bringing oxides of manganese in contact with a gas stream, i.e., sprayed slurries, beds of manganese ore or special filters, have been cumbersome. Although the prior art teaches the use of oxides of manganese to remove $SO_X$ and/or $NO_X$, they do not teach an adaptable system or process that can capture $SO_X$ and/or $NO_X$ and other pollutants with oxides of manganese and monitor and adjust system operational parameters, such as differential pressure, to provide real-time system control.

Bag houses have traditionally been used as filters to remove particulates from high volume gas streams. U.S. Pat. No. 4,954,324 describes a bag house used as a collector of products generated through the use of ammonia and sodium bicarbonate to remove $SO_X$ and $NO_X$ from a gas stream. U.S. Pat. No. 4,925,633 describes a bag house as a site of reaction for $SO_X$ and $NO_X$ with the reagents, ammonia and alkali. U.S. Pat. No. 4,581,219 describes a bag house as a reactor for highly efficient removal of $SO_X$ only with a calcium-based reagent and alkaline metal salt. Although these prior art discloses and teach the use of bag houses for removal of particulates and as a reaction chamber, they do not teach the use of bag houses in an adaptable system capable of monitoring and adjusting system operational parameters, such as differential pressure, to capture $SO_X$ and/or $NO_X$ and other pollutants with oxides of manganese.

In view of the aforementioned problems of known processes for removal of $SO_X$, $NO_X$, mercury compounds, and elemental mercury as well as other pollutants from combustion gases, process gases, and other industrial waste gases, it would be desirable to provide a dry process for removal of $SO_X$ and $NO_X$ as well as other pollutants from a gas stream. It is further desirable to have a dry removal process that eliminates the environmental impacts of the disposal of large volumes of mercury containing solids and particulates and significant amounts of gypsum generated during $SO_X$ wet removal processes.

Wet removal processes can result in significant differential pressures across a removal system. Differential pressures above 30 inches of water column have been observed in wet removal processes. Such large differential pressures are costly because significant energy must be expended to counter the differential pressure and provide a waste gas stream with sufficient energy to flow up and out of a stack. A system and process that can accomplish pollutant removal with minimal or controlled differential pressure across the system therefore would be desirable and cost effective for most industry sectors processing or emitting significant amounts of combustion gases, process gases, and other industrial gases.

The calcium compounds utilized in $SO_X$ wet scrubbing methods form gypsum in the process. They are purchased and consumed in significant quantities and once gypsum is formed the calcium compounds cannot be recovered, at least not cost-effectively. Thus, it would be desirable to have a removal method employing a sorbent that not only can remove pollutants from a gas stream but that can be regenerated, recovered, and then recycled or reused for removal of additional pollutants from a gas stream.

To realize such a system and process, it would need to incorporate process controls and software that can monitor and adjust operational parameters from computer stations onsite or at remote locations through interface with a sophisticated electronics network incorporating an industrial processor. This would allow a technician to monitor and adjust operational parameters in real-time providing controls of such operational parameters as system differential pressure and pollutant capture rates or removal efficiencies. Such a network would be desirable for its real-time control and off-site accessibility.

In light of increased energy demand and recent energy shortages, it would be desirable to be able to return to operational utility idled power plants that have been decommissioned because their gypsum impoundments have reached capacity. This could be accomplished with retrofits of a system employing a regenerable sorbent in a dry removal process that does not require the use of calcium compounds. Such a system would also be readily adapted and incorporated into new power plants that may be coming on line. Utility plants and independent power plants currently in operation could readily be retrofitted with such a system. Further, such a system could be of significant value in enabling emissions sources to comply with emission standards or air quality permit conditions. With the reductions in emissions of pollutants such as $NO_X$ and $SO_X$, marketable emissions trading credits could be made available or non-attainment areas for state or national ambient air quality standards may be able to achieve attainment status. Such scenarios would allow for development in areas where regulatory requirements previously prohibited industrial development or expansion.

The systems and processes of the present invention in their various embodiments can achieve and realize the aforementioned advantages, objectives, and desirable benefits.

SUMMARY OF THE INVENTION

The invention is directed to an adaptable system for dry removal of $SO_X$ and/or $NO_X$ and/or other pollutants from gases and to processes employing the system. The system generally comprises a feeder and at least one reaction zone for single-stage removal. For dual-stage removal the system would generally be comprised of one or more feeders, a first reaction zone, and a second reaction zone. Multi-stage removal systems would incorporate additional reaction zones. The reaction zones utilized in the invention may be a fluidized bed, a pseudo-fluidized bed, a reaction column, a fixed bed, a pipe/duct reactor, a moving bed, a bag house, an inverted bag house, bag house reactor, serpentine reactor, and a cyclone/multiclone. Process operational parameters, such as system differential pressure, can be monitored and adjusted so that any differential pressure across the system is no greater than a predetermined level. Such process controls are accomplished with control sub-elements, control loops and/or process controllers.

The feeder contains a supply of sorbent of regenerable oxides of manganese and/or regenerated oxides of manganese. The feeder is configured to handle and feed oxides of manganese, which, upon regeneration, are in particle form and are defined by the chemical formula $MnO_X$, where X is about 1.5 to 2.0 and wherein the oxides of manganese have a particle size of about 0.1 to about 500 microns and surface area of about 1 to about 1000 $m^2/g$ as determined by the Brunauer, Emmett and Teller (BET) method.

For single stage removal of $SO_X$ and/or $NO_X$, a gas containing $SO_X$ and/or $NO_X$ is introduced into a reaction zone. The gas would be introduced at temperatures typically ranging from ambient temperature to below the thermal decomposition temperature(s) of nitrates of manganese if $NO_X$ only or both $NO_X$ and $SO_X$ were to be removed. If only $SO_X$ is the target pollutant, the gas would be introduced at temperatures typically ranging from ambient temperature to below the thermal decomposition temperature(s) of sulfates of manganese. In the reaction zone, the gas is contacted with the sorbent for a time sufficient to effect $SO_X$ capture at a targeted $SO_X$ capture rate set point or for a time sufficient to effect $NO_X$ capture at a target capture rate set point. The $SO_X$ and $NO_X$, being captured respectively by reacting with the sorbent to form sulfates of manganese to substantially strip the gas of $SO_X$ and to form nitrates of manganese to substantially strip the gas of $NO_X$. The reaction zone is configured to render the gas free of reacted and unreacted sorbent so that the gas can be vented from the reaction zone.

In a two-stage removal system, the first reaction zone is configured for introduction of the sorbent and a gas containing $SO_X$ and $NO_X$. The gas is introduced at temperatures typically ranging from ambient temperature to below the thermal decomposition temperature(s) of sulfates of manganese and contacted with the sorbent for time sufficient to primarily effect $SO_X$ capture at a targeted $SO_X$ capture rate set point. The $SO_X$ is captured by reacting with the sorbent to form sulfates of manganese to substantially strip the gas of $SO_X$. The second reaction zone is configured for introduction of sorbent and the gas that has been substantially stripped of $SO_X$ from the first reaction zone. In the second reaction zone, the gas is introduced at temperatures typically ranging from ambient temperature to below the thermal decomposition temperature(s) of nitrates of manganese and is further contacted with sorbent for a time sufficient to primarily effect $NO_X$ capture at a targeted $NO_X$ capture rate set point. The $NO_X$ is captured by reacting with the sorbent to form nitrates of manganese to substantially strip the gas of $NO_X$. The second reaction zone is further configured so that the gas that has been substantially stripped of $SO_X$ and $NO_X$ is rendered free of reacted and unreacted sorbent so that the gas may be vented from the second reaction zone.

In another embodiment, the system further comprises control sub-elements or combinations of control sub-elements for regulating and controlling differential pressure across the system, for regulating and controlling $SO_X$ and/or $NO_X$ capture efficiency, for regulating sorbent feed rate, for regulating gas inlet temperatures into the reaction zones, for regulating variable venturi position, and for simultaneous monitoring, regulation and control of differential pressure, $SO_X$ and $NO_X$ capture rates, sorbent feed rate, inlet temperatures and variable venturi position. The control sub-element for regulating and adjusting differential pressure does so by measuring differential pressure across the system, comparing differential pressure measurements against differential pressure set points, and increasing or decreasing pulse rates to adjust differential pressure to reconcile with targeted differential pressure set points.

In another embodiment, the system is generally comprised of at least one sorbent feeder and a modular reaction unit. Said feeder contains a supply of sorbent of regenerable oxides of manganese and/or regenerated oxides of manganese. The feeder is configured to handle and feed oxides of manganese, which, upon regeneration, are in particle form and are defined by the chemical formula $MnO_X$ where X is about 1.5 to 2.0, and wherein the oxides of manganese have a particle size of less than 100 microns and a surface area of at least 20 m$^1$/g as determined by the BET method. The modular reaction unit is comprised of at least three interconnected reaction zones. With the reaction zones as bag houses, the bag houses are connected so that a gas containing $SO_X$ and/or $NO_X$ can be routed through any one of the bag houses, any two of the bag houses in series, or all of the at least three bag houses in series or in parallel or any combination of series and parallel. Each bag house of the modular reaction unit is separately connected to the feeder so that sorbent can be introduced into each bag house where $SO_X$ and/or $NO_X$ capture can occur and the gas is contacted with sorbent for a time sufficient to allow formation of sulfates of manganese, nitrates of manganese, or both. This embodiment may further comprise the above-mentioned control sub-elements. Additionally, the modular reaction unit may further comprise a section of pipe/duct connected to an inlet of each bag house for conveying gas to each bag house and into which sorbent can be introduced. The section of pipe/duct may be configured as a first reaction zone where gas containing $SO_X$ and $NO_X$ is introduced at temperatures typically ranging from ambient temperature to below the sorbent sulfate and nitrate thermal decomposition temperature(s) thereof and contacted with the sorbent for a time sufficient to effect $SO_X$ capture at a targeted $SO_X$ capture rate set point, the $SO_X$ being captured by reacting with the sorbent to form sulfates of manganese. The bag houses of the modular reaction units are each configured so that the gas substantially stripped of $SO_X$ or $NO_X$ is rendered free of reacted and unreacted sorbent so that the gas may be vented.

In another embodiment of the invention, the system is comprised of at least one feeder and multiple bag houses. The first bag house is connected to the second and third bag houses through a common conduit. The first bag house is configured for introduction of sorbent and a gas containing $SO_X$ and $NO_X$ where the gas is introduced at temperatures typically ranging from ambient temperature to below the thermal decomposition temperature(s) of sulfates of manganese and contacted with the sorbent for a time sufficient to primarily effect $SO_X$ capture at a $SO_X$ capture rate set point, the $SO_X$ being captured by reacting with the sorbent to form sulfates of manganese to substantially strip the gas of $SO_X$. The first bag house is configured to render the gas that has been substantially stripped of $SO_X$ free of reacted and unreacted sorbent so that the gas can be directed out of the first bag house free of reacted and unreacted sorbent. The second bag house and the third bag house are each connected to the first bag house by a common conduit. In the second bag house and the third bag house the gas that has been substantially stripped of $SO_X$ in the first bag house may be introduced at temperatures typically ranging from ambient to below the thermal decomposition temperature(s) of nitrates of manganese and is further contacted with sorbent for a time sufficient to primarily effect $NO_X$ capture at a targeted $NO_X$ capture rate set point. The $NO_X$ is captured by reacting with the sorbent to form nitrates of manganese to substantially strip the gas of $NO_X$. The second and third bag houses each being configured to render the gas that has been substantially stripped of $SO_X$ and $NO_X$ free of reacted and unreacted sorbent so that the gas may be vented from the second and third bag houses free of reacted and unreacted sorbent. The system of this embodiment also includes diverter valve(s) positioned in the common conduit to direct the flow of gas from the first bag house to the second bag house and/or the third bag house. The diverter valve(s) have variable positions which may include first, second and third positions, and so on in sequence. In the one position, gas from the first bag house is directed to the second bag house. In another position, gas from the first bag house is directed to both the second and third bag houses. And in a further position, gas from the first bag house is directed to the third bag house. Differential pressure within the system is regulated so that any differential pressure across the system is no greater than a predetermined level.

In its various embodiments, the system may further comprise an alumina reactor where the gas that has been substantially stripped of $SO_X$ and/or $NO_X$ can be introduced and contacted with the sorbent for the purpose of removing mercury. In the reactor, mercury compounds in the gas contacts the sorbent, which may be oxides of manganese and/or alumina, and is sorbed thereon. The reactor is configured to render the gas free of sorbent so that the gas can be vented.

In another embodiment of the invention, the bag house utilized as reaction zones in the system may be an inverted bag house. The inverted bag house permits downward, vertical flow of gases and sorbent and is comprised of a bag house housing, at least one inlet, a plurality of fabric filter bags, a support structure for the filter bags, a hopper to receive and collect particles, an outlet, and a conduit. The bag house housing permits the introduction of gases and sorbent entrained in the gases, has a top and a bottom and is configured for gases to flow vertically downward from the top to the bottom of the bag house. Said inlet is located near the top of the bag house housing and configured for the introduction of gases and sorbent entrained in the gases into the bag house. The plurality of fabric filter bags are configured to allow gas to flow from the outside of the bags to the inside of the bags under an applied differential pressure and to prevent the passage of sorbent from the outside to the inside of the bags, thereby separating sorbent from the gas. The support structure is configured to receive and support the fabric filter bags and to provide openings through which particles may be freely passed downward into the hopper by gravity. The hopper is configured to receive the particles and to permit the removal of the particles. The inverted bag house also has an outlet located near the bottom of the housing below the bags and above the hopper. The outlet is connected to a conduit located below the fabric filter bags and positioned to receive gas passing through the fabric filter bags.

The invention is further directed to a bag house reactor that can be utilized as a reaction zone in the system of the invention. The bag house reactor is comprised of a bag house that has interior and exterior surfaces as well as upper, central, and lower sections. The bag house has a variable venturi for adjusting the velocity of gas flowing within the bag house thereby increasing of decreasing the depth of the pseudo-fluidized bed. The variable venturi is generally located in the central and/or lower sections of the bag house and is configured for adjustment of the position of the variable venturi by varying the distance or space between the variable venturi and the interior surface of the bag house. The bag house reactor has a variable venturi position detector for determining the position of the variable venturi and a variable venturi positioner for adjusting the position of the variable venturi to increase or decrease the velocity of gas flow from the lower section past the variable venturi to the central and upper sections of the bag house. There is a first distribution port which is configured for introduction of gas into the bag house. The gas distribution port is positioned below the variable venturi. There is a distribution port connected to a sorbent feeder conduit which is configured for introduction of sorbent into the bag house. The sorbent distribution port is positioned above the variable venturi. Within the bag house are a plurality of fabric filter bags secured therein. The fabric filter bags are mounted in the upper section of the bag house and extend downward into the central section. In the lower section of the bag house is a sorbent hopper where loaded sorbent is collected. The bag house reactor has a loaded sorbent outlet connected to the sorbent hopper. The sorbent outlet has an outlet valve which in the open position allows for removal of sorbent from the hopper. Located in the top section of the bag house is a vent for the venting of gas from the bag house.

The invention is further directed to processes employing systems according to the invention for removal of $SO_X$ and $NO_X$ from a gas. Thus in another embodiment of the invention, the process comprises providing a removal system according to the invention, introducing gas containing $SO_X$ and $NO_X$ into the first reaction zone of the system, the gas having temperatures typically ranging from ambient temperature to below the thermal decomposition temperature(s) of sulfates of manganese; contacting the gas with sorbent for a time sufficient to primarily effect $SO_X$ capture at a targeted $SO_X$ capture rate set point by formation of sulfates of manganese; passing the gas substantially stripped of $SO_X$ from the first reaction zone into the second reaction zone, the gas having temperatures typically ranging from ambient temperature to below the thermal decomposition temperature(s) of nitrates of manganese; contacting the gas in the second reaction zone with sorbent for a time sufficient to primarily effect $NO_X$ capture at a $NO_X$ capture rate set point by formation of nitrates of manganese; and venting the gas substantially stripped of $SO_X$ and/or $NO_X$ and rendered free of reacted and unreacted sorbent from the second reaction zone.

In another embodiment, the process comprises providing a removal system according to the invention, the removal system being comprised of at least one feeder and a modular reaction unit as described above; introducing gas containing $SO_X$ and $NO_X$ into a first bag house of the modular reaction unit, the gas having temperatures typically ranging from ambient temperature to below the thermal decomposition temperature(s) of sulfates of manganese; contacting the gas in the first bag house with sorbent for a time sufficient to effect $SO_X$ capture at a target $SO_X$ capture rate set point by formation of sulfates of manganese; passing the gas substantially stripped of $SO_X$ from the first bag house into a second bag house of the modular reaction unit, the gas having temperatures typically ranging from ambient temperature to below the thermal decomposition temperature(s) of nitrates of manganese; contacting the gas in the second bag house with sorbent for a time sufficient to effect $NO_X$ capture at a target $NO_X$ capture rate set point by formation of nitrates of manganese; and venting the gas substantially stripped of $SO_X$ and $NO_X$ and free of reacted and unreacted sorbent from the second bag house.

In another embodiment, the process further comprises the steps of removing reacted sorbent from reactions zones of a system of the invention; washing the sorbent in a dilute acid rinse to dissolve sulfates and/or nitrates of manganese on the surface of sorbent particles into solution and thereby cleaning the sorbent; separating the cleaned sorbent from the acid rinse; drying the cleaned sorbent; and pulverizing the cleaned sorbent to de-agglomerate the cleaned sorbent.

In another embodiment, the process further comprises the steps of removing reacted sorbent from reactions zones of a system of the invention; washing the sorbent in a dilute acid rinse to dissolve sulfates and/or nitrates of manganese on the surface of sorbent particles into solution and thereby cleaning the sorbent; separating the cleaned sorbent from the acid rinse; conveying the cleaned sorbent to a dryer; drying the cleaned sorbent; conveying the cleaned sorbent to a pulverizer; pulverizing the cleaned sorbent to de-agglomerate the cleaned sorbent; and conveying the de-agglomerated clean sorbent to the sorbent feeder for reintroduction into the system.

In another embodiment, the process further comprises the steps of removing reacted sorbent from reactions zones of a system of the invention; washing the sorbent in a dilute acid rinse to dissolve sulfates and/or nitrates of manganese on the surface of sorbent particles into solution and thereby cleaning the sorbent; separating the cleaned sorbent from the acid rinse to provide a filtrate containing dissolved sulfates and/or nitrates of manganese; adding alkali or ammonium hydroxide to the filtrate to form an unreacted sorbent precipitate of oxides of manganese and a liquor containing alkali or ammonium sulfates and/or nitrates; separating the unreacted sorbent precipitate from the liquor, the liquor being routed for further processing into marketable products or for distribution and/or sale as a useful by-product; rinsing the sorbent precipitate; drying the sorbent precipitate to form unreacted sorbent; and pulverizing the unreacted sorbent to de-agglomerate the unreacted sorbent.

In another embodiment, the process further comprises the steps of removing reacted sorbent from reactions zones of a system of the invention; washing the sorbent in a dilute acid rinse to dissolve sulfates and/or nitrates of manganese on the surface of sorbent particles into solution and thereby cleaning the sorbent; separating the cleaned sorbent from the acid rinse to provide a filtrate containing dissolved sulfates and/or nitrates of manganese; adding alkali or ammonium hydroxide to the filtrate to form a sorbent precipitate of oxides of manganese and a liquor containing alkali or ammonium sulfates and/or nitrates; separating the sorbent precipitate from the liquor, the sorbent precipitate being routed for regeneration of unreacted sorbent; and routing the liquor for distribution and/or sale as a useful by-product or for further processing into marketable products.

In another embodiment, the process further comprises the steps of removing reacted sorbent from a reaction zone of the system where primarily $NO_X$ capture occurred by reacting with the sorbent to form nitrates of manganese; heating the reacted sorbent to thermally decompose the nitrates of manganese, to desorb $NO_2$, and to regenerate reacted sorbent to form unreacted sorbent of oxides of manganese; and further heating the unreacted sorbent in an oxidizing atmosphere to complete the regeneration of the sorbent.

In another embodiment, the process further comprises the steps of removing reacted sorbent from a reaction zone of the system where primarily $NO_X$ capture occurred by reacting with the sorbent to form nitrates of manganese; heating the reacted sorbent to thermally decompose the nitrates of manganese, to desorb $NO_2$, and to regenerate reacted sorbent to form unreacted sorbent of oxides of manganese; passing the evolved $NO_2$ through a wet scrubber containing water and an oxidant to form a nitric acid liquor; and routing the nitric acid liquor for further distribution and/or sale as a useful product or on for further processing.

In another embodiment, the process further comprises the steps of removing reacted sorbent from a reaction zone of the system where primarily $NO_X$ capture occurred by reacting with the sorbent to form nitrates of manganese; heating the reacted sorbent to thermally decompose the nitrates of manganese, to desorb $NO_2$, and to regenerate reacted sorbent to form unreacted sorbent of oxides of manganese; passing the evolved $NO_2$ through a wet scrubber containing water and an oxidant to form a nitric acid liquor; adding an ammonium or alkali hydroxide to the acid liquor to form a liquor containing ammonium or alkali nitrates; and routing the liquor for distribution and/or sale as a useful by-product or for further processing into marketable products.

In another embodiment, the process further comprises the steps of removing $SO_X$ and $NO_X$ reacted sorbent from a reaction zone of the system; heating the reacted sorbent to a first temperature to evolve $NO_2$, the desorb NO being routed for further processing and/or handling; and heating the reacted sorbent to a second temperature to evolve $SO_X$, the evolved $SO_X$ being routed for further processing and/or handling and the reacted sorbent being regenerated to unreacted sorbent.

In another embodiment, the process further comprises the steps of removing $NO_X$, $SO_X$ and mercury reacted sorbent from a reaction zone of the system; heating the sorbent to a first temperature to desorb $NO_2$ which is routed for further processing into marketable products; heating the sorbent to a second temperature to desorb elemental mercury which is routed to a condenser for recovery; rinsing the sorbent to wash away any ash and to dissolve sulfates of manganese into solution to form a liquor; separating any ash in the liquor, the separated ash being routed for further handling; adding alkali or ammonium hydroxide to the liquor to form an unreacted sorbent precipitate of oxides of manganese and a liquor containing alkali or ammonium sulfates, the liquor containing rinsed sorbent; separating the rinsed sorbent and unreacted sorbent precipitate from the liquor, the liquor being routed for further processing into marketable products or for distribution and/or sale as a useful by-product; drying the rinsed sorbent and sorbent precipitate to form unreacted sorbent; and pulverizing the unreacted sorbent to de-agglomerate the unreacted sorbent.

BRIEF DESCRIPTION OF THE DRAWINGS

FIG. 6 is a perspective view of a commercially available bag house.

FIG. 7 is an end elevation view of a commercially available bag house.

FIG. 8 is a top plan view of a commercially available bag house.

FIG. 9 is a side elevation view of a commercially available bag house.

FIG. 30 is a graph plotting $SO_X$ values over time.

DETAILED DESCRIPTION OF THE INVENTION

Figure 1:
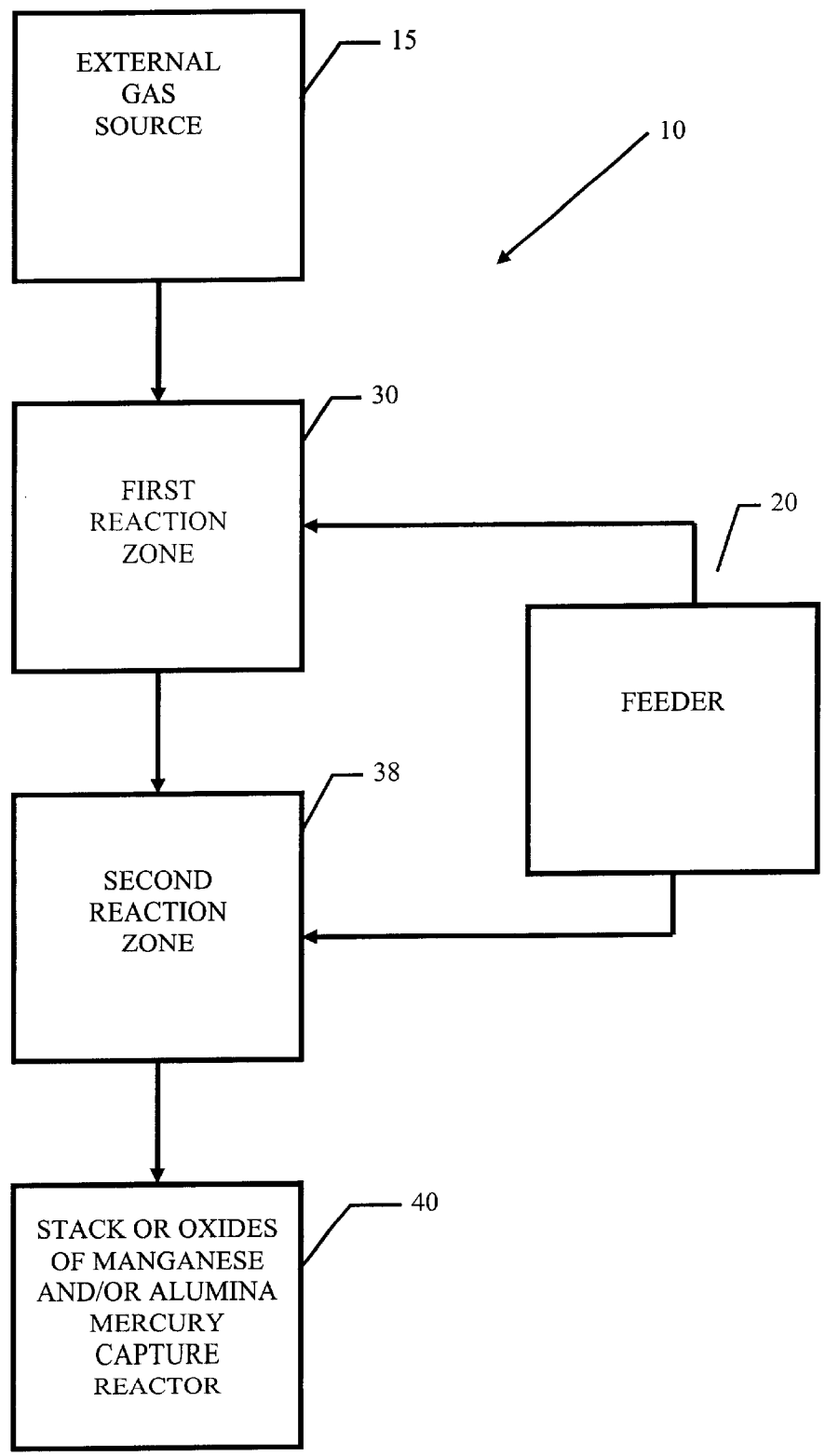
FIG. 1 is a schematic block diagram showing a system according to the invention.

The invention relates to systems and processes for removal of $SO_X$ and/or $NO_X$ as well as other pollutants, from a gas stream. In the invention, gas containing $SO_X$ and/or $NO_X$ is introduced into a first reaction zone where the gas is contacted with a sorbent of regenerable oxides of manganese and/or regenerated oxides of manganese. The sorbent may interact with the pollutants in a gas stream as a catalyst, a reactant, an absorbent or an adsorbent. The oxides of manganese react with the $SO_X$ and the $NO_X$ to form, respectively, sulfates of manganese and nitrates of manganese.

"Nitrates of manganese" is used herein to refer to and include the various forms of manganese nitrate, regardless of chemical formula, that may be formed through the chemical reaction between $NO_X$ and the sorbent and includes hydrated forms as well.

Similarly, "sulfates of manganese" is used herein to refer to and include the various forms of manganese sulfate, regardless of chemical formula that may be formed through the chemical reaction between $SO_X$ and the sorbent and includes hydrated forms as well.

"Target pollutant(s)" means the pollutant or pollutants that are targeted for removal in the system.

"Substantially stripped" means that a pollutant has been removed from a gas at about a targeted capture rate whether by interaction with a sorbent or physical removal in a solid-gas separator. With respect to pollutants removed by interaction with a sorbent, it further contemplates that removal up to a targeted capture rate for that pollutant may be commenced in a first reaction zone and completed in a subsequent reaction.

"Reacted sorbent" means sorbent that has interacted with one or more pollutants in a gas whether by chemical reaction, adsorption or absorption. The term does not mean that all reactive or active sites on the sorbent have been utilized since all such sites may not actually be utilized.

"Unreacted sorbent" means virgin sorbent that has not intereacted with pollutants in a gas.

Some of the reaction zones may also serve as solid-gas separators rendering the gas free of solids and particulates, such as sorbent, whether reacted or unreacted, fly ash, and mercury compounds, so as to allow the gas that is substantially stripped of $SO_X$ and/or $NO_X$ or other pollutants to be vented from the reaction zone and passed to another reaction zone or routed up a stack to be vented into the atmosphere. The solids and particulates which include the reacted and unreacted sorbent, fly ash, and the like, are retained within reaction zones that are solid-gas separators and may be subsequently removed for further processing.

Reaction zones may be multi-stage removal systems which would incorporate additional reaction zones. The reaction zones utilized in single stage, dual stage, or multi-stage removal may be a fluidized bed, a pseudo-fluidized bed, a reaction column, a fixed bed, a pipe/duct reactor, a moving bed, a bag house, an inverted bag house, bag house reactor, serpentine reactor, and a cyclone/multiclone.

The gases that may be processed in the invention are most gases containing $SO_X$ and/or $NO_X$. Such gases may be generated by the combustion of fossil fuels in power plants, heating plants and various industrial processes, such as the production of taconite pellets by taconite plants, refineries and oil production facilities, gas turbines, and paper mills. Combustion for heating and other process steps at such facilities generate waste or flue gases that contain $SO_X$ and $NO_X$ in various concentrations, typically but not limited to 500 ppm or less for $NO_X$ and 3000 ppm or less for $SO_X$. Further, the gases may contain other removable pollutants, such as fly ash, and mercury (Hg), as elemental Hg in vapor form or mercury compounds in particulate form, in small concentration, e.g., 0.0047 ppm (4.7 ppb). The gases may further contain hydrogen sulfide and other totally reduced sulfides (TRS) and other pollutants. These gases may typically have temperatures typically ranging from ambient temperature to below the thermal decomposition temperature(s) of nitrates of manganese and to below the thermal decomposition temperature(s) of sulfates of manganese. Gases generally within this temperature range can be processed in the system of the invention.

The primary sorbent useful in the invention are oxides of manganese, which may be found in manganese ore deposits or derived synthetically. Manganese compounds of interest occur in three different oxidation states of +2, +3, and +4; this gives rise to a range of multivalent phases, which provide oxides of manganese with a great diversity of atomic structures and thus mineral forms. Examples of these mineral forms include, but are not limited to, pyrolusite ($MnO_2$), ramsdellite ($MnO_2$), manganite (MnOOH or $Mn_2O_3 \cdot H_2O$), groutite (MnOOH), and vemadite ($MnO_2 \cdot nH_2O$) to name a few. This is reported by Jerry E. Post in his article "Manganese Oxide Minerals: Crystal structures and economic and environmental significance," Proc. Nat'l. Acad. Sci, U.S.A., Vol. 96, pp. 3447–3454, March 1999, the disclosure of which is incorporated herein by this reference.

One of the most common of the various forms of oxides of manganese is manganese dioxide, $MnO_2$. The pyrolusite form of this mineral is often the primary mineral form in manganese deposits. Pyrolusite is composed predominantly of the compound $MnO_2$. This oxide of manganese exhibits at least two crystalline forms. One is the gamma form, which is nearly amorphous. The other is a beta form that exhibits pronounced crystalline structure. The term "oxides of manganese" as used herein is intended to refer and include the various forms of manganese oxide, their hydrated forms, and crystalline forms, as well as manganese hydroxide (e.g. $Mn(OH)_2$), etc.

With reference to the removal of $SO_X$ and/or $NO_X$, the relative capture or removal efficiencies of oxides of manganese may be understood by the below calculation(s) of loading rates. In order to assess the economics of the system and processes of the invention, it is necessary to determine the gas removal efficiencies of the sorbent. Gas capture efficiency based upon test results may be calculated by dividing weight of gas removed by weight of sorbent. This provides an approximate picture of system operations, but does not account for stoichiometry of the reactions or interference between reactive gases in a multiple-gas system. The stoichiometric gas capture ratio is described below.

For the purpose of this assessment the overall reactions believed to occur between the sorbent, oxides of manganese, and sulfur dioxide ($SO_2$) and nitric oxide (NO) are shown below, with molecular weights shown above each species.

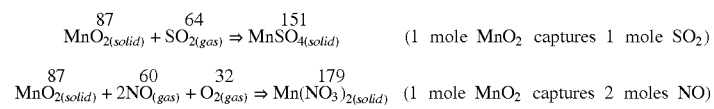

$$\overset{87}{MnO_{2(solid)}} + \overset{64}{SO_{2(gas)}} \Rightarrow \overset{151}{MnSO_{4(solid)}} \quad \text{(1 mole } MnO_2 \text{ captures 1 mole } SO_2\text{)}$$

$$\overset{87}{MnO_{2(solid)}} + \overset{60}{2NO_{(gas)}} + \overset{32}{O_{2(gas)}} \Rightarrow \overset{179}{Mn(NO_3)_{2(solid)}} \quad \text{(1 mole } MnO_2 \text{ captures 2 moles NO)}$$

These reactions may occur in multiple steps. Molecular weights are shown above each species. Based on these reactions, the theoretical maximum stoichiometric gas capture by weight of $MnO_2$ sorbent is the ratio of the molecular weights of the products versus the reactants which is 73% for $SO_2$ or 69% for NO, for systems containing only one reactive gas. For a system containing two reactive gases, depending on reaction characteristics, the maximum stoichiometric gas capture will be lower for both gases. If reaction speeds are assumed to be equal for both reactive gases, maximum stoichiometric gas capture for each gas should be proportional to the percentage of each gas present.

For example, during a 48-hour test, two reactive gases, $SO_2$ and NO were present at approximately 430 ppm and 300 ppm, respectively. Total weights of reactive inlet gases treated were:

$SO_2$=98.45 lb. NO=47.02 lb. total=145.47 lb.
Therefore, $SO_2$ and NO represented 67.7% and 32.3% respectively, of reactive gases present. If the theoretical maximum stoichiometric gas capture for a single-gas system is corrected to these reactive gas weight proportions, the theoretical maximum percentage capture for each gas by $MnO_2$ weight is:

$SO_2$: (0.73 single-gas)×(0.67 for the 48-hr. test)=0.489= 48.9%
NO: (0.69 single-gas)×(0.323 for the 48-hr. test)=0.223= 22.3%

Therefore, the theoretical maximum weights of gases captured by 289 lb., for example, of sorbent for the 48-hour test would be:

$SO_2$: (289 lb. Sorbent)×(0.489)=141.4 lb. $SO_2$
NO: (289 lb. Sorbent)×(0.323)=98.35 lb. NO Actual gas capture experienced in the 48-hour test was 23.94 lb. of $SO_2$ and 4.31 lb. of NO. For the 2-gas system, stoichiometric gas capture was:

$SO_2$: (23.94 lb. captured)/(141.4 lb. $SO_2$ possible)=16.9% (of theoretical maximum)
NO: (4.31 lb. captured)/(64.41 lb. possible)=6.69% (of theoretical maximum)

Oxides of manganese, once reacted with $SO_X$ and $NO_X$ to form sulfates of manganese and nitrates of manganese respectively, can be regenerated. There are essentially two general methods of regeneration, thermal decomposition and chemical decomposition.

In thermal decomposition, the sulfates of manganese and/or nitrates of manganese are heated in an oxidizing atmosphere whereupon manganese oxide is formed and nitrogen dioxide and/or sulfur dioxide are desorbed and captured. The captured nitrogen dioxide or sulfur dioxide can be reacted with other chemicals to produce marketable products.

In the chemical decomposition or regeneration of manganese oxide, the sulfates of manganese and/or nitrates of manganese are dissolved from the used sorbent in a dilute acidic aqueous slurry to which, after separation and recovery of the washed sorbent, other compounds such as alkali or hydroxides or carbonates may be added and manganese oxide is precipitated out of solution and removed. The solution, now free of oxides of manganese, can be routed on for further processing or production of marketable products such as alkali or ammonium sulfates and nitrates. The regeneration of manganese oxide and production of useful or marketable products through thermal or chemical decomposition is further discussed below.

In the process of regeneration, the regenerated oxides of manganese are in particle form and are defined by the chemical formula $MnO_X$, where X is about 1.5 to 2.0. The regeneration process may be engineered to yield oxides of manganese having a particle size ranging from 0.1 to 500 microns. Oxides of manganese in this range are useful in the invention. Preferably, the oxides of manganese will have a particle size of less than 300 microns, and more preferably of less than 100 microns. The regenerable oxides of manganese and/or regenerated oxides of manganese are typically fine, powdery, particulate compounds.

Reactivity of dry sorbents may generally be related to its particle surface area. Particles or particulates all have weight, size, and shape, and in most cases they are of inconsistent and irregular shape. In the case of fine powders it is often desirable to know how much surface area a given quantity of powder exhibits, especially for particles that are chemically reactive on particle surfaces, or are used as sorbents, thickeners or fillers. (Usually measurements of surface area properties are done to compare several powders for performance reasons.) Particles may also have microscopic pores, cracks and other features that contribute to surface area.

The BET (Brunauer-Emmett-Teller) method is a widely accepted means for measuring the surface area of powders. A powder sample is exposed to an inert test gas, such as nitrogen, at given temperature and pressures, and because the size of the gas molecules are known at those conditions, the BET method determines how much test gas covers all of the exterior surfaces, exposed pores and cracks with essentially one layer of gas molecules over all of the particles in the powder sample. Optionally, the analyst can use other test gases such as helium, argon or krypton; and can vary from 1 to 3 relative test pressures, or more, for better accuracy. From this, a measure of total surface area is calculated and usually reported in units of square meters of particle surface area per gram of powder sample ($m^2/g$). Generally, coarse and smooth powders often range in magnitude from 0.001 to 0.1 $m^2/g$ of surface area, and fine and irregular powders range from 1 to 1000 $m^2/g$. Since the interactions between a sorbent and the pollutant occurs primarily at the surface of sorbent particle, surface area correlates with removal efficiency. The oxides of manganese useful in the invention are fine and irregular powders and thus may have a surface area ranging from 1 to 1000 $m^2/g$. Preferably the sorbent will have a surface area of greater than 15 $m^2/g$, and more preferably of greater than 20 $m^2/g$.

With reference to FIG. 1, a system according to the invention is illustrated in block diagram form. The system 10 may be seen as comprised of a feeder 20 and a first reaction zone 30 and a second reaction zone 38. The feeder 20 would contain a supply of sorbent of regenerable oxides of manganese and/or regenerated oxides of manganese. The feeder 20 is configured to handle and feed oxides of manganese, which, upon regeneration, are in particle form and defined by the chemical formula $MnO_X$ where X is about 1.5 to 2.0. The first reaction zone 30 is configured for introduction of the sorbent in a gas containing $SO_X$ and $NO_X$. In one embodiment, the first reaction zone 30 may be a section of pipe/duct, possibly configured as a fluidized bed, a pseudo-fluidized bed, a reaction column, a fixed bed, a pipe/duct reactor, a moving bed, a bag house, an inverted bag house, bag house reactor, serpentine reactor, and a cyclone/multiclone. The second reaction zone 38 a fluidized bed, a pseudo-fluidized bed, a reaction column, a fixed bed, a pipe/duct reactor, a moving bed, a bag house, an inverted bag house, bag house reactor, serpentine reactor, and a cyclone/multiclone. Preferably, the second reaction zone is a bag house, such as commercially available bag house, an inverted bag house according to the invention, or a bag house reactor according to the invention.

The gas containing $SO_X$ and $NO_X$, or other pollutants, comes from a gas source 15 external to the system. The gas is introduced into the first reaction zone 30 and is contacted with sorbent introduced into the first reaction zone 30 from the feeder 20 and is contacted with the sorbent for a time sufficient to primarily effect $SO_X$ capture at a targeted $SO_X$ capture rate. For purpose of discussion, and not wishing to be held to a strict interpretation, with respect to effecting a certain capture, it has been observed that oxides of manganese can more readily capture $SO_2$ in a gas stream absent of NO, and also can more readily capture NO in a gas stream absent of $SO_2$, than when the gas stream contains both $SO_2$ and NO. $SO_X$ capture tends to proceed at a much faster rate than $NO_X$ capture when the two pollutants are present in a gas stream.

The gas and sorbent may be introduced separately or commingled before introduction into a reaction zone. Once the gas and sorbent have been contacted for sufficient time, the $SO_X$ is captured by reacting with the sorbent to form sulfates of manganese to substantially strip the gas of $SO_X$. The gas substantially stripped of $SO_X$ passes from the first reaction zone 30 into the second reaction zone 38. The second reaction zone 38 is configured for introduction of sorbent and the gas substantially stripped of $SO_X$. In the second reaction zone 38, the gas is further contacted with sorbent for a time sufficient to primarily effect $NO_X$ capture at a targeted $NO_X$ capture rate. The $NO_X$ is captured by reacting with the sorbent to form nitrates of manganese to substantially strip the gas of $NO_X$. The second reaction zone 38 is further configured so that the gas which has been substantially stripped of both $SO_X$ and $NO_X$ is rendered free of reacted and unreacted sorbent. The gas may then be vented from the second reaction zone 38 to a stack 40 where the gas is released to the atmosphere.

Differential pressure across the reactor system is regulated by a control sub-element (not shown in FIG. 1) so that any differential pressure across the system is no greater than a pre-determined level. As is later described, the control sub-element may control other system parameters such as feeder rate, $SO_X$ and/or $NO_X$ capture rate, and the inlet gas temperature into the reaction zones. Thus, the system of the invention is highly adaptable and, in another embodiment, is generally comprised of a feeder 20, a first reaction zone 30, a second reaction zone 38, and at least one control sub-element for regulating process parameters.

Figure 2:
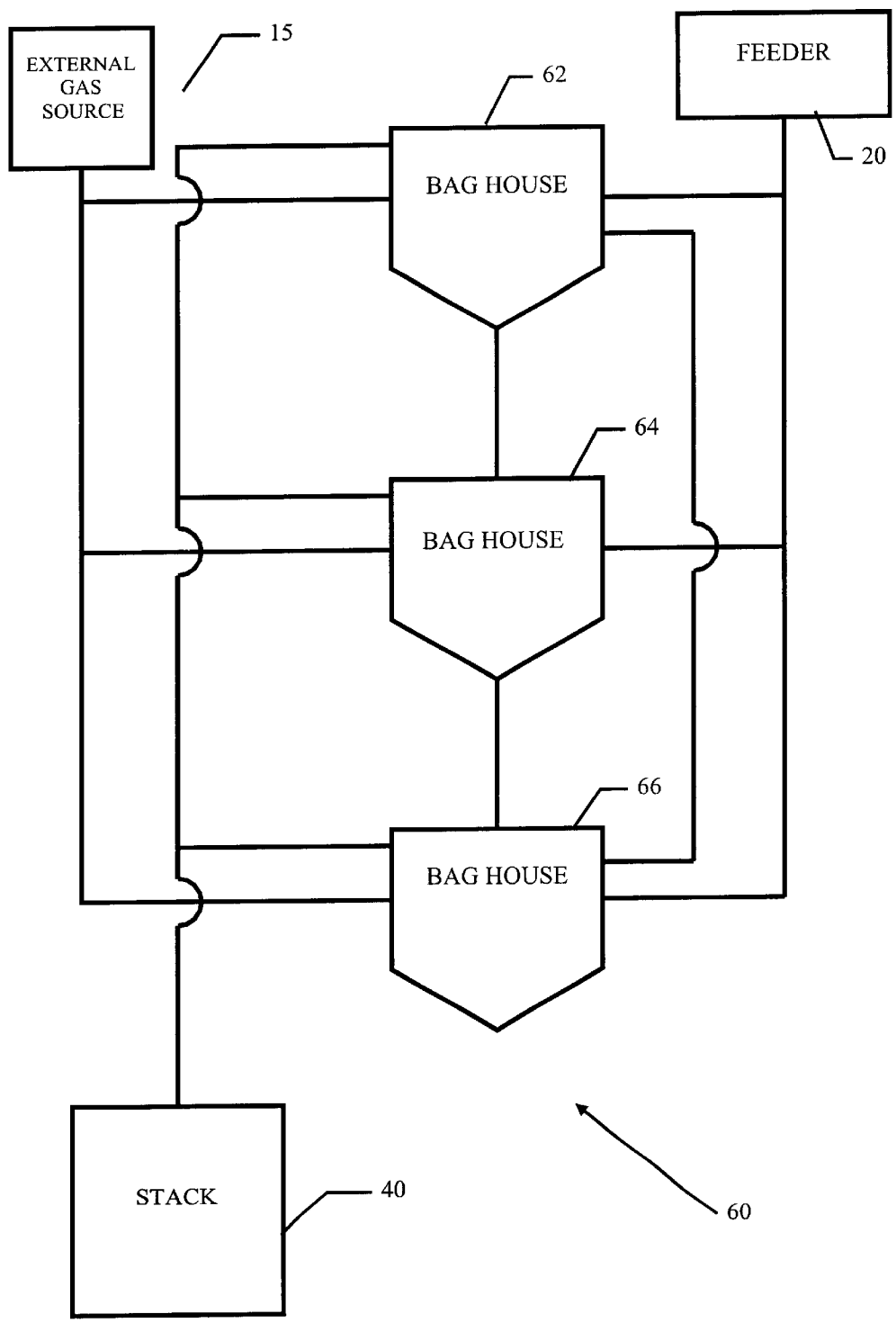
FIG. 2 is a schematic block diagram showing a system according to the invention.

In another embodiment of the invention, the system is comprised of a feeder 20 as previously described and a modular reaction unit 60 comprised of at least three interconnected reaction zones. With reference to FIG. 2, where the reaction zones are three interconnected bag houses 62, 64, 66, the modular reaction unit may be understood. The bag houses 62, 64, 66 are connected so that a gas containing $SO_X$ and/or $NO_X$ can be routed through any one of the bag houses, any of the two bag houses in series, or all of the at least three bag houses in series or in parallel or any combination of series or parallel. Each bag house is separately connected to the feeder 20 and to the external gas source 15. Through these connections, sorbent and gas can be introduced into each bag house where $SO_X$ and $NO_X$ capture can occur when the gas is contacted with sorbent for a time sufficient to allow formation of sulfates of manganese, nitrates of manganese, or both. The system in this embodiment may also include control sub-elements 50 (not shown) for regulating various process parameters. The reaction zones of the modular unit 60 are not limited to bag houses and may be any combination of reaction zones useful in the inventory. If the bag houses are operated independently of each other, then the section of pipe or duct (pipe/duct) preceding the bag house and that which is connected to an inlet of each bag house conveys gas into each bag house and is also configured as a first reaction zone 30, a pipe/duct reactor, into which gas containing $SO_X$ and $NO_X$ flows along with the sorbent. The gas is mixed with the sorbent in the pipe/duct reactor for a sufficient time to achieve $SO_X$ capture at a targeted capture rate. In this mode, the system operates as illustrated in FIG. 1 with each bag house 62, 64, 66 being a second reaction zone 38 into which the gas that has been substantially stripped of $SO_X$ passes from the first reaction zone 30, pipe/duct reactor.

Figure 3:
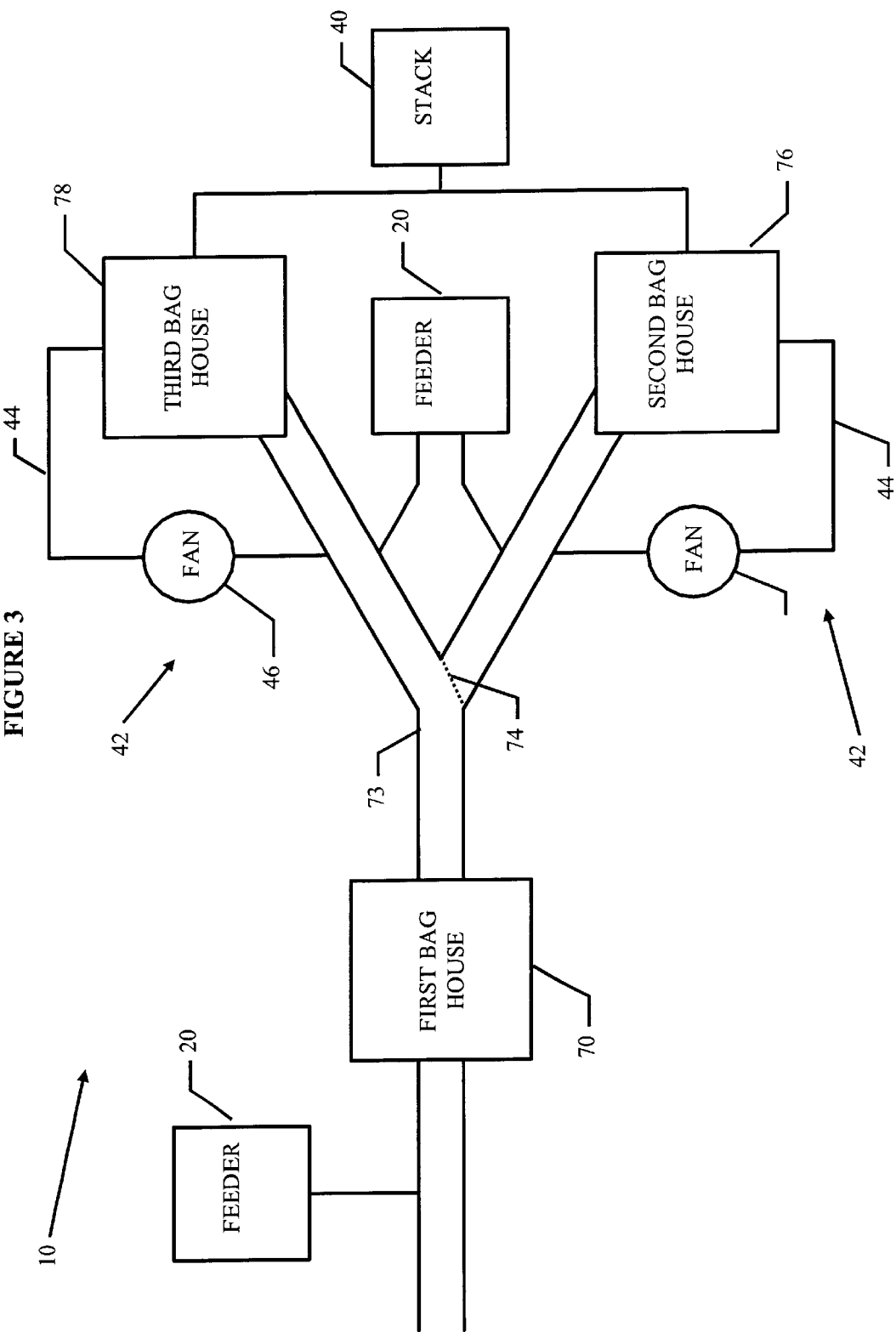
FIG. 3 is a schematic block diagram showing a system according to the invention.

With reference to FIG. 3, another embodiment of the invention is shown. In this embodiment, the system 10 is comprised of a feeder 20, and three bag houses 70, 76, and 78, a common conduit 73 and a diverter valve 74. Gas and sorbent are introduced into the first bag house 70 which serves as a first reaction zone of a two-staged $SO_X/NO_X$ removal system where primarily $SO_X$ capture occurs. The gas substantially stripped of $SO_X$ then passes from the first bag house 70 into the common conduit 73. As shown in FIG. 3, the common conduit 73 is Y-shaped, but may be of any shape that allows gas to flow from the first bag house 70 and to be directed to the second and third bag houses 76, 78 which each function as the second reaction zone of a two-staged $SO_X/NO_X$ removal system.

In the Y-shaped common conduit 73 can be seen a diverter valve 74 illustrated as a dotted line at the fork of the "Y".

The diverter valve 74 is positioned in the common conduit 73 so as to direct the flow of gas from the first bag house 70 to the second bag house 76 and/or the third bag house 78. The diverter valve 74 has variable positions, in the first position gas from the first bag house 70 is directed to the second bag house 76, in the second (variable) position gas from the first bag house 70 is directed to both the second and third bag houses 76, 78, and in the third position, as illustrated in FIG. 3, the gas from the first bag house 70 is directed to the third bag house 78. Gas exiting the second and third bag houses 76 and 78 may be vented and directed for further processing or handling (e.g. directed to stack 40 or directed to a subsequent reactor for Hg removal). The system of this embodiment may incorporate any combination of the reaction zones useful in the invention and is not intended to be limited to bag houses.

However, when the reaction zones are bag houses, the system illustrated in FIG. 3 may further comprise an off-line loading circuit 42. The off-line loading circuit 42 is brought into use after the filter bags have been pulsed to clean them of filter cake so reacted sorbent can be removed for recycling or regeneration. There may be more than one off-line loading circuit 42, as shown in FIG. 3, each separately connected to a bag house 76 and 78. The off-line loading circuit is connected to a sorbent feeder and a bag house via an off-line loading circuit conduit 44 and incorporates a fan 46 for blowing air commingled with sorbent into the bag houses 76 and 78 in order to pre-load the fabric filter bags in the bag houses by building a filter cake thereon. The air passing through the bags and cake thereon is vented from the bag house. When the bag house is ready to come back on line, the off-line loading circuit can be closed or switched off and the diverter valve 74 moved to a position to permit the flow of process gas through the bag house that is being brought back on line.

When $NO_X$ is captured by the sorbent, the sorbent may not be completely loaded or spent thus having remaining reactive sites. Even though it may no longer be effective as an efficient sorbent for $NO_X$ at this point, the sorbent may have reactive sites that could be utilized efficiently for $SO_X$ capture. Thus, the partially loaded reacted sorbent or $NO_X$-reacted sorbent in a second reaction zone of a two-stage $SO_X/NO_X$ removal system could be removed from the second reaction zone and fed into the first reaction zone to allow additional $SO_X$ capture with, or loading onto, the sorbent. This would decrease the frequency at which sorbent regeneration is needed and reduce the amount of virgin or unreacted sorbent that would need to be introduced into the first reaction zone.

Figure 4:
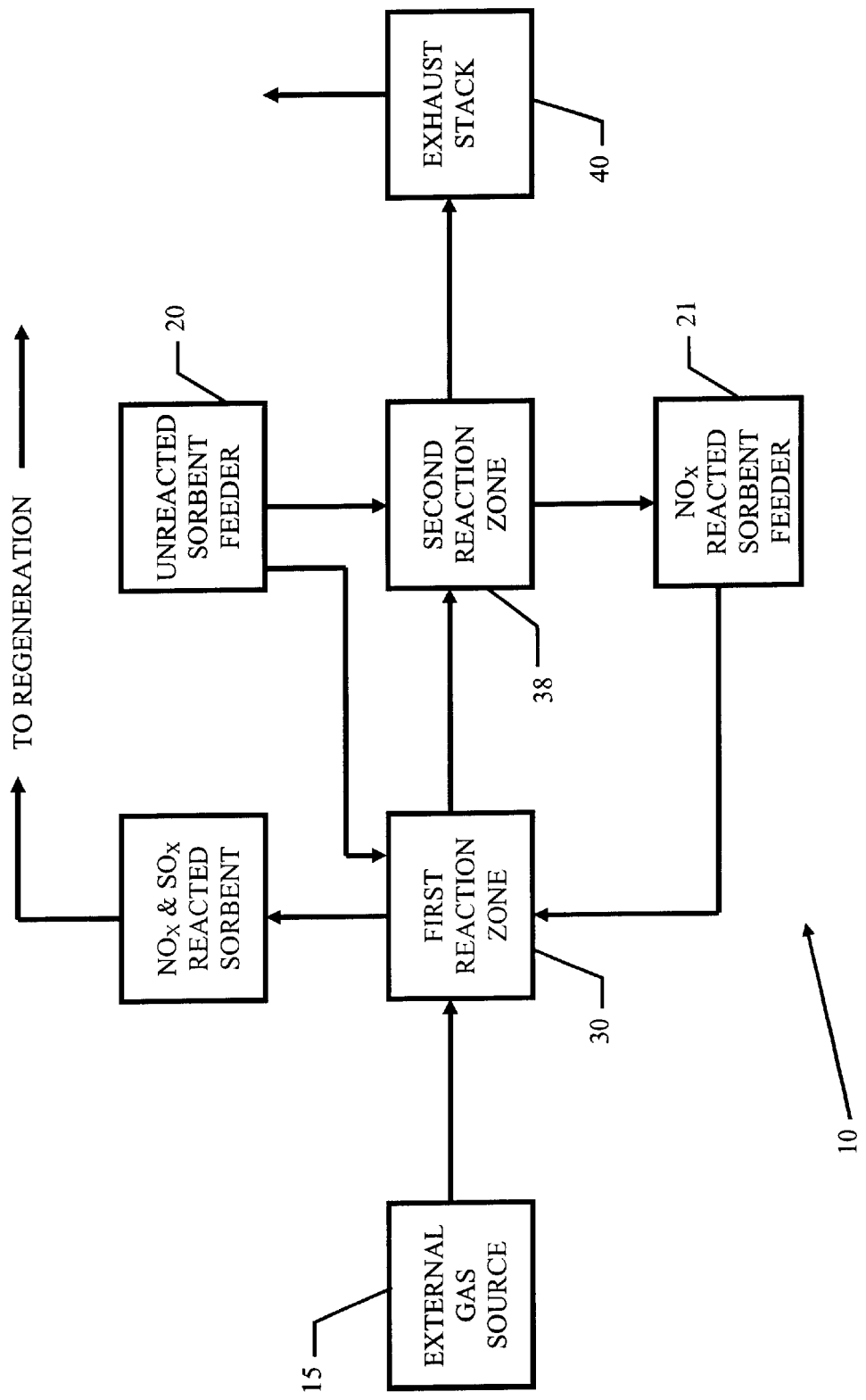
FIG. 4 is a block diagram showing a system according to the invention.

With reference to FIG. 4 a system according to the invention utilizing counter-flow feed of $NO_X$-reacted sorbent is illustrated in a block flow diagram. The system 10 is comprised of a first reaction zone 30, a second reaction zone 38, a feeder 20 containing virgin or unreacted sorbent, and a $NO_X$-reacted sorbent feeder 21. The first reaction zone 30 of system 10 is connected to external gas source 15 and gas flows from the external gas source 15 to the first reaction zone 30, from the first reaction zone 30 to the second reaction zone 38, and from the second reaction zone 38 is either vented to stack 40 or directed on to another system unit such as a mercury-sorbent reactor (not shown). The feeder 20 can feed virgin or unreacted sorbent into the first reaction zone 30 and the second reaction zone 38. $NO_X$-reacted sorbent is removed from the second reaction zone and is conveyed from the second reaction zone to the first reaction zone via $NO_X$-reacted sorbent feeder 21 where the $NO_X$-reacted sorbent with available reaction sites is further contacted with a gas containing both $SO_X$ and $NO_X$ to remove and capture $SO_X$.

Using reacted sorbent feeders allows sorbent to be recycled to a reaction zone where unreacted sites on the surface of the sorbent can be utilized. Through the mechanical operations of removing reacted sorbent from a reaction zone and returning it to the same or another reaction zone, the amount of virgin or unreacted sorbent that has to be introduced into the system is reduced. A sorbent may be recycled this way several times before regeneration is necessary due to the reduction in available reaction sites on the surface of sorbent particles. This represents significant cost savings and more economical and complete use of the sorbent.

During operation, the surfaces of sorbent particles may become obstructed, for example, by compaction or agglomeration. The physical manipulation and handling of the reacted sorbent re-orients the particles making unexposed surfaces available to capture targeted pollutants.

Figure 28:
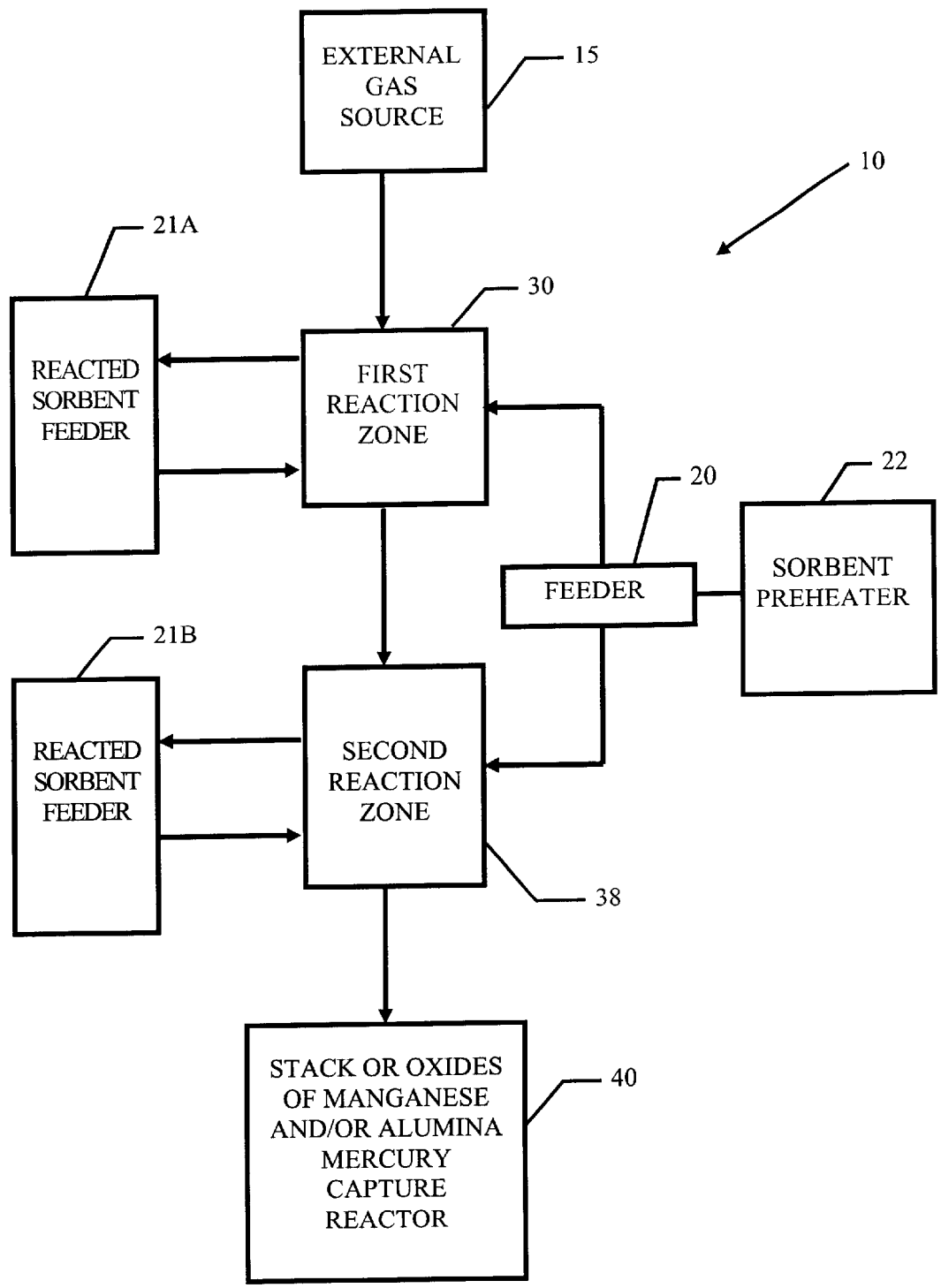
FIG. 28 is a block diagram of system according to the invention.

The recycling of reacted sorbent in this way may proceed as shown in FIG. 4 in a counter-flow manner as discussed above. Recycling may also proceed by removing reacted sorbent from a reaction zone conveying it to a reacted sorbent feeder and introducing or re-introducing the reacted sorbent into the same reaction zone. This is shown in FIG. 28, where reacted sorbent feeder 21A receives reacted sorbent conveyed from the first reaction zone 30 and reacted sorbent from reacted sorbent feeder 21A is re-introduced into the first reaction zone 30. Further, reacted sorbent from second reaction zone 38 is conveyed to reacted sorbent feeder 21B and re-introduced into the second reaction zone 38. This may be desirable where a first targeted pollutant is being captured in the first reaction zone and a second targeted pollutant is being captured in the second reaction zone. If, for example, $SO_X$ is being captured in the first reaction zone 30, the $SO_X$ reacted sorbent when it is spent or ceases to be effective for $SO_X$ removal, can then be routed for regeneration and recovery of sulfates as alkali or ammonium sulfate, useful commercial product. Similarly, if $NO_X$ is the pollutant being captured in the second reaction zone 38, the $NO_X$ reacted sorbent can be removed when it ceases to be effective for $NO_X$ removal and directed for regeneration and recovery to produce alkali or ammonium nitrates, again, useful commercial by-products.

Figure 5:
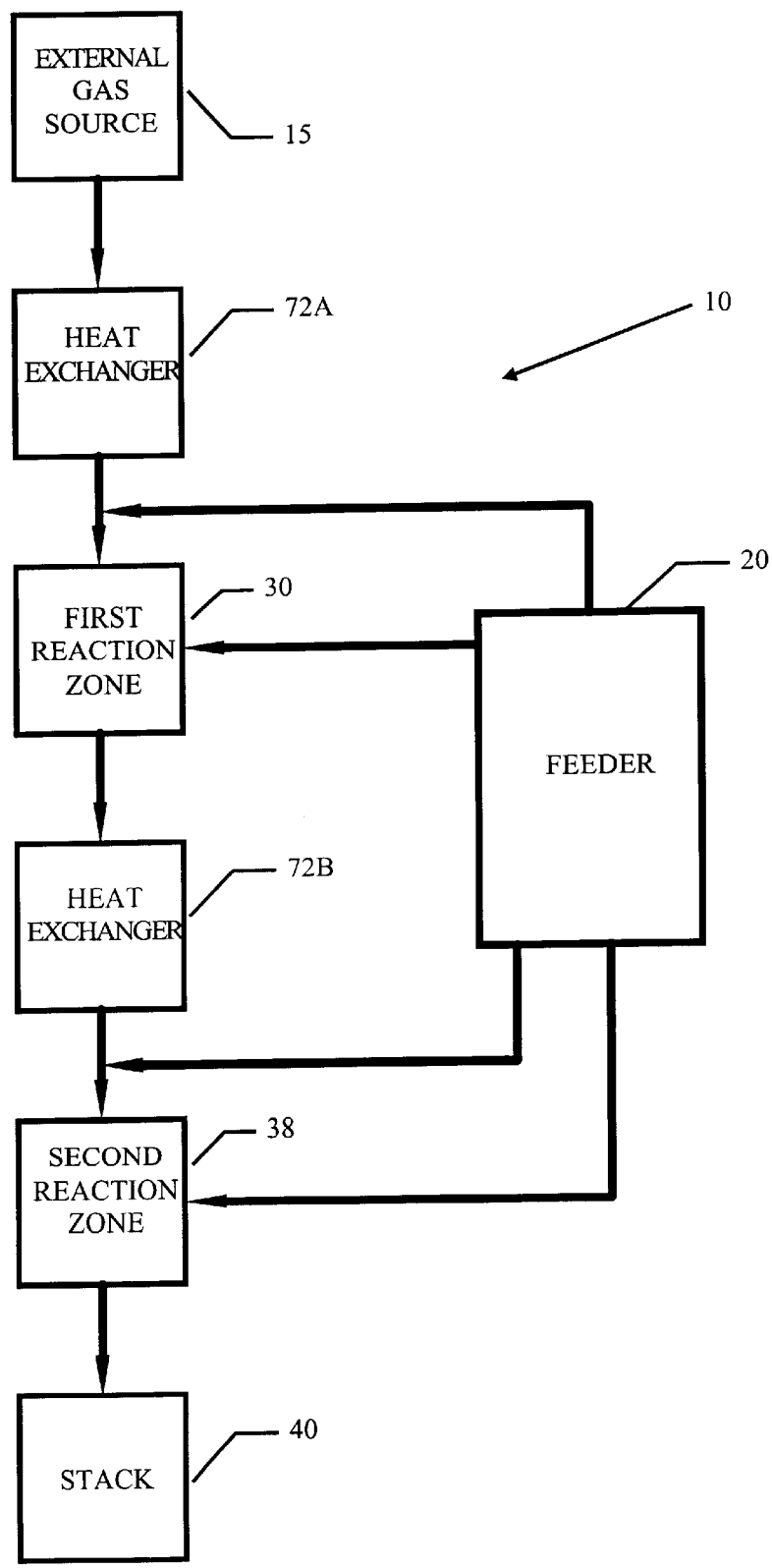
FIG. 5 is a block diagram showing a system according to the invention.

Capture rates may be affected by the gas inlet temperature as it enters a reaction zone and may need to be adjusted, cooled or heated to achieve a desired capture rate for $SO_X$ and/or $NO_X$. This can be accomplished with a heat exchanger. As is illustrated in FIG. 5, the system may further include a heat exchanger preceding each reaction zone of a system of the invention. In FIG. 5, the system of the invention as illustrated is substantially the same as the illustration of FIG. 1, depicting first and second reaction zones 30 and 38, feeder 20, external gas source 15, and stack 40. In FIG. 5, heat exchangers 72A, 72B have been introduced into the system before each reaction zone. The heat exchangers 72A, 72B may be utilized to heat or cool the gas stream prior to entry into each reaction zone. As the gas enters into the system, if the gas temperature is above the thermal decomposition temperature(s) of either sulfates of manganese or nitrates of manganese, the heat exchangers 72A, 72B will operate to cool the gas to a desired temperature based upon whether $SO_X$ capture or $NO_X$ capture is the primary pollutant captured in the reaction zone. Similarly, if the gas were below a desired temperature set point, the heat exchangers 72A, 72B will operate to heat the gas to the desired temperature. The heat exchangers 72A, 72B may be a gas-to-gas cooler or a heater unit, or other suitable means for accomplishing heating and cooling of gases to assure that the gas inlet temperature at a targeted temperature or within an acceptable range.

As previously mentioned above, the gases entering the system from external gas source may be any of a variety of process or industrial gases. These gases when generated encompass a range of temperatures. Due to simple economics and the design of various plants and facilities for efficient use of waste heat which is captured or transferred to provide heat for various processes at a facility, these process gases will typically have a temperature ranging from 250° F. to 350° F. or 120° C. to 180° C. In less typical situations, these gases may have temperatures upwards of 1000° F., or 540° C. Gases at these temperatures are readily processed in the systems of the invention and the heat exchangers 72A, 72B can be utilized to maintain the gas within these temperature ranges if desired. The system can also process gases at much higher temperatures such as 1000° F. For purposes of $SO_X$ and $NO_X$ capture, the gas temperature should not exceed, respectively, the thermal decomposition temperature(s) of sulfates of manganese and nitrates of manganese. Given that different forms or species of these sulfates and nitrates, the thermal decomposition temperature would depend upon the species formed during capture. It has been reported that that sulfates of manganese may thermally decompose at temperatures approximating 950° C. Similarly, nitrates of manganese are believed to thermally decompose at temperatures ranging up to 260° C. The system of the invention can process gases approaching these thermal decomposition temperatures. But, more typically, the system in practice will be operated in temperature ranges approximating those of process gases from industrial sources.

Heat or waste heat from the process gases of a facility may be utilized in the regeneration and recovery processes discussed herein below. Further, the waste heat may be utilized for purposes of sorbent preheating which serves to "activate" sorbent prior to introduction into a reaction zone. Although the exact mechanism of activation is not known, it is generally known that oxides of manganese can be "activated" with heat. Thus, as can be seen in FIG. 28, a system according to the invention may further include a sorbent preheater 22 which may actually be part of or separate from sorbent feeder 20. The source of heat for the sorbent preheater may be any heat source, but waste heat from facility processes can be economically efficiently utilized for this purpose.

Figure 14:
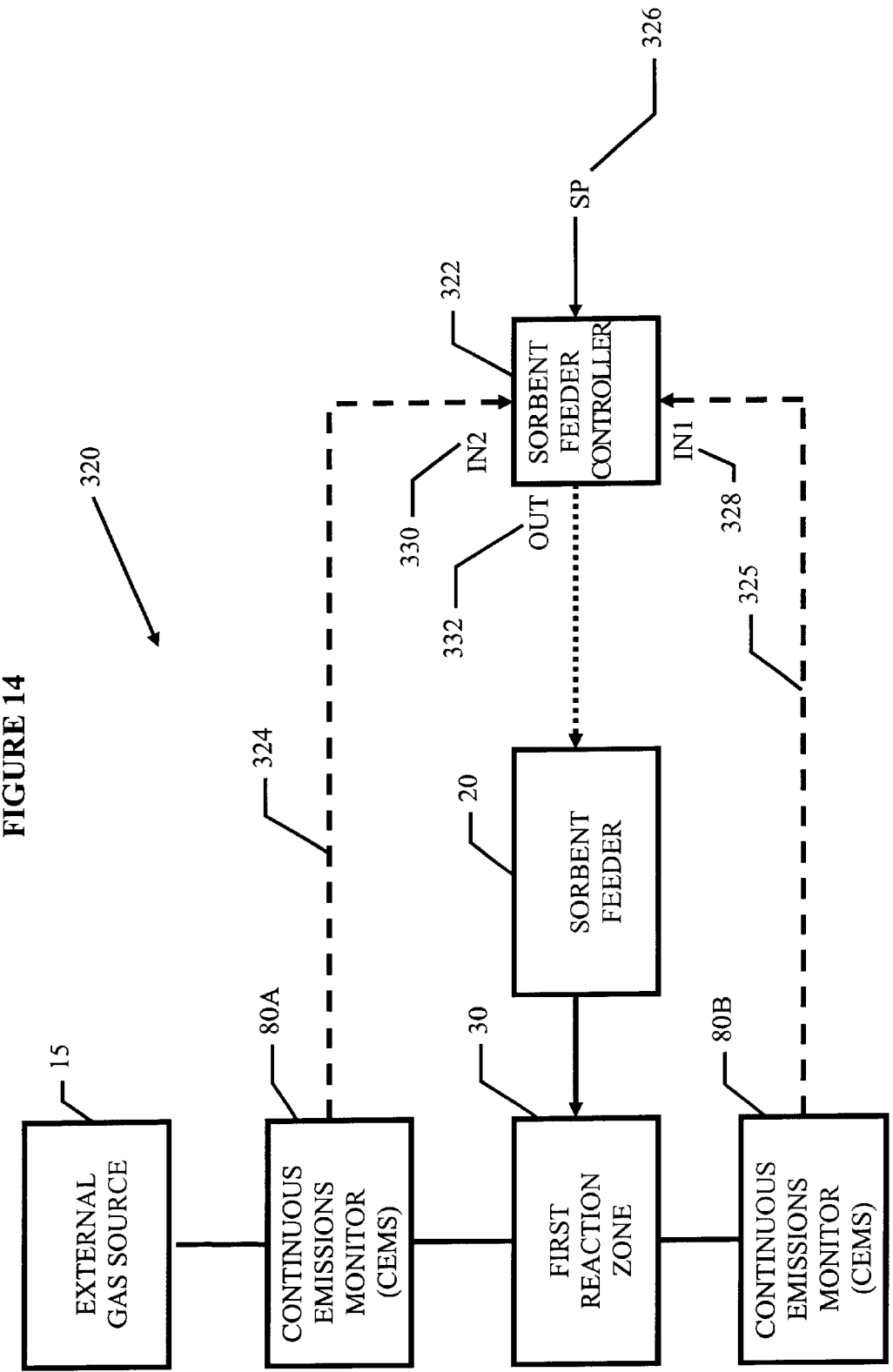
FIG. 14 is a block diagram of a system according to the invention.

The $SO_X$ and/or $NO_X$ capture rate may be regulated by the amount of sorbent fed into the reaction zones. In order to regulate capture rate, gas measuring devices, such as continuous emission monitors (CEMS), are utilized to measure the composition of the gas at the inlet to the reaction zone and at the outlet of the reaction zone. With reference to FIG. 14, the gas flows from the external gas source 15 and past CEMS 80A where the gas composition is measured prior to entry into first reaction zone 30. Another CEMS 80B is provided after the first reaction zone 30 to measure the concentration of the gas substantially stripped of $SO_X$ and/or $NO_X$ as it passes from the first reaction zone 30. As in FIG. 1, the gas may be vented to a stack 40, passed to a second reaction zone 38, or another system unit for further processing.

In the system of the invention, a bag house may serve as a reaction zone and/or as a solid gas separator, since bag houses are solid-gas separators. A conventional, commercially available bag house 82 is depicted in FIGS. 6 through 9. FIG. 6 is a perspective view of a bag house 82. FIG. 7 is an end elevation view showing a bag house 82. FIG. 8 is a top plan view of a bag house 82. FIG. 9 is a side elevation view of a bag house 82. Within the bag house 82 are a plurality of bags 88 also referred to as filter fabric bags shown in FIGS. 7 through 9. As can be seen in FIGS. 7 through 9, the bag house 82 has a plurality of filter fabric bags 88 suspended therein. Typically, they are suspended from a frame or support structure at the top of the bag house 82. The filter bags 88 may be of various shapes, e.g., conical or pyramidal, and include an internal frame and suitable fabric filter. Those skilled in the art would be able to select suitable filter fabric materials from those commercially available. Gas and entrained sorbent enters the bag house 82 through the bag house inlet 92, shown in FIGS. 7 through 9, and by virtue of an applied differential pressure, gases are forced through the fabric of the bags 88 and the entrained sorbents are separated from the gas by forming a filter cake on the surface of the bags 88. The filter cake thus formed is a reaction medium where pollutants are contacted with and removed by the sorbent. The commingled gases and sorbents move vertically upward and contact the fabric and/or the filter cake formed thereon. The bags 88 are configured to permit the gases to be directed from the outside to the inside of the bags to a conduit at the top of the bag house 82 and then to the bag house outlet 98, shown in FIGS. 6 through 9.

While the bag house 82 is in operation, the filter bags 88 may be periodically pulsed or otherwise agitated in order to adjust differential pressure across the bag house 82, which frees some or all of the filter cake and allows gas to flow more freely through the filter cake and the fabric filter bags. If the filter cake is allowed to get too thick, excess differential differential pressure across the bag house or the system of the invention may result. Thus, the pulse intensity or frequency can be utilized to regulate or adjust differential pressure. When the bag house 82 is taken off line, the bags 88 may be pulsed to free the bags 88 of virtually all reacted and unreacted sorbent not otherwise removed during normal operations. The reacted and unreacted sorbent or filter cake fall from the bags 88 by gravity into a hopper 112 (seen in FIGS. 7 and 9) at the bottom of the bag house 82 for subsequent removal from the bag house hopper 112. Removal from the hopper 112 may be accomplished with a screw conveyor or by other appropriate means, even manually.

A thicker filter cake will lead to increased removal efficiency, but at the price of extra power required to force the external gas source through the reaction zone. In one example, more power is required for an induction fan to pull exhaust gases through the bag house when the filter cake thickness is greater. The differential pressure may thus be maintained at an optimal level, trading off increased power requirements against the increased pollutant removal. In addition, the thicker the filter cake the longer the residence time of the sorbent material in the system. Longer residence time of the gas in the filter cake results in better removal efficiencies. Higher sorbent loading rates results in less material that will have to be regenerated. This may also be taken into consideration in setting the differential pressure set point.

In FIGS. 7 and 9, the plurality of filter bags is shown in position within the bag house. Also shown near the top of the bag house 82 is a pulse valve 124 utilized to pulse the fabric bags 88 in order to reduce filter cake thickness or to free the filter cake from the bags 88. The bag house may be provided with a number of pulse valves 124. During operation, these pulse valves 124 may be activated sequentially or randomly in order to pulse the bags 88 in order to regulate and control differential pressure across the bag house 82 or the system as a whole. When the bag house is taken off-line, the bags may be pulsed to free the bags of virtually all filter cake so that reacted and unreacted sorbent may be removed.

Figure 10:
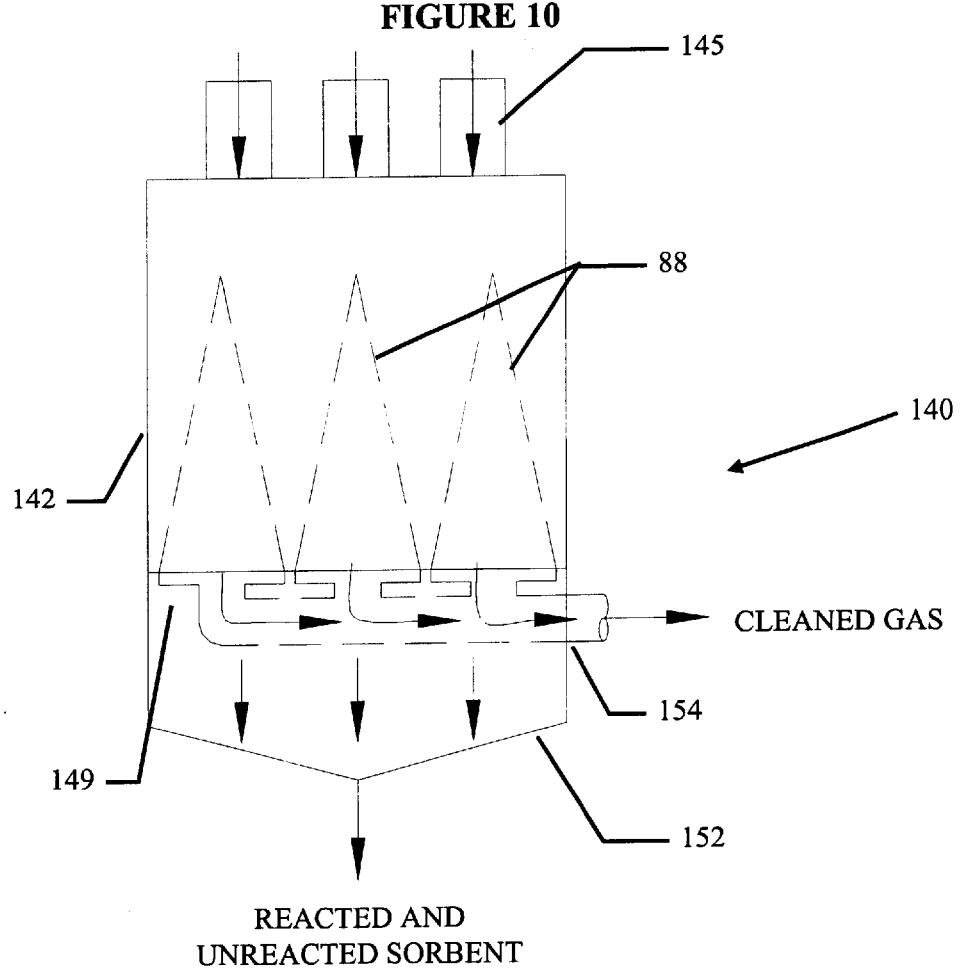
FIG. 10 is a sectional view of an inverted bag house according to the invention.
Figure 11:
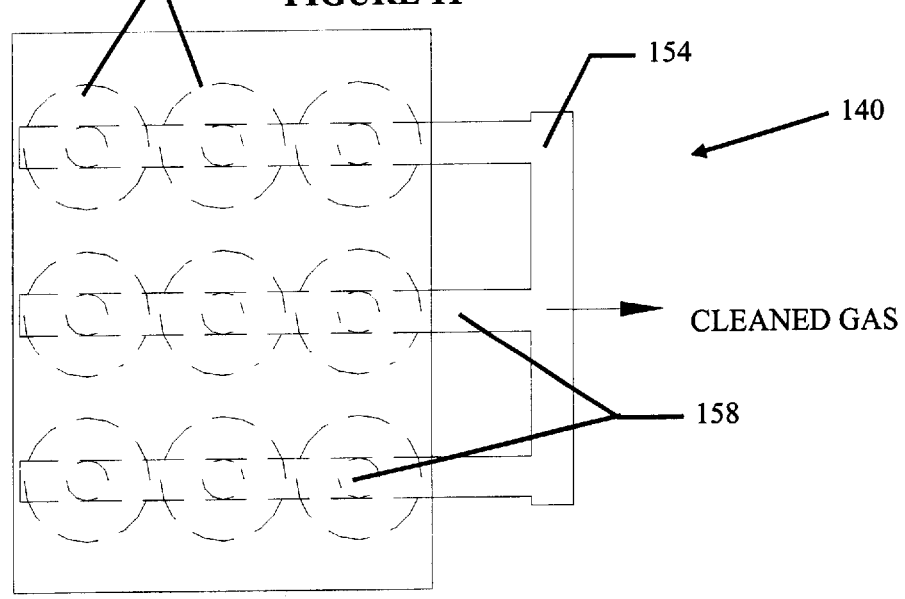
FIG. 11 is a top plan view of an inverted bag house according to the invention.

The bag house illustrated in FIGS. 6 through 9 is of a conventional design. In FIGS. 10 and 11, a novel bag house according to the invention is illustrated. This bag house, which can be utilized in the system of the invention, is referred to as an inverted bag house 140. The inverted bag house 140 eliminates the need for high can velocities, and permits downward, vertical flow of gases and reacted and unreacted sorbent. The inverted bag house 140 is comprised of a bag house housing 142, at least one inlet 145, a plurality of fabric filter bags 88, a support structure 149 for the filter bags, a hopper 152 to receive and collect reacted and unreacted sorbent, an outlet 154, and a conduit 158. The bag house housing permits the introduction of gases and reacted and unreacted sorbent entrained in the gases, has a top and a bottom and is configured for gases to flow vertically downward from the top to the bottom of the bag house. The inlet 145 is located near the top of the bag house housing and is configured for the introduction of gases and reacted and unreacted sorbent entrained in the gases into the bag house. The plurality of fabric filter bags 88 are configured to allow gas to flow from the outside of the bags 88 to the inside of the bags 88 under an applied differential pressure and to prevent the passage of reacted and unreacted sorbent from the outside to the inside of the bags 88, thereby separating reacted and unreacted sorbent from the gas and forming a filter cake on the bags 88. The support structure 149 is configured to receive and support the fabric filter bags 88 and to provide openings through which reacted and unreacted sorbent may be freely passed downward into the hopper 152 by gravity. The hopper 152 is configured to receive the reacted and unreacted sorbent and to permit the removal of the reacted and unreacted sorbent. The inverted bag house 140 also has an outlet 154 located near the bottom of the housing 142 below the bags 88 and above the hopper 152. The outlet 154 is connected to a conduit 158 located below the fabric filter bags 88 and positioned to receive gas passing through the fabric filter bags. Conduit 158 conveys gas to the outlet so that the gas may be vented or passed from the inverted bag house 140.

Figure 12:
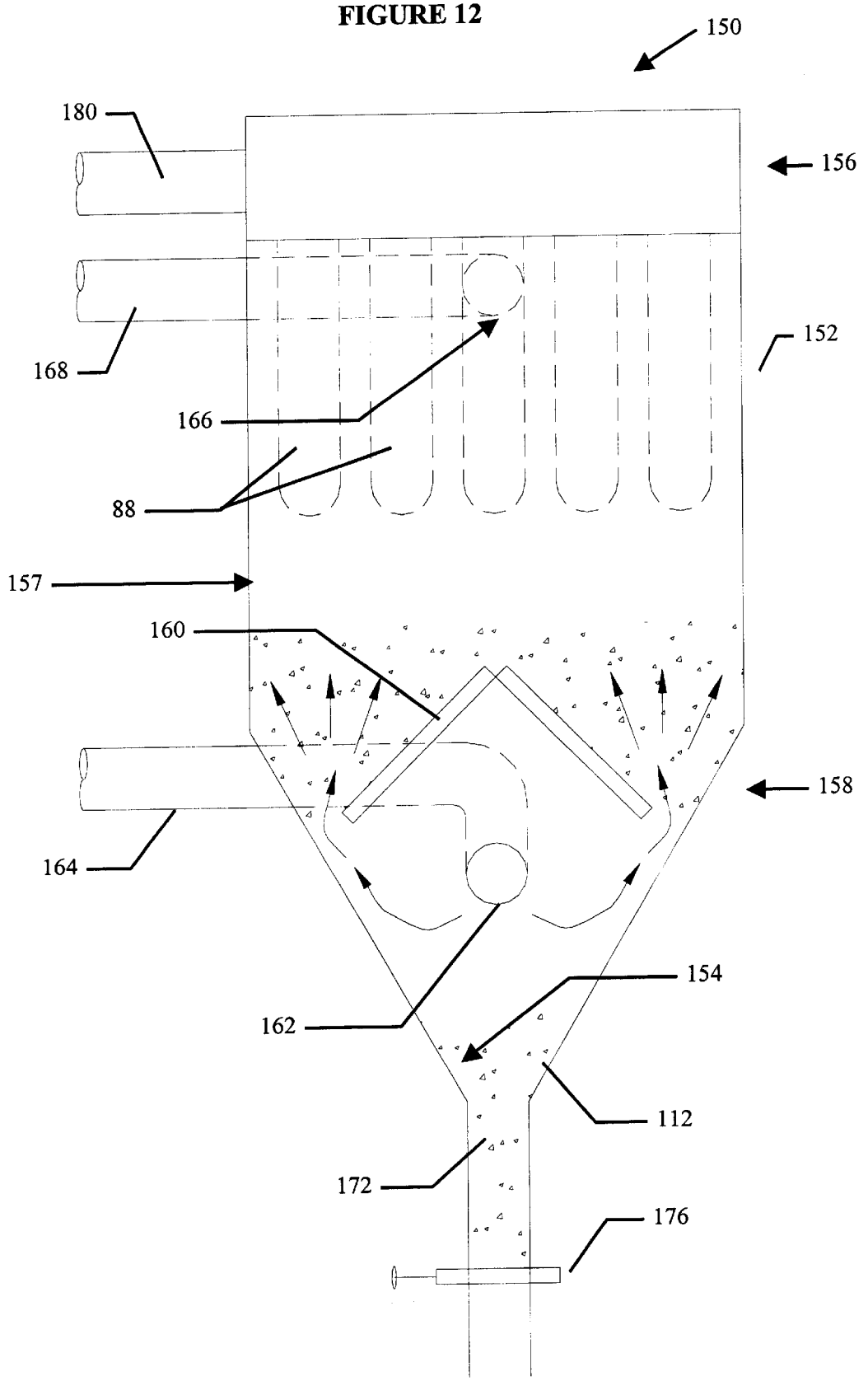
FIG. 12 is a flow diagram of a bag house reactor according to the invention.

In FIG. 12, a bag house reactor 150 of the invention is illustrated. This bag house reactor 150 can also be utilized in the system in place of a conventional bag house. The bag house reactor 150 has interior surface 154 and exterior surface 152. It may be viewed as having an upper section 156, central section 157 and lower section 158. Generally located in the central and/or lower sections 157, 158 is a variable venturi 160. The purpose of the variable venturi 160 is to adjust the velocity of gas flowing through the venturi opening within the bag house reactor 150. The variable venturi 160 is configured to adjust the position of the variable venturi by varying the space or distance between the variable venturi 160 and the interior surface 154 of the bag house reactor 150. In order to vary position a variable venturi position detector 367 shown in FIG. 23) for determining the position of the variable venturi 160 and a variable venturi positioner 368 (shown in FIG. 23) for adjusting the position of the variable venturi 160 are provided.

With the variable venturi 160 contacting the interior surface 154 of the bag house reactor 150, gas cannot flow from the lower section 158 to the central and upper sections 156, 157 of the bag house. By opening the space between the variable venturi 160 and the interior surface 154, gas is allowed to flow through the reactor 150. Gas introduced through gas distribution conduit 164 and the gas distribution port 162 flows from the lower section 158 to above the variable venturi 160 and into the central and upper sections 156, 157, and to the filter bags 88. When the space between the variable venturi 160 and the interior surface 154 is wide, the gas flows at lower velocities which allows some of the sorbent suspended above the variable venturi 160 to fall into the hopper 112.

There is also a sorbent distribution port 166 connected to a sorbent feed conduit 168. The sorbent distribution port 166 is positioned above the variable venturi 160 to allow the introduction of sorbent into the upper section 156 of the bag house reactor 150. The sorbent distribution port 166 is configured to allow introduction of sorbent into the bag house. Port 162 is configured to allow introduction of gas into the bag house reactor.

The bag house reactor 150 has a plurality of fabric filter bags 88 secured therein. The fabric filter bags are mounted in the upper section 156 of the bag house reactor 150 and extend downward into the central section 157. At the bottom of the bag house reactor in the lower section 158, is a sorbent hopper 112 where reacted and unreacted sorbent is collected. The sorbent hopper is connected to outlet 172. Outlet 172 has an outlet valve 176 which in the open position allows for the removal of sorbent from the hopper 112. A vent 180 is located in the top section 156 of the bag house reactor 150. Gases flowing through the bag house reactor 150 pass from the bag house reactor 150 through the vent 180 and may be directed on for further processing or venting to the atmosphere.

Sorbent entrained in gases containing pollutants such as $SO_X$ and $NO_X$ can begin reacting with the sorbent during transport in the sorbent feeder conduit 168. Since $SO_X$ is more reactive than $NO_X$, the more reactive $SO_X$ is primarily captured while it is being transported to the bag house reactor 150 in the first sorbent feeder conduit 164. At lower gas velocities the larger solids will abrade into finer solids and re-fluidize. The finer solids will travel upward through the opening between the variable venturi 160 and the interior surface 154 where the sorbent is suspended to create a pseudo fluidized-bed above the variable venturi 160 and the finest particules will travel upwards to form a filter cake on the surface of the fabric filter bags 88. By adjusting the position of the variable venturi 160 increasing or decreasing the space between the variable venturi 160 and the interior surface 154 of the bag house reactor 150 gas velocity is correspondingly decreased or increased. In operation, the variable venturi may be positioned to achieve a gas velocity sufficient to suspend a selected coarse fraction sorbent just above the orifice to create a pseudo-fluidized bed which may primarily or preferentially capture $SO_X$, since $SO_X$ is more reactive than $NO_X$. Partially stripped gas flows upward from the pseudo-fluidized bed carrying the finer fraction sorbent onto the filter bags. The resulting filter cake provides a reaction medium where "slower" reactions, such as $NO_X$ removal may occur. The variable venturi 160 position may be adjusted to achieve the desired thickness of filter cake on the fabric bags 88 thereby increasing or decreasing the differential pressure across the system also to balance overall differential pressure by changing the venturi restriction. The fabric filter bags 88 may also be pulsed to partially remove filter cake and thus regulate differential pressure. The gas flow rate entering port 162 can be adjusted to regulate upward gas velocity so that the bags 88 may be pulsed to allow some of the loaded sorbent to fall into the hopper 112 without being reentrained in the gas or redeposited on the bags 88.

Using the variable venturi 160, one can operate the system so that sorbent suspended above the venturi, loaded with the faster reacting gases, can primarily be captured by falling to the hopper before being carried up to the filter bags 88. The fraction of sorbent loaded with faster reacting gases can then be removed from the hopper 112 by opening the outlet valve 176 so that that fraction may be removed from the hopper 112 through the outlet 172. Later the fabric filter bags 88 can be pulsed to release the sorbent loaded with slower reacting gases which would then fall through the variable venturi 160 into the hopper 112. The sorbent loaded with slower reacting gases could then be removed from the hopper through loaded sorbent outlet 172 after the outlet valve 176 has been opened. This could allow for the separate processing of the different loaded sorbent fractions to regenerate the sorbent and produce useful by-products.

Differential pressure, which represents sorbent filter cake thickness, is only one of several process parameters that can be controlled in the system in order to achieve desired levels of $SO_X$ and $NO_X$ removal efficiencies and cost advantages of the system. $NO_X$ and $SO_X$ removal efficiency may be regulated by various processes, including sorbent feeder rate and temperature control at the inlet to the reaction zones of the system. These controls are achieved by the control sub-elements or electronics, which include hardware and software and also are referred to herein below as control loops.

Figure 13:
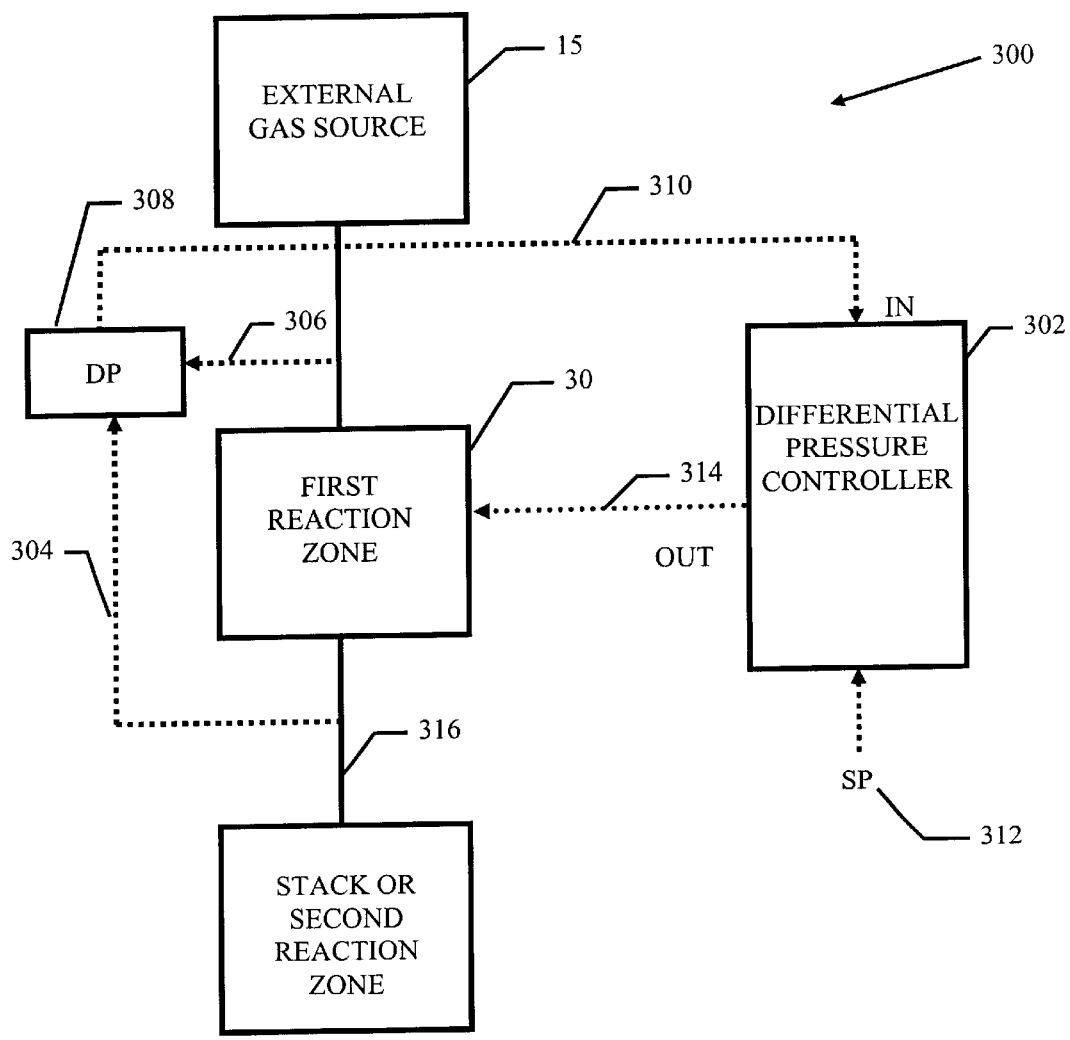
FIG. 13 is a block diagram of a system according to the invention.

Referring now to FIG. 13, a differential pressure control loop 300 is illustrated. External gas source 15 is illustrated feeding first reaction zone 30, which in turn feeds generally an output gas stream 316, which can feed either stack 40 or second reaction zone 38. The differential pressure across first reaction zone 30 may be measured as illustrated as difference in pressure between the inlet pressure 306 and the outlet pressure 304. In the example illustrated, inlet pressure 306 and outlet pressure 304 feed a differential pressure cell 308, which sends a differential pressure signal 310 to a differential pressure controller 302.

Differential pressure controller 302 can be any appropriate controller, including a proportional integral derivative (PID) controller. As used herein, PID controllers may be understood to operate using any combination of the proportional, integral, and derivative components. Differential pressure controller 302 can accept a set point 312, indicating the desired differential pressure across first reaction zone 30. Set point 312 can be human or computer generated. As discussed below, differential pressure controller 302, and other controllers, may be implemented as a stand-alone controller, distributed control system, as a PD block in a programmable logic controller (PLC), or as a set of discrete calculations within a PLC. Differential pressure controller 302 generates an output signal or output 314 to control the differential pressure across first reaction zone 30. In embodiments where first reaction zone 30 includes a bag house or uses solids-filtering media, differential pressure controller 302 output signal 314 may control the shaking, pulsing, or other removal of sorbent which has formed a filter cake on the filter medium.

In one embodiment, first reaction zone 30 includes numerous filter bags which can have an exterior containing sorbent material and an interior having a lower pressure, acting to pull the sorbent material against the bag filter media. In one example of the invention, a compressed air jet, pulse valve 124, is periodically discharged within the interior of the filter. In one embodiment, the compressed air pulse is sufficiently strong to dislodge a portion of caked sorbent material from the filter material even during normal operation of the bag house, not requiring the shut down of the bag house. In one embodiment, the individual bags are sequentially pulsed to dislodge a portion of caked sorbent material. The frequency of the pulsing may be increased in order to maintain a thinner filter cake thickness. Thus, increasing the frequency of the periodic pulsing of each filter bag will maintain a smaller filter cake thickness, and thus result in a smaller differential pressure across the bag house as a whole. In one embodiment, filter bags are grouped by row, with each row periodically pulsed at the same instant. In some embodiments, output 314 from differential pressure controller 302 includes a frequency for pulsing filters within a bag house reaction zone. Differential pressure controller 302, in response to a higher differential pressure than set point, may increase the frequency of filter pulsing through output 314. Conversely, in response to a lower differential pressure than set point, differential pressure controller 302 may decrease the frequency of filter pulsing through output 314.

In one embodiment, the individual filter bags are formed of cylindrical filter media disposed about a rigid cylindrical cage, with the compressed air jet, pulse valve 124, disposed within the cylindrical rigid cage. After a period of time, the sorbent material filter cake builds up on the outside of the filter media, forming a thick filter cake. The pulsed air jet can force the filter media momentarily away from the cylindrical rigid cage, thereby cracking the caked sorbent material and dislodging it, thereby allowing the sorbent material to fall under gravity to be collected and removed from the reaction zone.

A thicker filter cake can lead to increased pollutant removal efficiency, but at the price of extra power required to force the external gas source through the reaction zone. In one example, more power is required for an induction fan to pull exhaust gases through the bag house when the filter cake thickness is greater. The differential pressure may thus be maintained at an optimal level, trading off increased power requirements against the increased pollutant removal. In addition, as the filter cake thickness increases the contact or residence time of the gas with sorbent material in the system increases, resulting in more complete reaction. Therefore less material will have to be regenerated. This may also be taken into consideration in defining the differential pressure set point.

Referring now to FIG. 14, an emissions control loop 320 is illustrated. A gas stream may be seen to flow from gas source 15, through a first continuous emission monitor system (CEM) 80A, then to first reaction zone 30, then to a second CEM 80B. A sorbent feeder 20 may be seen to feed material to first reaction zone 30. Feeder 20 may be a screw feeder having a variable speed screw, auger, pneumatic conveyor, or other method to move sorbent, within.

CEM 80A and CEM 80B can represent a $NO_X$ analyzer and/or a $SO_X$ analyzer. In one embodiment, CEM 80A is a chemiluminescent monitor, for example, Thermo Electron model 42H. In one embodiment, CEM 80A includes a $SO_X$ monitor such as Bovar Western Research model 921NMP, utilizing a spectrophotometric method. In some embodiments, CEM 80A and CEM 80B include both $NO_X$ and $SO_X$ analyzers. A feed controller 322 may be seen to accept a first input 328 from an outlet CEM signal 325. Controller input 328 may be used as a feedback signal to control the feeder rate. In some embodiments, a feeder controller 322 also has a second input 330 accepting an inlet measurement signal 324, also including pollutant concentration data. Second input 330 may be used to display the incoming gas concentrations and/or to calculate percentage removal set points in the system. Feeder controller 322 also accepts a set point signal 326, indicating the desired feed rate and/or the desired $NO_X$ or $SO_X$ concentration exiting first reaction zone 30. Feeder controller output 332 can be a variable frequency drive signal, among other available signals, to control the speed of feeder 20.

Feeder controller 322 may be any suitable controller, including a PID controller utilizing any combination of its individual modes. In one embodiment, set point 326 is set at a desired concentration for either $NO_X$ or $SO_X$, depending on the embodiment. The gas concentration signal 325 from CEM 80B can be used by feeder controller 322 to calculate output signal 332. When the gas concentration is higher than indicated as desirable by set point 326, output 332 can be increased to increase the speed of feeder 20, which will put more sorbent into first reaction zone 30, thereby dropping the pollutant concentration. Conversely, when pollutant gas concentration 325 is lower than required, feeder controller output 332 can be decreased to decrease the rate of sorbent addition from feeder 20 into first reaction zone 30.

Figure 15:
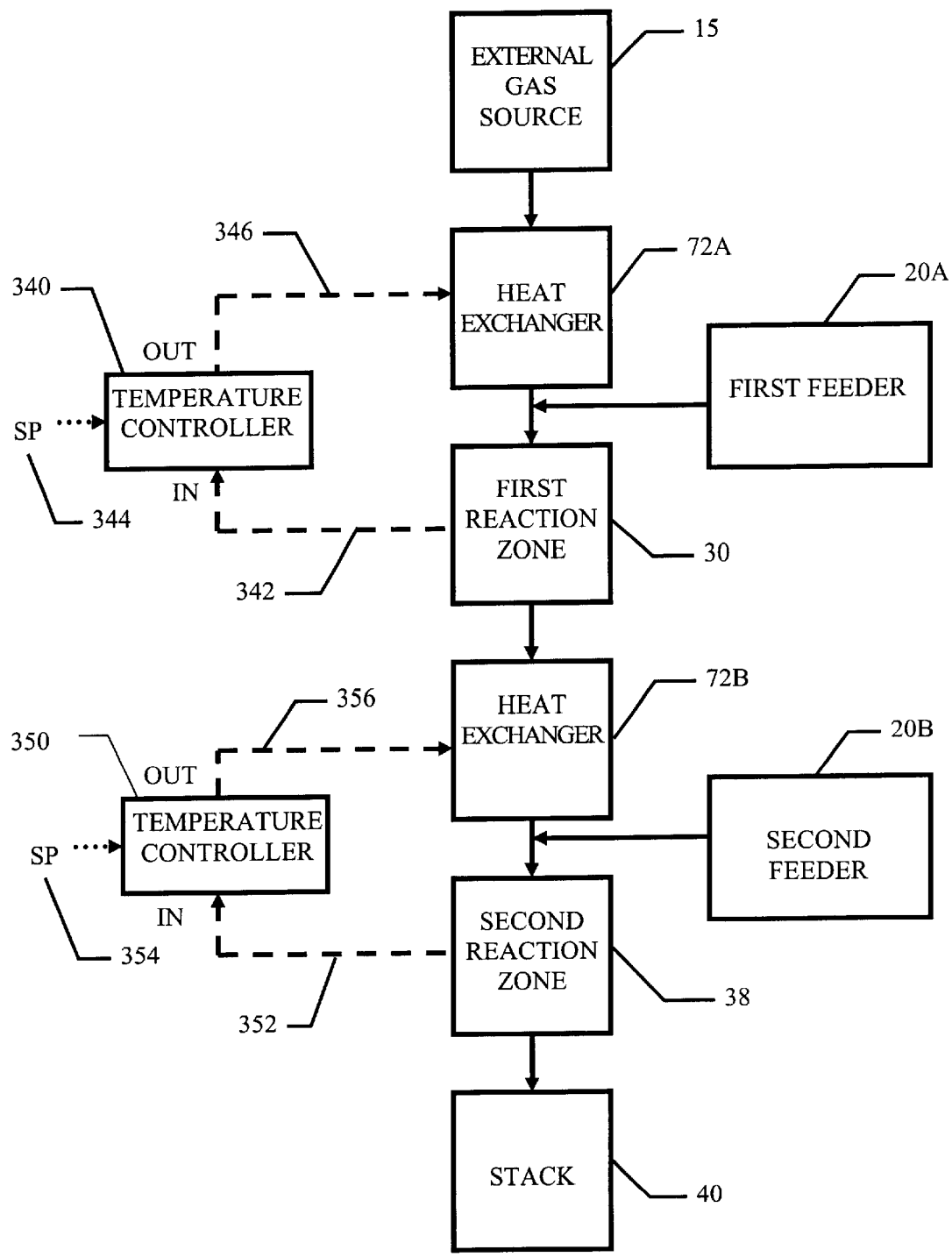
FIG. 15 is a block diagram of a system according to the invention.

Referring now to FIG. 15, the gas to be cleaned may be seen to flow from external gas source 15, through a first heat exchanger 72A, through first reaction zone 30, through second heat exchanger 72B, through a second reaction zone 38, and to stack 40. FIG. 15 illustrates a system having two reaction zones and two heat exchangers. The temperature to the first reaction zone 30 may be seen to be controlled by a first temperature controller 340, which accepts a set point 344 and a temperature input 342, and generates an output 346 to first heat exchanger 72A. As previously discussed, the maximum desired temperature in the reaction zone may depend on the thermal decomposition temperature(s) of the sulfates of manganese or nitrates of manganese, depending on whether $NO_X$ and/or $SO_X$ are being removed. Lower temperature set points will be above the dew point of the system and adjusted automatically or manually as needed. In one embodiment, the temperature to be controlled is measured at the reaction zone itself, rather than at the outlet from the heat exchanger, in order to more directly measure the temperature in the reaction zone. In one embodiment, temperature controller 340 output 346 may be a variable analog signal or other variable signals used to control a variable speed blower to control the outlet temperature from heat exchanger 72A. Temperature controller 340 may increase/decrease the cooling air passing through heat exchanger 72A when the temperature in first reaction zone 30 is greater/less than set point 344.

A second temperature controller 350 may be seen to accept a temperature input 352 from second reaction zone 38 and a set point 354, and to generate an output 356 for heat exchanger 72B. Second temperature controller 350 may be similar to first temperature controller 340. In one embodiment, heat exchanger 72B is used to cool the incoming gas, using ambient air as the cooling medium. As discussed previously with respect to temperature controller 340, second temperature controller 350 may increase/decrease the output to a variable speed drive coupled to a blower when the temperature of second reaction zone 38 is greater/less than set point 354.

FIG. 15 also illustrates how a first feeder 20A may feed material to first reaction zone 30. A second feeder 20B may be used to feed sorbent material to second reaction zone 38. First feeder 20A and second feeder 20B may be controlled as previously described with respect to feeder 20 in FIG. 14.

Figure 16:
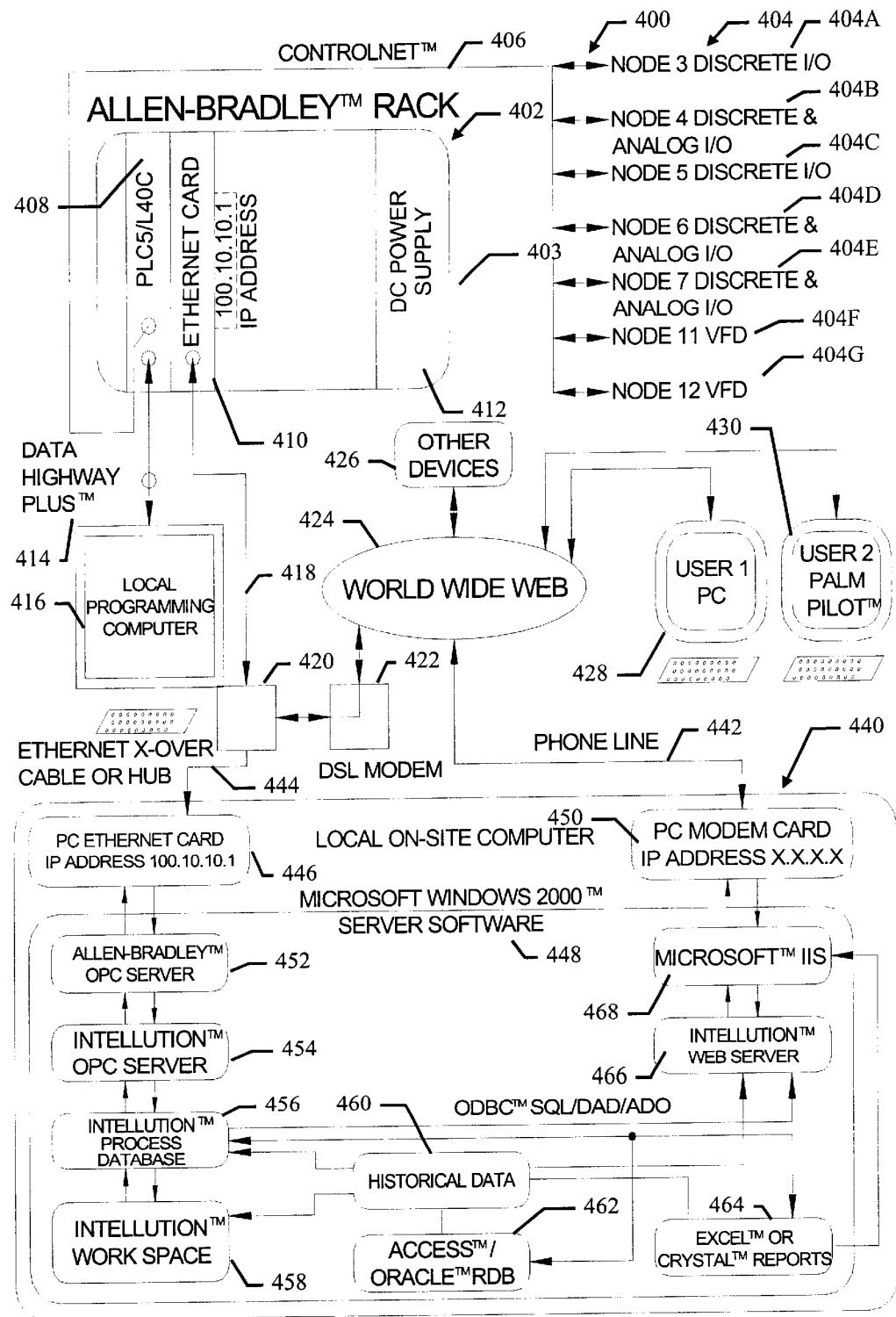
FIG. 16 is a flow diagram an electronic control system useful in the invention.

Referring now to FIG. 16, a control and data acquisition system 400 for controlling and monitoring the previously described processes is illustrated. System 400 may be seen to include generally a programmable logic controller (PLC) 402 and a local on-site computer 440. Both PLC 402 and local computer 440 may be coupled to the World Wide Web 424. PLC 402 and local computer 440 may be accessed over World Wide Web 424 by a user PC 428, a hand-held computer such as a Palm Pilot™ 430, and other devices 426 which can access World Wide Web 424.

PLC 402 may be seen to include a PLC rack 403. In one example, PLC 402 is an Allen-Bradley™ PLC. In one example, the Allen-Bradley™ PLC is a PLC 5. PLC rack 403 may be seen to include a PLC processor module 408, and Ethernet module 410, and a DC power supply 412. PLC 402 may be seen to include an input/output bus 406, for example a Controlnet™ bus 406, and input/output bus 414, shown as Data Highway Plus™ 414, which is connected to local programming computer 416. Bus 406, in the present example, may be seen to be coupled to numerous input/output cards 404. Input/output cards 404 may be seen to include a discrete I/O cards 404A, mixed discrete and analog 110 cards 404B, discrete I/O cards 404C, discrete and analog I/O cards 404D, more discrete and analog cards I/O 404E, a variable frequency drive card 404F, and a second variable frequency drive card 404G. The discrete 110 may be commonly used to accept inputs from discrete switches such as limit switches, and the output used to open and shut valves and to start and stop motors. The analog 110 may be used to accept input analog measurements from sensors and to control variable position output devices. The variable frequency drive outputs may be used to control variable speed motors, for example, variable speed motors used to control airflow pass the heat exchangers.

PLC 402 may be seen to be coupled to an Ethernet hub 420 via an Ethernet cable 418. In one embodiment, a DSL modem 422 enables Ethernet hub 420 to be accessed from World Wide Web 424. Local computer 440 may also be seen to be coupled to Ethernet hub 420 via an Ethernet cable 444. Ethernet cable 444 can be coupled to an Ethernet card 446. Similarly, local computer phone line 442 may be coupled to a PC modem card 450. The PC modem card can provide access to World Wide Web 424 when a DSL modem line is not available or is not functioning. Local computer 440 may be seen to include software or software component 448 which can include, for example, Microsoft Windows 2000™ as an operating system that is providing both server and terminal functionality. Software component 448 can include an Allen-Bradley™ OLE Process Control (OPC) module 452, as well as an Intellution™ OPC server component 454. The IFIX process monitoring and control package by Intellution™ is used in one embodiment. An Intellution™ process database component 456 may also be included. Allen-Bradley™ OPC server 452 can provide communication between local on-site computer and Allen-Bradley™ PLC 402.

Intellution™ OPC server 454 can provide communication between the Allen-Bradley™ inputs and outputs and the Intellution™ process monitoring and control system residing within local computer 440. Intellution™ process database 456 may be used to monitor and control the entire process. Intellution™ Work Space 458 may be used to allow access to monitor, display, and change current data, and a historical data area 460 may be used to trend historical process data. An Access™/Oracle™ PDB component 462 may also be included to provide database reporting. In one embodiment, a report module, for example, a Microsoft Excel™ or Crystal™ report component 464 may also be provided. In some embodiments, an Intellution™ web server component 466 is provided, as is a Microsoft™ Internet Information Server (IIS) module 468. In some embodiments, local on-site computer 440 has a local terminal or CRT as well to display, monitor, and change data residing in the Intellution™ Work Space 458.

In some embodiments, most or all of the controls discussed below in the present application are implemented within control system 400. In one embodiment, most or all controls are implemented within Allen-Bradley™ PLC 402. For example, PID control blocks can be implemented using provided Allen-Bradley™ PID blocks, or the blocks can be created from primitive mathematical operations using ladder logic. Control blocks such as the table blocks and selector blocks of FIGS. 24 and 25 may be implemented within Allen-Bradley™ PLC 402 using standard blocks. Local on-site computer 440 may be used to store and output values such as PID set points and selector switch values from local computer 440 to registers or control blocks within PLC 402. For example, the set points to heat exchanger, differential pressure, and feed rate control blocks may reside within local computer 440 and be downloaded to PLC 402. The set points may be obtained by local computer 440 from a local terminal and/or from World Wide Web 424 from devices 426, 428, and/or 430, protected by appropriate security. Local computer 440 can be used to provide historical trending, operator interface, alarming, and reporting.

Figure 17:
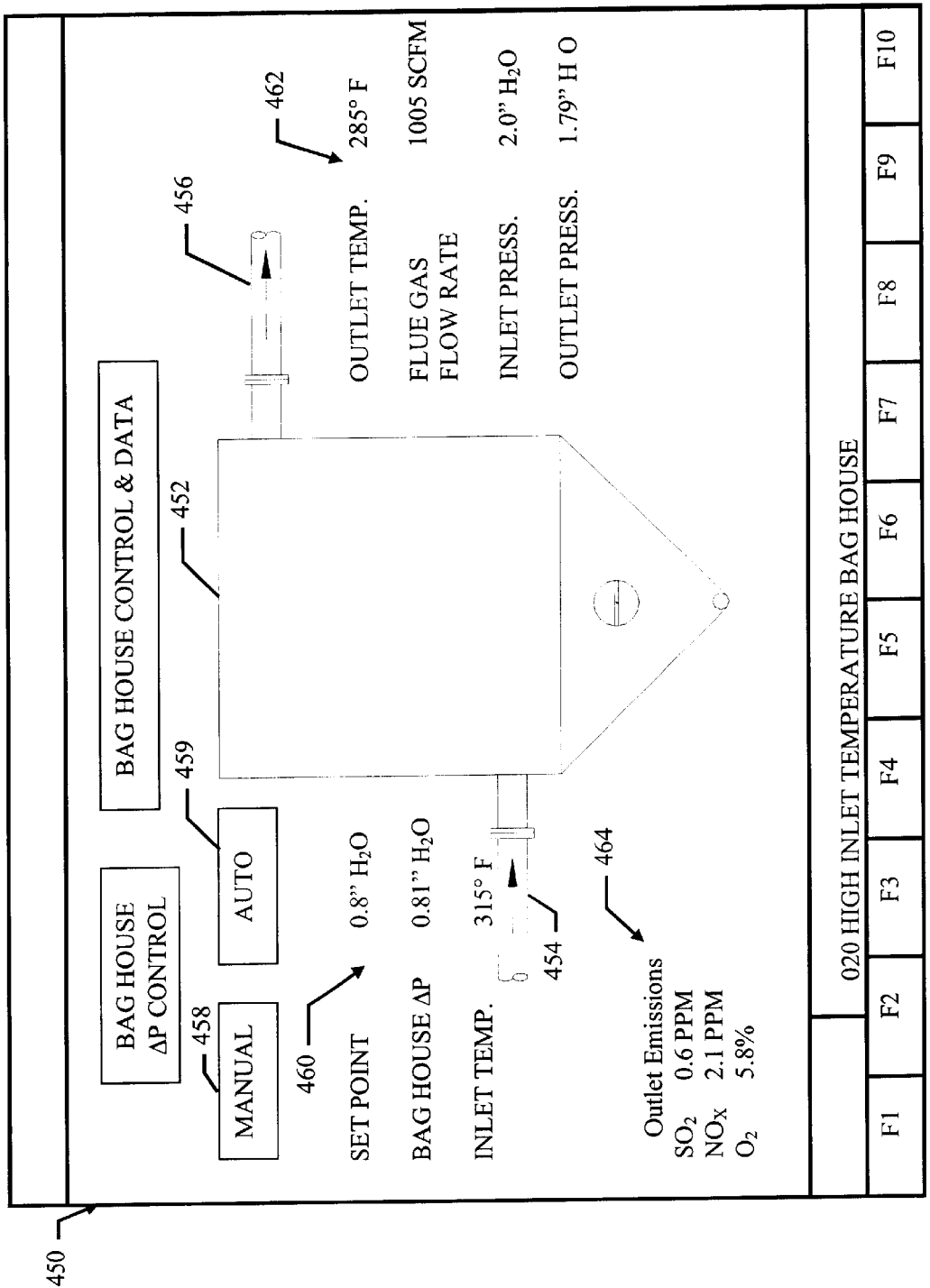
FIG. 17 is electronic control panel display.

Referring now to FIG. 17, a process graphic 450, as displayed on a human-machine interface is displayed. Process graphic 450 may be displayed, for example, on an Intellution™ IFIX system. Process graphic 450 can be updated in real time and can reside on a personal computer, for example. Process graphic 450 includes a manual switch 458 and an automatic switch 459 for controlling the control mode of the differential pressure across the bag house. Process graphic 450 also includes a table of values 460 including the differential pressure set point, the actual differential pressure and the inlet temperature to the bag house. An output table 462 is also illustrated, including the bag house outlet temperature, the flue gas flow rate, the inlet pressure to the bag house and the outlet pressure from the bag house. A bag house 452 is shown diagrammatically including an inlet 454 and an outlet 456. An outlet emission table 464 is also illustrated, including the $SO_2$, the $NO_X$ level, and the $O_2$ level. Process graphic 450 may be used to monitor and control the bag house differential pressure, as previously discussed.

Figure 18:
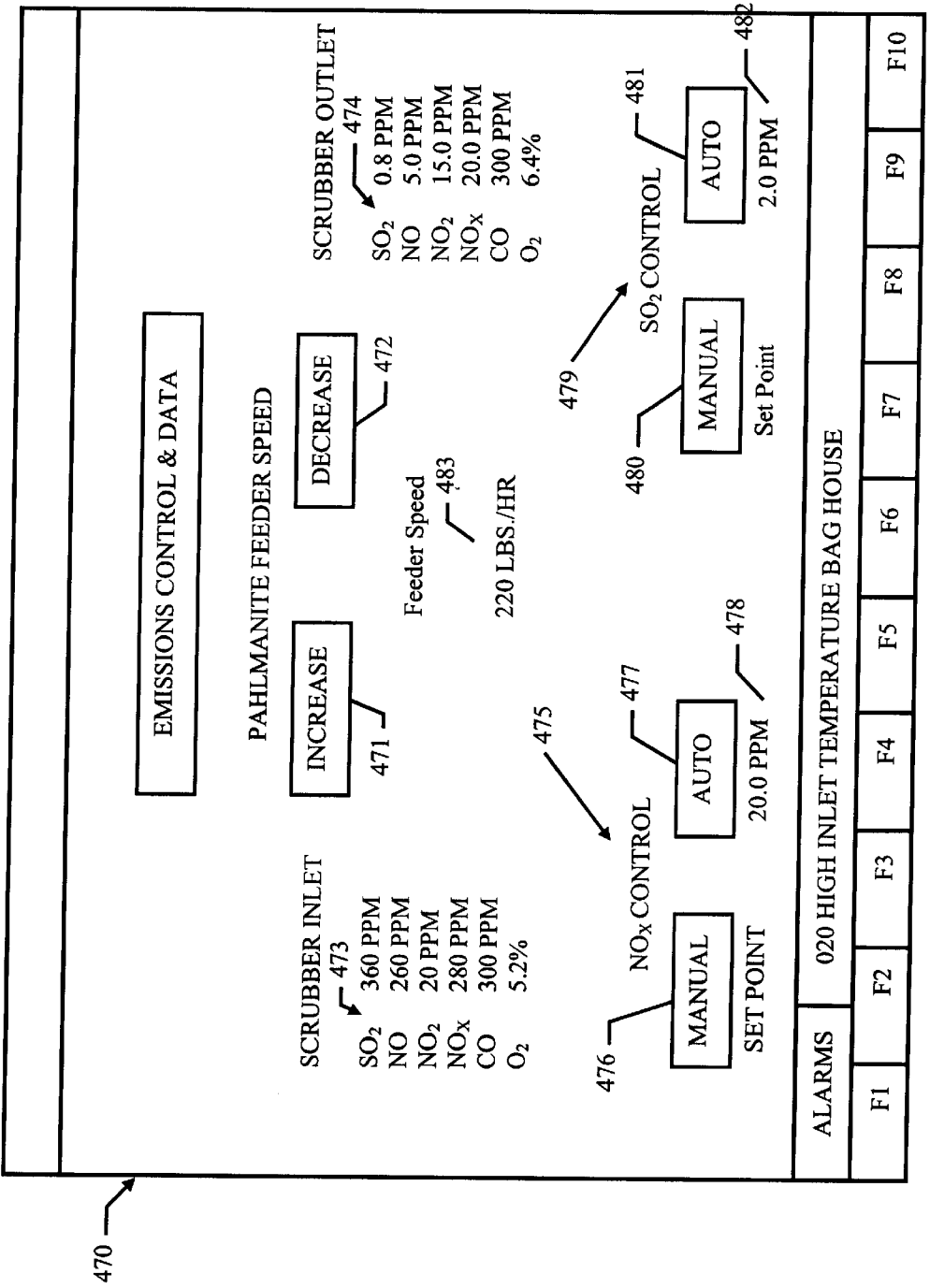
FIG. 18 is electronic control panel display.

Referring now to FIG. 18, a process graphic 470 is illustrated as may be displayed on an Intellution™ IFIX process graphic. Process graphic 470 can monitor and control the absorbent feeder speed, including an increase button 471 and a decrease button 472. The actual feeder speed in pounds of sorbent per hour is illustrated at feeder speed 483. A scrubber inlet table 473 is illustrated, including a $SO_2$ level, a NO level, a $NO_2$ level, a $NO_X$ level, a CO level, and an $O_2$ level. A scrubber outlet table 474 includes the same levels as the inlet, but at the scrubber outlet. A $NO_X$ control section 475 on the process graphic includes a manual button 476 and an auto button 477, as well as a set point 478. In automatic mode, set point 478 may be used to control the feeder speed using the $NO_X$ set point. Similarly, an $SO_2$ control section 479 includes a manual control button 480 and an auto control button 481, as well as a set point 482. In automatic mode, set point 479 may be used to control the feeder speed using the $SO_2$ set point.

Figure 19:
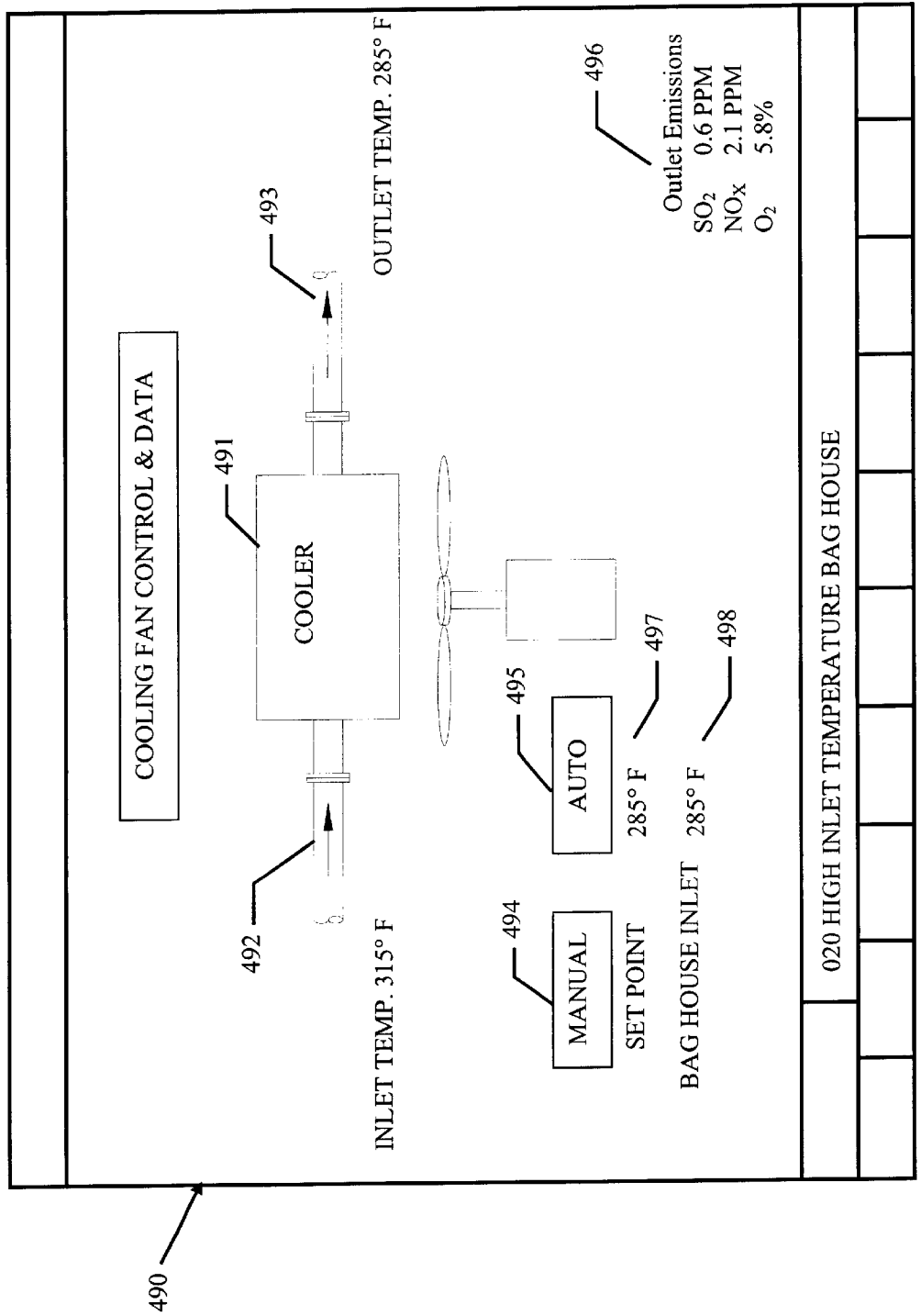
FIG. 19 is electronic control panel display.

Referring now to FIG. 19, a process graphic 490 is illustrated, as may be found on a process control and monitoring station. A cooler 491 is illustrated, having an inlet 492 and an outlet 493, with the inlet and outlet temperatures being displayed in real time. Cooler 491 may be a heat exchanger as previously discussed. Process graphic 490 includes a manual button 494 and an auto button 495. The bag house inlet temperature is displayed at 498 as is the cooler set point 497. When in the automatic mode, the fan speed may be controlled by a PID controller using set point 497. Process graphic 490 also includes an outlet emission table 496, including the $SO_2$ level, the $NO_X$ level, and the $O_2$ level.

Figure 20:
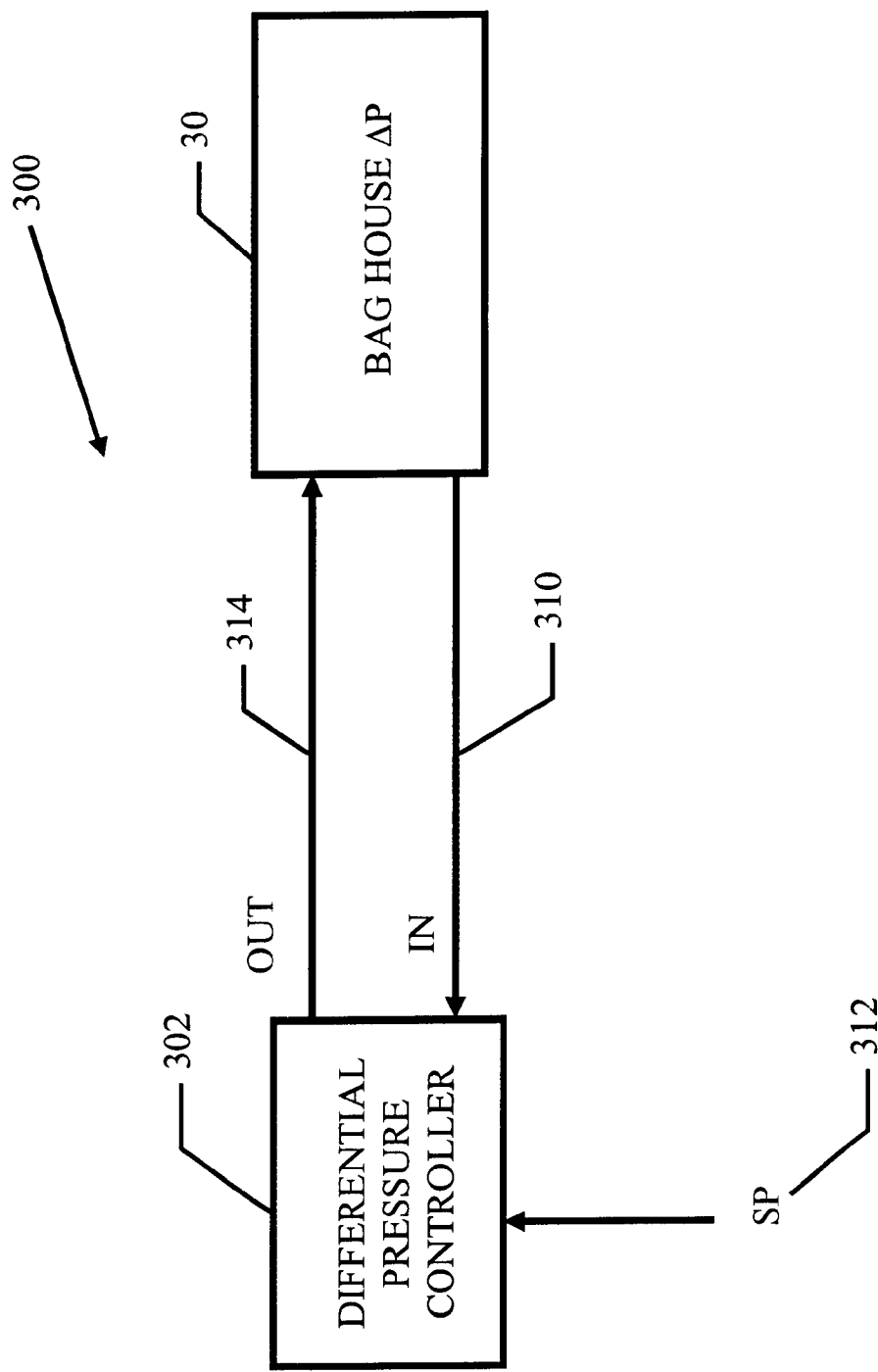
FIG. 20 is a block diagram of a control sub-element according to the invention for regulating differential pressure.

Referring now to FIG. 20, differential pressure control loop 300 is illustrated in block diagram form. Differential pressure controller 302 may be seen to accept set point 312 and actual differential pressure 310, and to generate output signal 314 to control the differential pressure across bag house 30. As previously discussed, differential pressure set point 312 may be set taking into account the desired pollutant removal target of the system, the power required to force gas through the filters, and the desired rate of sorbent replenishment.

Figure 21:
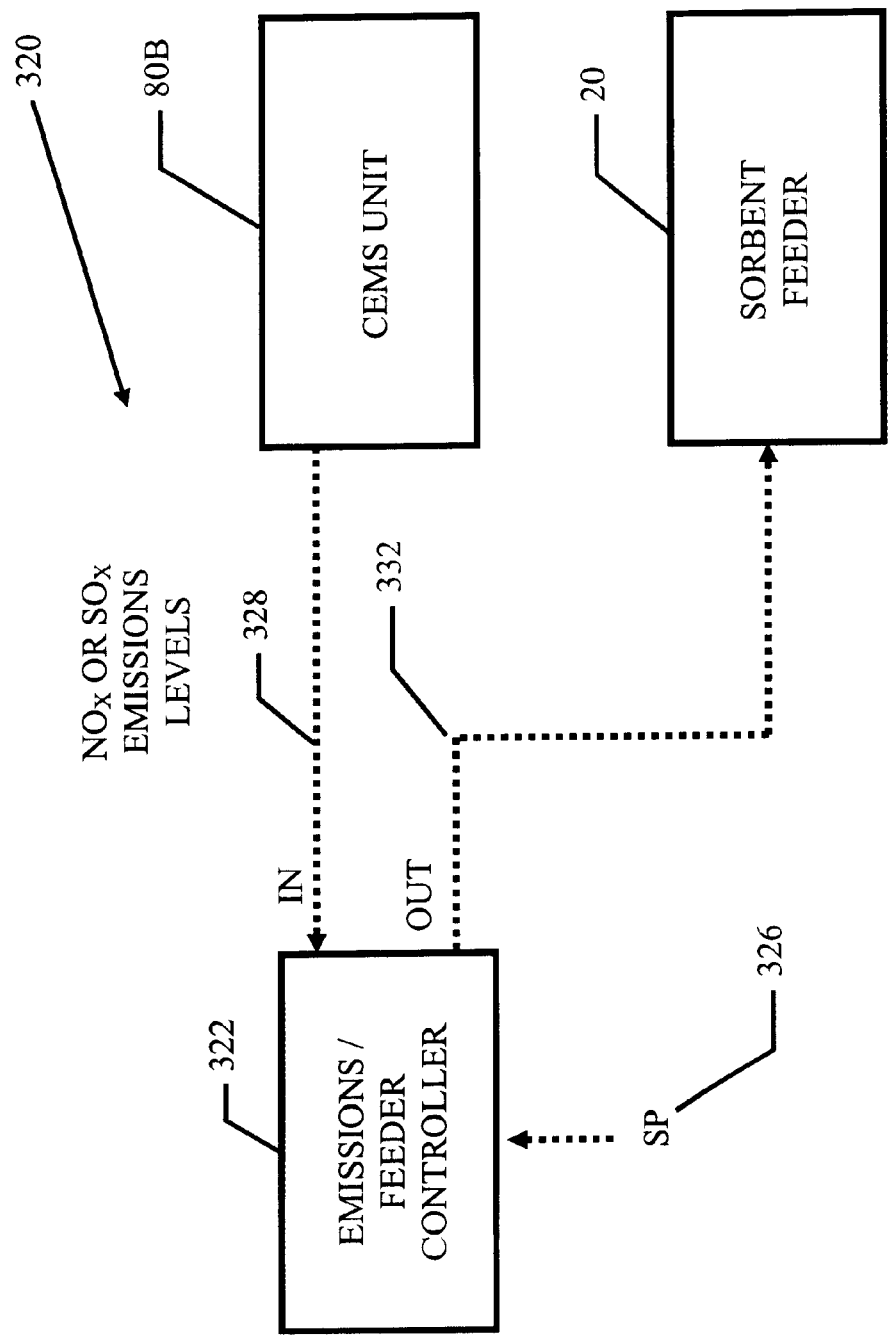
FIG. 21 is a control sub-element according to the invention for control of $SO_X$ or $NO_X$ capture rate or sorbent feed rate.

Referring now to FIG. 21, sorbent feeder control loop 320 is illustrated in block diagram form. As previously discussed, feeder control loop 320 can include a reaction zone CEM unit 80B that generates an output signal from the $NO_X$ and/or $SO_X$ emission analyzers. Emissions/Feeder controller 322 can accept the $NO_X$ or $SO_X$ measured emission level through controller input 328, and accepts a set point 326 indicating the desired $NO_X$ and/or $SO_X$ concentration. Controller 322 may also send a controller output 332 to sorbent feeder 20. As previously discussed, sorbent feeder 20 may be a variable speed screw feeder, accepting a variable analog drive signal among others as its input from feeder controller 322. The process trade-offs in setting set point 326 are as previously described.

Figure 22:
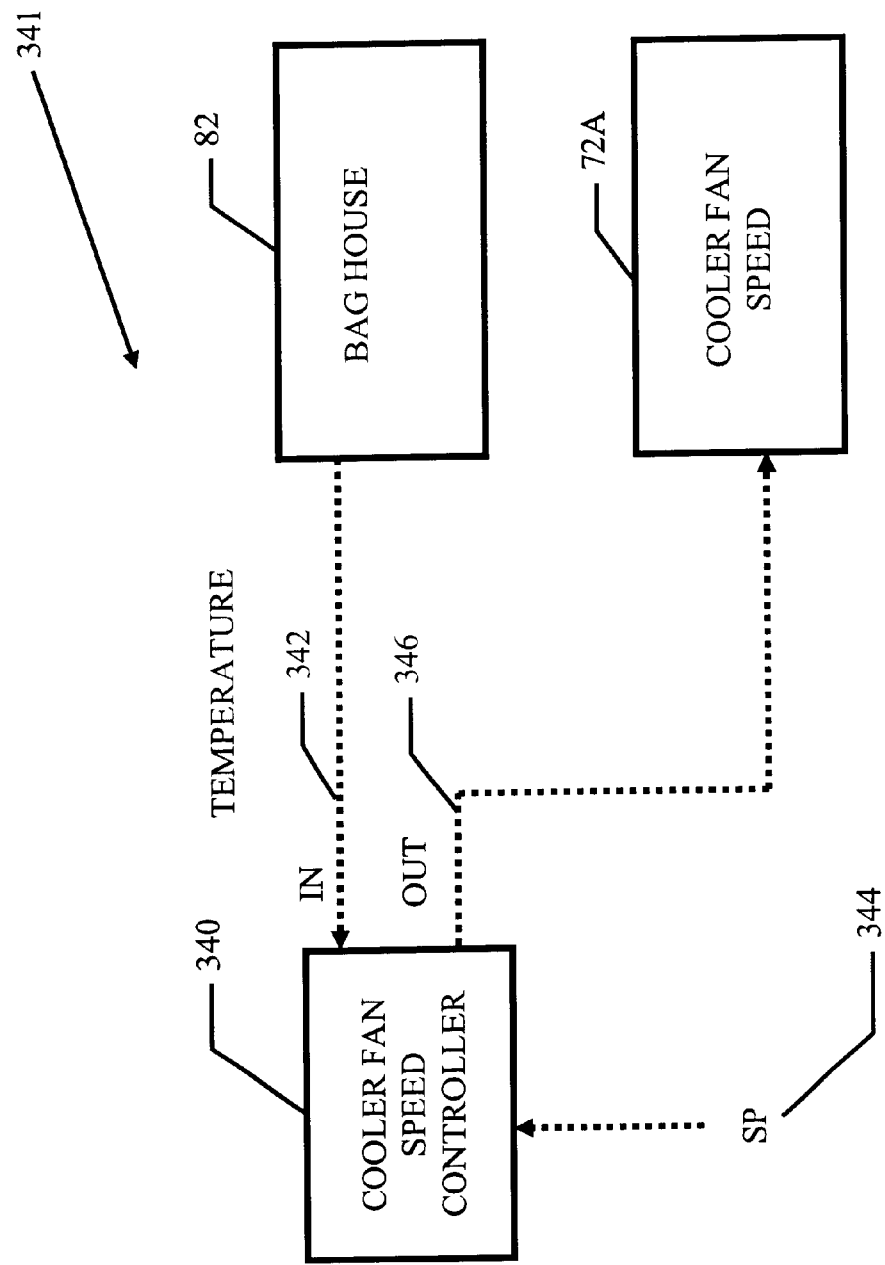
FIG. 22 is a control sub-element according to the invention for control of bag house gas inlet temperature.

FIG. 22 illustrates a control loop 341 for controlling the temperature of bag house 82. Temperature controller 340 is as previously described with respect to FIG. 15. Temperature controller 340 accepts a bag house temperature input 342 and desired bag house input temperature set point 344, generating controller output 346 which can be fed as a fan speed control to heat exchanger 72A. The control scheme rationale is as previously described with respect to FIG. 15.

Figure 23:
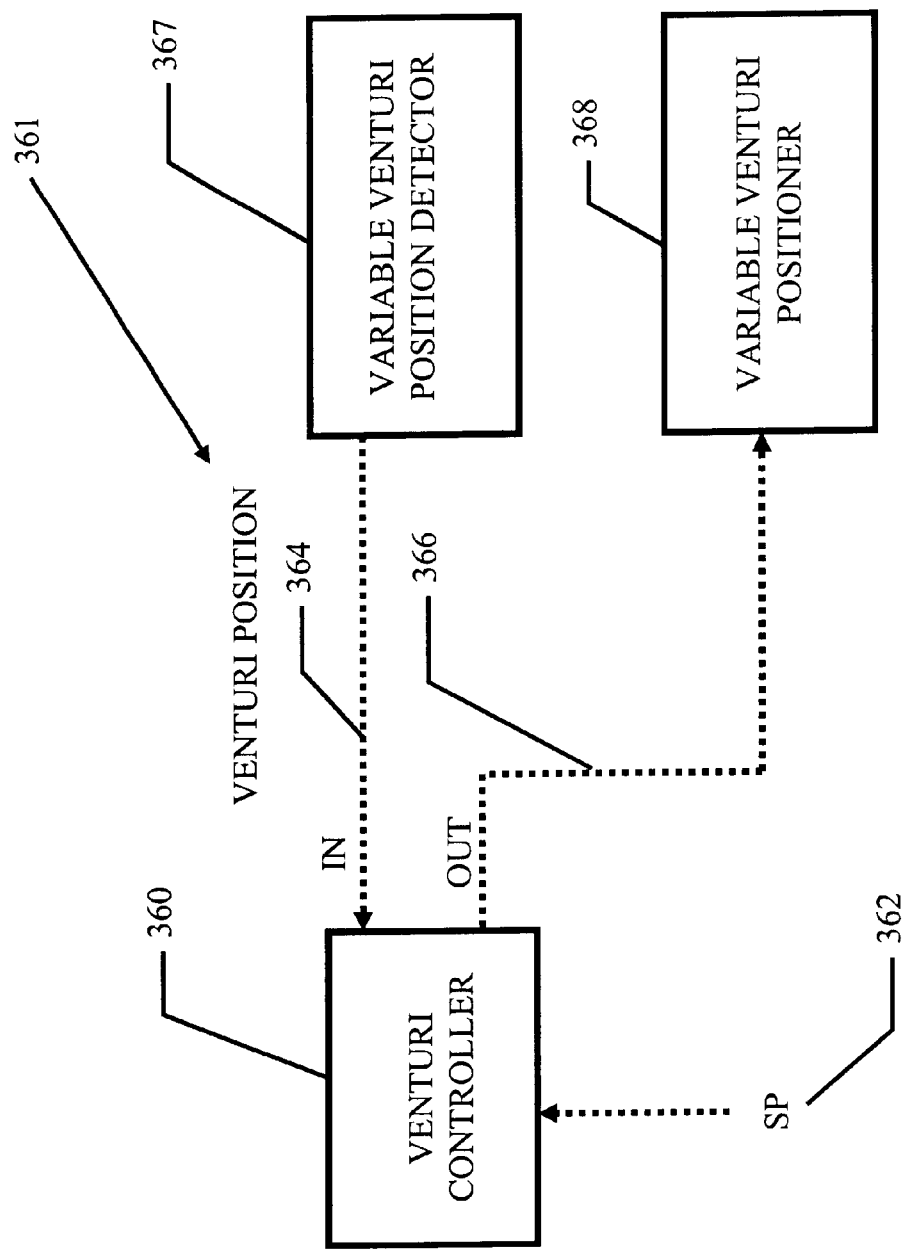
FIG. 23 is a control sub-element according to the invention for control of variable venturi position(s).

Referring now to FIG. 23, a variable venturi control loop 361 is illustrated. FIG. 23 illustrates a venturi position controller 360, which accepts a venturi position set point 362 and an actual venturi position input 364, generating a controller output 366 which can be accepted by a variable venturi positioner at 368. The actual position of the variable venturi position may be measured by a position detector 367. In one embodiment, the variable venturi position may be measured in units of 0 to 100%. Venturi set point 362 may be set as a function of one of several desired process parameters.

The variable venturi position may be set to control the space between the variable venturi 160 and interior surface 154, the cross-sectional flow area, available for the bag house inlet gas to flow around the flow occluding devise, variable venturi 160, thereby controlling the fluidization velocity of the gas. When the flow cross-sectional area is decreased, the gas flow velocity increases, which can be used to support a deeper fluidized bed depth of sorbent material. If the gas flow velocity is made very high, only the densest sorbent particles will be able to descend against the swiftly rising gas and be collected from the system. If the fluid velocity is set very low, even the lightest particles will be able to settle out of the system quickly, thereby increasing the need for regeneration or recycling of material back to the reaction zone for more loading. A higher gas flow velocity will, in effect, create a fluidized bed reactor, having a fluidized bed of sorbent material held in place by the upwardly rising gas stream. A rapidly moving gas stream will also carry more sorbent particles to the fabric bags 88 filter to form a filter cake. Conversely, a slowly moving gas flow around the variable venturi 160 will allow many sorbent particles to fall and be collected prior to becoming caked upon the bags 88. A deeper fluidized bed will create higher differential pressures and a shallow fluidized bed will create lower differential pressures. Removal efficiencies may be taken into consideration when setting $SO_X$ and/or $NO_X$ fluidized bed depth. Variable venturi controller 360 may be any suitable controller, including a PID controller, utilizing any combination of its modes.

Figure 24:
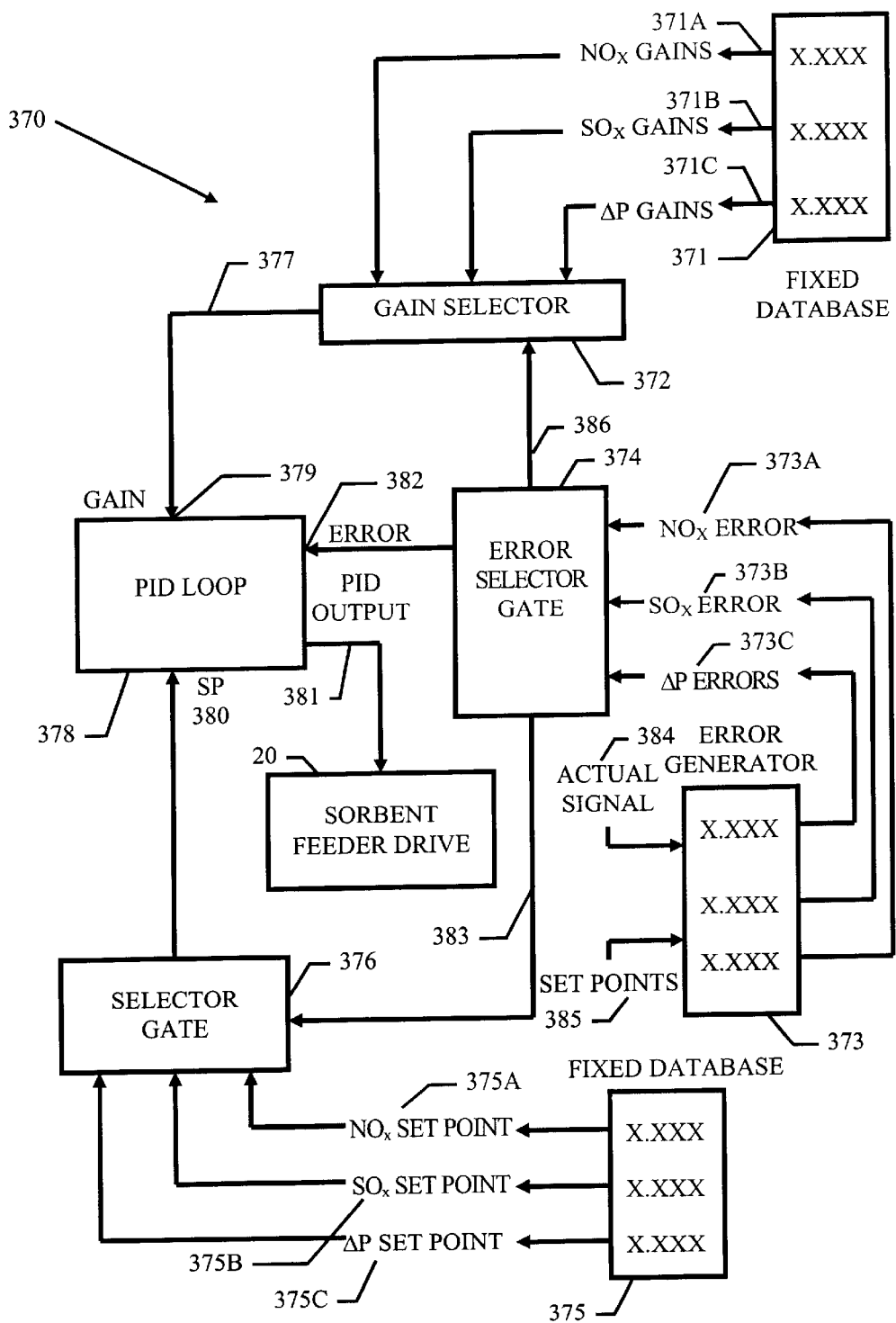
FIG. 24 is a control sub-element according to the invention for control of $SO_X$ or $NO_X$ capture rate, differential pressure, and sorbent feed rate.

Referring now to FIG. 24, a control scheme 370 is illustrated for controlling sorbent feeder 20 using one set of inputs selected from the group including $NO_X$ concentration, $SO_X$ concentration, and reactor zone differential pressure. The control of sorbent feeder 20 may be accomplished by selecting one of the aforementioned control inputs, where the selection may be based on the greatest deviation from set point or error.

An error generator 373 may be seen to accept several actual measurement signals 384, as well as several set points 385. The actual signals and set points may be used to generate corresponding errors, for example, using subtraction. Error generator 373 may be seen in this example to output a $NO_X$ error 373A, a $SO_X$ error 373B, and a differential pressure error 373C. The outputs from error generator 373 may be accepted by an error selector gate 374, with one of the input errors selected and output as the error to a controller error input 382. Error selector gate 374 may be operated manually to accept one of the several input errors in some embodiments. In other embodiments, error selector gate 374 may automatically select the largest error or deviation, to control based on the process variable or parameter most requiring attention. For example, sorbent feeder 20 may be controlled based upon the $NO_X$ concentration, the $SO_X$ concentration, or the differential pressure across the reaction zone.

Error selector gate 374 may select the highest deviation, or the highest percent of deviation, of these three error inputs. Error selector gate 374 can generate a selector output 386 which can be used to select which of the inputs a gain selector 372 is to select. Similarly, error selector gate 374 may output a selector output 383 which can be accepted by a set point selector gate 376 to select from various set points provided to the selector gate.

A gain table 371 may be implemented as a table in a fixed database, for example, a series of registers in a PLC. Gain table 371 may be seen to include a $NO_X$ gain 371A, a $SO_X$ gain 371B, and a differential pressure gain 371C. The gains from gain table 371 may be seen to feed gain selector block 372. A gain selector output 377 may be sent to a controller gain input 379.

A set point table 375 may be seen to include a $NO_X$ set point 375A, a $SO_X$ set point 375B, and a differential pressure set point 375C. The set points may be used as inputs to selector gate 376, with selector output 383 being used to select one of the input set points. Selector gate 376 may be seen to output one of the selected set points to controller set point input 380.

Control scheme 370 thus provides a system and method for controlling the sorbent feeder rate based upon any one of the $NO_X$ concentrations, the $SO_X$ concentration or the differential pressure across the reaction zone. This can be accomplished using the selector blocks previously discussed while only requiring a single controller. Controller 378 can be, for example, a PID controller, using any combination of its individual modes.

Figure 25:
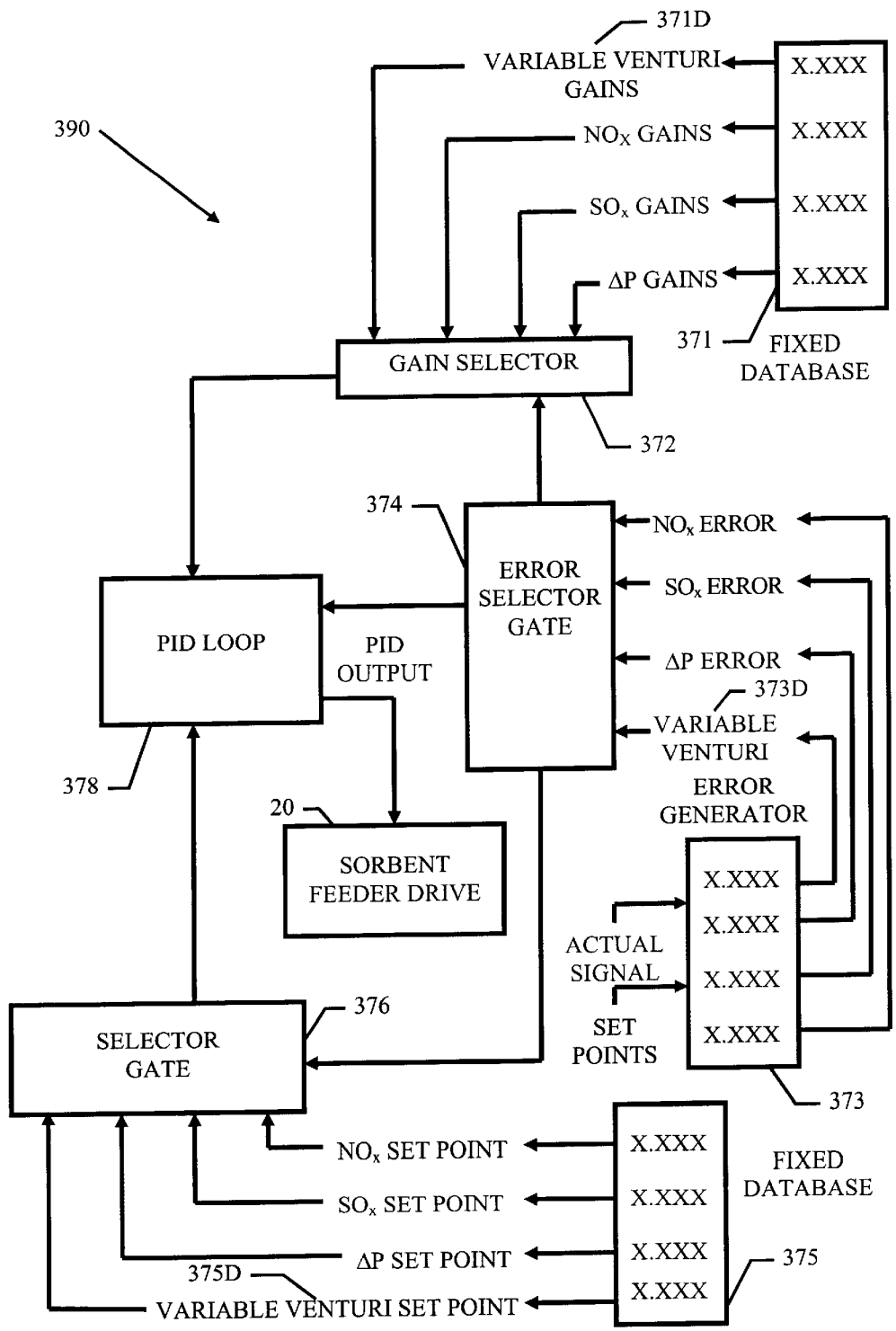
FIG. 25 is a control sub-element according to the invention for control of $SO_X$ or $NO_X$ capture rate, differential pressure, sorbent feed rate, and variable venturi position.

Referring now to FIG. 25, a control scheme 390 is illustrated, similar in some respects to control scheme 370 of FIG. 24. Control scheme 390 includes similar control blocks, tables, and outputs as previously described in FIG. 24. Control scheme 390 further includes the variable venturi control as one of the possible sets of inputs, gains, and set points to be used to control sorbent feeder 20. Gain table 371 may be seen to include a variable venturi gain 371D. Error generator 373 may be seen to generate a variable venturi error 373D. Set point table 375 may be seen to include a variable venturi set point 375D. Control scheme 390 may thus operate in a manner similar to control scheme 370 of FIG. 24, but allowing for control based on the venturi position.

Various components of the system of the invention have been discussed above. Many of the components of the system are commercially available from various original equipment manufacturers and are known to those of ordinary skill in the art. Further, one skilled in the art will recognize and understand that the reaction zones and other units of the system of the invention may be connected by pipes, ducts, and lines, etc. which allow gas and/or sorbent to flow through and within the system and that reaction zones are in flow through communication in dual and multi stage embodiments of the invention. In addition to the aforementioned system components, the system may further include various hoppers, conveyors, separators, recirculation equipment, horizontal and vertical conveyors, eductors. Further, there may be modulating diverter valves, vibrators associated with feeders, compressors to provide instrument air to pulse filter fabric bags, as well as various meters and sampling ports.

In addition to removing $SO_X$ and $NO_X$, the system and processes of the invention can be utilized to remove mercury (Hg) and fly ash. Gases emanating from combustion of fuels, which contain mercury and sulfides, include mercury compounds, mercury vapor, ash, $SO_X$ and $NO_X$. These gases and solids are commingled with oxides of manganese and are transported at a sufficient velocity as a gas-solids mixture to a reactor, which may be a bag house or other reactor/separating device. During transport and during residence in the reactor, oxidation-reduction reactions occur. These reactions cause the conversion of mercury vapor to mercury compound(s), and sorbent and/or alumina adsorb the mercury compound(s). As disclosed above, $SO_X$ and $NO_X$ are removed through reaction with oxides of manganese to form sulfate and nitrate compounds of manganese. These reaction products, unreacted sorbent (if any) alumina, adsorbed mercury, and ash are trapped and collected in the bag house and clean, substantially stripped gases are vented to the stack. Thus, during the processing of gases with the system of the invention, mercury and mercury compounds may also be removed. The reacted and unreacted sorbent when removed from the reaction zones of the system may be further processed to generate useful products and to regenerate the sorbent as described herein below.

The system of the invention in its various embodiments may be utilized in a process for removal of oxides of sulfur and/or oxides of nitrogen, mercury (compounds and vapor), and other pollutants from a gas stream. The processes generally involve providing a system according to the invention, whether single stage, dual-stage, or multi-stage. Gas and sorbent are introduced into a reaction zone and contacted for a time sufficient to effect capture of the targeted pollutant(s) thereby substantially stripping the gas of the targeted pollutant(s). In a single-stage removal process, the reaction zone would need to be a solid-gas separator operating as a reaction zone or else followed by a solid-gas separator in order to render the gas that has been substantially stripped of a target pollutant free of solids so that the gas may either be vented or directed for further processing. In a dual-stage removal process, the second reaction would preferably be a solid-gas separator operating as a reaction zone. And, in a multi-stage removal process the last reaction zone in the series of reaction zones through which the process gas is directed would need to be a solid-gas separator operating as a reaction zone or else followed by a solid-gas separator in order to render the gas that has been substantially stripped of a target pollutant free of solids so that the gas may either be vented or directed for further processing. Generally, configuring the systems and processes of the invention to incorporate a solid-gas separator as the last reaction zone in a sequence of removal steps would be most economical and efficient.

A process according to the invention is described below using single-stage and dual-stage systems of the invention for purposes of illustration. It should be readily understood by those skilled in the art that the processes as described can be adapted to multi-stage removals and to removal of various targeted pollutants with or without the addition of other sorbent materials or chemical additives, as appropriate.

Removal of $SO_X$ and/or $NO_X$ can be accomplished in a single single-stage removal system. Sorbent and gas containing $SO_X$ and/or $NO_X$ are introduced into a reaction zone 30 where the gas and sorbent are contacted for a time sufficient to substantially strip the gas of $SO_X$ and/or $NO_X$. If $SO_X$ is the primary target pollutant, the gas may be introduced at temperatures typically ranging from about ambient temperature to below the thermal decomposition temperature(s) of sulfates of manganese. If $NO_X$ is the primary target pollutant, the gas would be introduced at temperatures typically ranging from about ambient temperature to below the thermal decomposition temperature(s) of nitrates of manganese. If both pollutants are present, $NO_X$ will not be captured if the temperature of the gas is above the thermal decomposition temperature of nitrates of manganese. In the reaction zone, the gas would be contacted with the sorbent for a time sufficient to effect capture of the pollutant at a targeted capture rate. If both pollutants are to be captured, the capture rate for the primary targeted pollutant would control or utilize a control sub-element, such as control loop 320 of FIG. 14 or control loop 390 of FIG. 25. The capture rate for the targeted pollutants can be monitored and adjusted. The reaction zone would preferably be a solid-gas separator that renders the gas free of solids, such as reacted and unreacted sorbent and any other particulate matter in the gas so that the gas may be vented from the reaction zone or directed for further processing, after contacting the gas with sorbent for a sufficient time.

In a dual-stage removal process, a system of the invention having at least two reaction zones, first and second reaction zone 30, 38 as in FIG. 1, is provided. It should be understood that the system could be a system of the invention such as the modular reaction units illustrated in FIGS. 2 and 3. With reference to FIG. 2, any of the bag houses 62, 64, 66 could serve as first and second reaction zones 30, 38 depending upon how the gas is directed through the system. Further, with reference to FIG. 3, the first bag house 70 would correspond to first reaction zone 30 and either or both of the second and third bag houses 76, 78 would correspond to second reaction zone 38. Additionally, it is understood that other reaction zones may be substituted for the bag houses of FIGS. 2 and 3 and the process as described could be carried out.

However, for purposes of illustration, the dual-stage removal process is discussed with reference to FIG. 1. In this process of the invention, gas and sorbent are introduced into first reaction zone 30. The gas is contacted with the sorbent for sufficient time to primarily effect $SO_X$ capture at a targeted capture rate. The gas is rendered free of solids and then vented from the first reaction zone 30. Sorbent and the gas that has been substantially stripped of $SO_X$ are then introduced into second reaction zone 38. In the second reaction zone, the gas is contacted with the sorbent for a sufficient time to primarily effect $NO_X$ capture at a targeted capture rate. The gas is rendered free of solids and then vented from the second reaction zone 38. The vented gas may be directed to stack 40 to be vented or emitted into the atmosphere or directed on for further processing.

With the processes of the invention, other pollutants that can be captured with oxides of manganese can be removed. For example, without being limited or bound by theory, Applicants believe that mercury compounds adsorb onto oxides of manganese. Applicants further believe that, in the system and processes of the invention, elemental mercury is oxidized to form oxides of mercury which also adsorb onto oxides of manganese. Additionally, hydrogen sulfide ($H_2S$) and other totally reduced sulfides (TRS) can be removed utilizing oxides of manganese. More specifically, Applicants postulate that the sulfur in TRS may be oxidized to form $SO_2$ which is known to react with oxides of manganese to form sulfates of manganeseIt is known that mercury compounds may be removed from gases by adsorption on fly ash and/or alumina. Thus, alumina may be introduced with the sorbent in a reaction zone for purposes of removing mercury compounds and elemental mercury that has be oxidized to form oxides of mercury. Thus, elemental mercury that is not oxidized and therefore not captured by the sorbent in a first or second reaction zone may be captured in a third reaction zone, which may be referred to as a mercury-alumina reactor or an alumina reactor. With respect to single-stage removal, the mercury compounds may be removed in a reaction zone by contacting the gas with sorbent for a time sufficient for the mercury compounds to adsorb on to the sorbent, and alumina if mixed with the sorbent to thereby substantially strip the gas of mercury. Further, if the reaction zone is a solid-gas separator, mercury compounds adsorbed to fly ash would also be removed, thereby substantially striping the gas of mercury compounds. In a dual-stage, the mercury compounds would similarly be removed, but depending upon which reaction zone is also a solid gas separator.

Thus, the system and process of the invention are readily understood to include and contemplate the removal of not only $SO_X$ and/or $NO_X$ but other pollutants, mercury compounds, elemental mercury, TRS, and $H_2S$.

The system and process of the invention has been tested at several power plants utilizing a $SO_X$ and/or $NO_X$ removal demonstration unit embodying a system according to the invention. The demonstration unit utilized a bag house as the second reaction zone and a pipe/duct as a first reaction zone in a dual stage removal system. The test runs and results are summarized in the following examples.

EXAMPLE 1

$NO_X$ concentrations were determined using EPA method 7E, chemiluminesent analysis method, and analyzed with a model 42H chemiluminescent instrument manufactured by Thermo Electron Inc. Sulfur dioxide ($SO_2$) concentrations were measured utilizing, a spectrophotometric analysis method employing a Bovar Western Research Spectrophotometric model 921NMP instrument. In order to obtain accurate and reliable emission concentrations, sampling and reporting was conducted in accordance with US EPA Reference CFR 40, Part 60, Appendix A, Method 6C. Gas flow rates in standard cubic feet per minute (scfm) were measured using AGA method #3, utilizing a standard orifice plate meter run. The demonstration was conducted utilizing a series of test runs on live gas streams from a power plant. Said power plant operates steam boilers which are fired on high sulfur coal. During test runs, $NO_X$ and $SO_2$ concentration readings were taken continuously alternating from the inlet and the outlet of the demonstration unit. Gas flow rates were measured continuously. The demonstration tests were performed utilizing two different forms of sorbent. The tests conducted utilized various forms of oxides of manganese as sorbent. The tests were performed with and without bag house filter pulsing. The following table summarizes the results and operational parameters:

| Range of Operation Parameters | |
|---|---|
| Range of $NO_X$ Concentrations Processed by the Demonstration Unit | 14.14 to 320 ppm |
| Range of $SO_2$ Concentrations Processed by the Demonstration Unit | 300 to 1800 ppm |
| Range of Gas Flow through the Demonstration Unit | 250 to 2000 scfm |
| Range of Pressure Across the Bag House | 0.5" to 10.0" of $H_2O$ |
| Range of Bag House Temperatures | 60° F. to 246° F. |
| Maximum $NO_X$ steady state Removal Rate | 96.0% |
| Maximum $SO_2$ steady state Removal Rate | 99.8% |

EXAMPLE 2

A test using the demonstration unit according to the invention, utilizing oxides of manganese as the sorbent was conducted on a simulated gas stream containing varying levels of $NO_X$. Oxides of manganese powders that were used during this test described generally by 60% of particles less than 45 microns in size and having a BET surface area of approximately 30 $m^2/g$. Knowing that there is a competition for reaction sites between $SO_2$ and $NO_X$, a series of tests was conducted to gather data on the efficiency of $NO_X$ capture in the absence Of $SO_2$. Synthetic $NO_X$ gas was made on site by use of high-concentration bottle gas which was diluted into the inlet gas stream and processed by the demonstration unit. The bag house was pre-loaded with oxides of manganese prior to introduction of test gas by operating the demonstration unit's blower at high speed (typically about 1200 scfm), and feeding the oxides of manganese into the gas stream at a high rate (between 40% and 90% of feeder capacity) in order to form a suitable filter cake on the fabric bags in the bag house. Gas from cylinders containing $NO_X$, 20% NO, and 20% $NO_2$, (20,000 ppm) was metered into the bag house inlet through a rotameter-type flow gage. $NO_X$ concentrations were measured at the bag house inlet and outlet on an alternating basis throughout the testing with the demonstration unit's continuous emissions monitoring system (CEMS), utilizing a Thermo Electron model 42H Chemiluminescent instrument. In order to obtain accurate and reliable emission concentrations, sampling and reporting was conducted in accordance with US EPA Reference CFR 40, Part 60, Appendix A, Method 6C.

Test were performed at varying levels of bag house differential pressure (measured in inches of water column) and flow rates (measured in scfm). The $NO_X$ inlet concentrations ranged from 18.3–376.5 ppm with flow rates ranging from 260–1000. It has been determined that varying levels of filter cake thickness affect the $NO_X$ and $SO_2$ removal. A thicker filter cake increases the quantity of sorbent exposed to the gas, thus increasing the micro-reaction zone within the filter cake. As a representation of the sorbent filter cake depth, the differential pressure across the bag house (referred to as AP) was measured between 2.00"–9.67" of WC (expressed in inches of water column). $NO_X$ concentrations were recorded once the system was in steady state and the readings were stable for up to 20 minutes. The following table illustrates the level of $NO_X$ removal achieved as a function of inlet concentration, gas flow rate, and bag house differential pressure:

| | Summary of Bottle Gas $NO_x$ Reduction Test | | | | |
|---|---|---|---|---|---|
| Run No. | Inlet $NO_x$ (ppm) | Outlet $NO_x$ (ppm) | % Reduction | ΔP (in. $H_2O$) | Flow Rate (scfm) |
| 1 | 25.5 | 3.3 | 87.1 | 2.00 | 260 |
| 2 | 140.1 | 8.5 | 94.0 | 3.86 | 500 |
| 3 | 102.0 | 10.5 | 89.7 | 7.71 | 1000 |
| 4 | 324.9 | 17.4 | 94.7 | 7.78 | 1000 |
| 5 | 195.0 | 15.1 | 92.3 | 7.85 | 1000 |
| 6 | 46.7 | 8.4 | 81.9 | 7.85 | 1000 |
| 7 | 200.3 | 32.5 | 83.8 | 3.0 to 4.0 | 1000 |
| 8 | 28.2 | 6.2 | 78.0 | 7.80 | 500 |
| 9 | 57.8 | 11.4 | 80.3 | 2.10 | 500 |
| 10 | 84.9 | 8.9 | 89.5 | 3.80 | 500 |
| 11 | 86.0 | 8.9 | 89.7 | 3.80 | 500 |
| 12 | 194.5 | 11.5 | 94.1 | 3.80 | 500 |
| 13 | 317.5 | 12.7 | 96.0 | 3.80 | 500 |
| 14 | 376.5 | 26.7 | 92.9 | 2.10 | 500 |
| 15 | 376.5 | 26.7 | 92.9 | 2.10 | 500 |
| 16 | 18.3 | 4.0 | 78.1 | 4.45 | 509 |
| 17 | 83.5 | 8.7 | 89.6 | 4.45 | 509 |
| 18 | 40.1 | 5.9 | 85.3 | 4.45 | 509 |
| 19 | 83.5 | 8.7 | 89.6 | 4.45 | 509 |
| 20 | 21.5 | 4.5 | 79.2 | 4.74 | 500 |
| 21 | 45.7 | 6.5 | 85.8 | 4.75 | 500 |
| 22 | 92.1 | 8.6 | 90.7 | 4.75 | 500 |
| 23 | 201.1 | 11.5 | 94.3 | 4.76 | 500 |
| 24 | 317.5 | 14.0 | 95.6 | 4.79 | 500 |
| 25 | 52.1 | 10.0 | 80.9 | 9.67 | 1000 |
| 26 | 82.4 | 12.0 | 85.5 | 9.67 | 1000 |
| 27 | 105.4 | 13.2 | 87.5 | 9.65 | 1000 |
| 28 | 224.0 | 18.5 | 91.8 | 9.67 | 1000 |
| 29 | 328.4 | 23.1 | 93.0 | 9.67 | 1000 |
| 30 | 100.2 | 15.0 | 85.0 | 9.67 | 1000 |

EXAMPLE 3

A further test of the demonstration unit according to the invention utilizing oxides of manganese as the sorbent, was conducted on a live exhaust gas slipstream from a 170 MW coal fired boiler. The boiler was operating on high sulfur coal of approximately 4–6% sulfur, resulting in emission concentrations of $SO_2$ in the range of 1200–2000 ppm and $NO_X$ concentrations in the range of 280–320 ppm. A slipstream averaging 1000 scfm was diverted from the main stack exhaust and routed to the demonstration unit for reaction and sorption by the sorbent oxides of manganese. $SO_2$ and $NO_X$ concentrations were measured at the scrubber inlet and outlet of the bag house on an alternating basis throughout the testing with the demonstration unit's continuous emissions monitoring system (CEMS). $SO_2$ concentrations were measured utilizing a Bovar Western Research model 921NMP spectrophotometric analyzer and $NO_X$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C.

$SO_2$ removal efficiencies of 99.8% and $NO_X$ removal efficiencies of 75.3% were achieved while processing on average 1000 scfm of exhaust gas at temperatures typically ranging from 150° F. to 250° F. Test runs were conducted with varying levels of bag house differential pressures ranging from 0.5" to 8.6" of WC, which represents various levels of filter cake thickness. Tests were also conducted with different rates of bag house filter bag pulsing and varying levels of oxides of manganese feed rates. Oxides of manganese powders that were used during this test described generally by 60% of particles less than 45 microns in size and having a BET surface area of approximately 30 $m^2/g$. The following table gives an example of $SO_2$ and $NO_X$ data collected during a test in which 1000 scfm was processed by the dry scrubber at an inlet temperature of 250° F., and a differential pressure of 5.75" of WC. Data was collected once the demonstration unit was in a steady state of $NO_X$ and $SO_2$ removal for a period of 30 minutes. The results are summarized in the below table:

| Pollutant | Inlet ppm | Outlet ppm | ppm % Removal |
| --- | --- | --- | --- |
| Oxides of Nitrogen ($NO_X$) | 285.9 | 70.5 | 75.3% |
| Sulfur Dioxide ($SO_2$) | 1703 | 3.9 | 99.8% |

EXAMPLE 4

An additional series of demonstration tests of the demonstration unit, utilizing oxides of manganese as the sorbent, was conducted on a live exhaust gas slipstream from a 75 MW coal fired boiler. This boiler was operating on Powder River Basin (PRB) coal, resulting in emission concentrations of $SO_2$ in the range of 340–500 ppm with $NO_X$ concentrations in the range of 250–330 ppm. A slipstream ranging from 500–1000 scfm was diverted from the main stack exhaust and routed to the demonstration unit for reaction and sorption by the oxides of manganese. Oxides of manganese powder that were used during this test described generally by 60% of particles less than 45 microns in size and having a BET surface area of approximately 30 $m^2/g$. $SO_2$ and $NO_X$ concentrations were measured at the bag house inlet and outlet on an alternating basis throughout the test with the demonstration unit's continuous emissions monitoring system (CEMS). $SO_2$ concentrations were measured utilizing a Bovar Western Research model 921NMP spectrophotometric instrument and $NO_X$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C.

$SO_2$ and $NO_X$ reduction efficiencies were measured at 99.9% and 91.6% respectively. Testing was conducted with varying degrees of differential pressure (ΔP) across the bag house to affect the residence time of the targeted pollutants. Reaction chamber temperatures ranged from 150° F. to 280° F. It was determined that longer residence times resulted in improved capture rates for $NO_X$. However, the fact that the $SO_2$ reaction occurs so rapidly and completely, the $SO_2$ reduction efficiency remains nearly complete (99.9%) at even the lowest of residence times. While operating the scrubber at 0.5"–1.0" of WC across the bag house, a pollutant concentration reduction efficiency of 99.8% for $SO_2$ and 40.0% for $NO_X$ was achieved. It is from these results that the concept for a two stage reaction chamber system develops, whereby the first reaction chamber captures the majority of $SO_2$ and a small fraction of $NO_X$, while the second "polishing" stage completes the $NO_X$ removal to desired levels of efficiency, predetermined and controlled by the system operator. Data was collected once the dry scrubber was in a steady state of $NO_X$ and $SO_2$ removal for a period of 30 minutes. The following table gives an example of $SO_2$ and $NO_X$ data collected during a testing in which 500 scfm was processed by the demonstration unit at an inlet temperature of 250° F., and a differential pressure of 8.7" of WC:

| Pollutant | Inlet ppm | Outlet ppm | ppm % Removal |
| --- | --- | --- | --- |
| Oxides of Nitrogen ($NO_X$) | 268.1 | 22.4 | 91.6% |
| Sulfur Dioxide ($SO_2$) | 434.3 | 0.5 | 99.9% |

EXAMPLE 5

In an attempt to determine the effectiveness of $SO_2$ and $NO_X$ removal, a series of lab-scale tests were conducted utilizing a glass reactor. The reactor was designed to mimic the gas-solid interactions known to be present in the aforementioned demonstration unit. The glass reactor had a diameter of 2 inches with a length of approximately 24 inches. 50.0 grams of oxides of manganese were suspended in the reactor using a fritted glass filter allowing for flow of the gas stream, while keeping the oxides of manganese suspended. Approximately 3 inches above the fluidized bed of oxides of manganese, a sintered stainless steel filter was arranged to simulate a bag house filter bag. The reactor was heated during the testing to 250° F. and the gas flow rate was metered at a constant 6 liters per minute (lpm). Simulated exhaust gas was produced by use of a calibration gas standard having the following composition: $CO_2$=17.35%, $NO_X$=391 ppm, $SO_2$=407 ppm, CO=395 ppm, and balance $N_2$. The simulated flue gas stream passed through the fluidized bed of oxides of manganese, where the flow carried a portion of the sorbent up onto the filter, thus creating a filter cake, which mimics a bag house reactor chamber.

$SO_2$ and $NO_X$ concentrations were measured continuously from the reactor outlet utilizing a continuous emissions monitoring system (CEMS). $SO_2$ concentrations were measured utilizing a Bovar Western Research model 921NMP spectrophotometric instrument and $NO_X$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C. Removal efficiencies of 99.9% for $SO_2$ as well as 99.9% for $NO_X$ were measured and duplicated for several test runs. Inlet temperature was 250° F., with a differential pressure of 2.00" of WC. The following table gives an example of $SO_2$ and $NO_X$ data collected during testing in which 6 lpm of gas was processed by a glass reactor:

| Pollutant | Inlet (ppm) | Outlet (ppm) | Sorbent Weight (g) | % Removal | Flow rate (lpm) | ΔP (in H$_2$O) | Temp. (° F.) | Time with >94% Removal |
|---|---|---|---|---|---|---|---|---|
| Oxides of Manganese Type A | | | | | | | | |
| NO$_x$ | 391 | 17.21 | 50 | 95.6% | 6 | 2.00 | 250 | 29 min |
| SO$_2$ | 407 | 0.1 | 50 | 99.9% | 6 | 2.00 | 250 | >54 min |
| Oxides of Manganese Type B | | | | | | | | |
| NO$_x$ | 391 | 0.1 | 50 | 99.9% | 6 | 2.00 | 250 | 60 min |
| SO$_2$ | 407 | 0.1 | 50 | 99.9% | 6 | 2.00 | 250 | >90 |
| Oxides on Manganese Type C | | | | | | | | |
| NO$_x$ | 391 | 0.2 | 50 | 99.9% | 6 | 2.00 | 250 | 34 min |
| SO$_2$ | 407 | 0.1 | 50 | 99.9% | 6 | 2.00 | 250 | >68 min |

Figure 29:
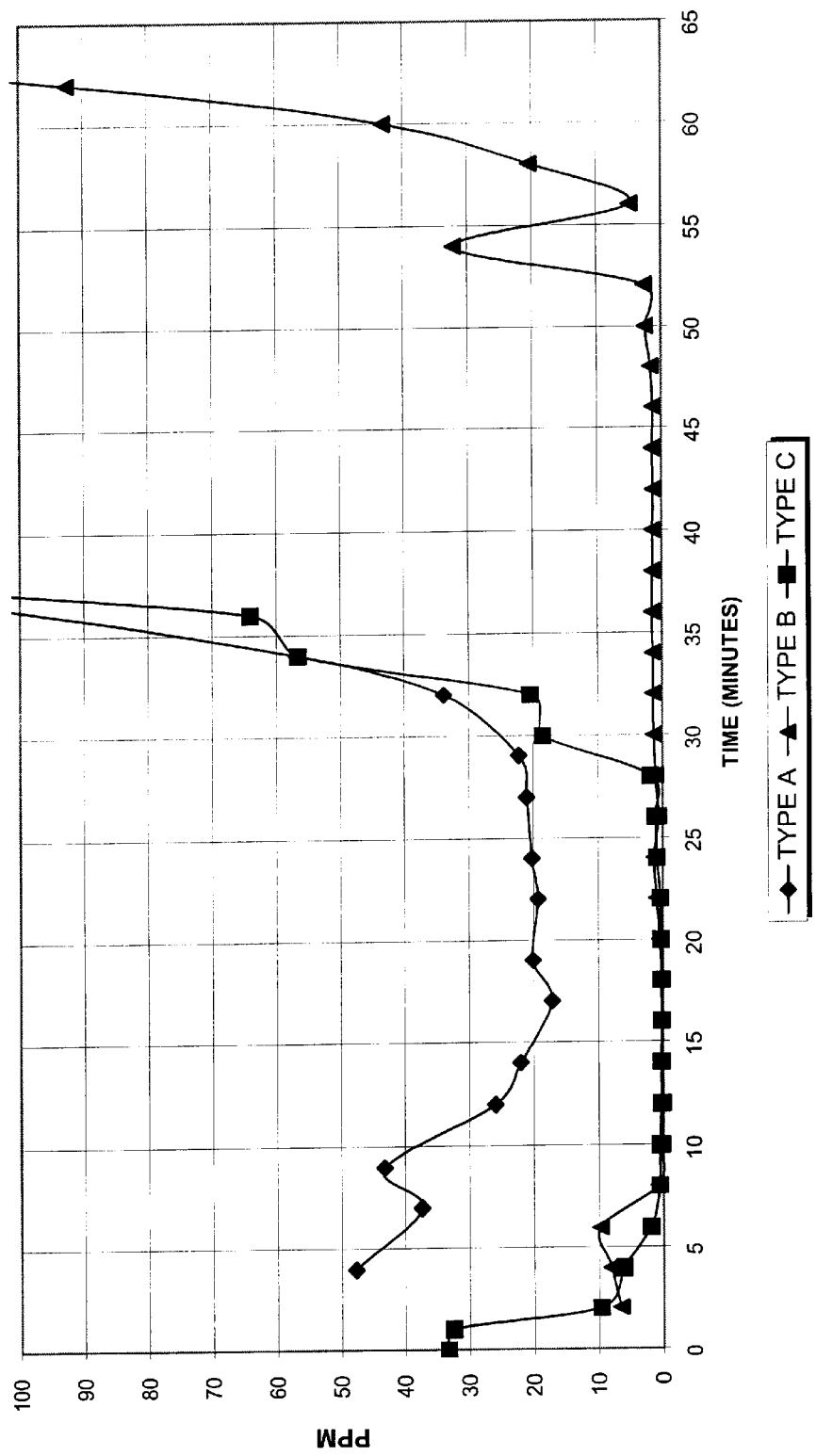
FIG. 29 is a graph plotting $NO_X$ values over time.

The tests of this Example 5 were conducted with three different lots of manganese oxide sorbent. FIGS. 29 and 30 are, respectively, graphs plotting NO$_X$ and SO$_X$ concentrations at the outlet of the glass reactor versus time. The three different oxides of manganese are represented by the symbols "◇" for type A sorbent, "Δ" for type B sorbent, and "□" for type C sorbent in FIGS. 29 and 30. Type A sorbent is an oxide of manganese powder generally at 60% of particles less than 45 microns in size and having a BET surface area of approximately 30 m$^2$/g. Type B sorbent is an oxide of manganese powder generally at 100% of particles less than 45 microns in size and having a BET surface area of approximately 200 m$^2$/g. Type C sorbent is an oxide of manganese powder generally at 80% of particles less than 45 microns in size and having a BET surface area of approximately 90 m$^2$/g. The graph of FIG. 30, confirms the above statements regarding near immediate and complete SO$_X$ capture upon contact with the sorbent. The graph of FIG. 29 shows a range of capture efficiency over time for NO$_X$ and that different forms of oxide manganese may be able to provide more efficient capture of NO$_X$. The type B sorbent performed the best before break-through, followed by type C. Useful captures were observed for all three types. With the process controls of the invention a wide variety of oxides of manganese can be utilized to effect removal at targeted capture rates. Further, the graphs of FIGS. 29 and 30 show that high removal or capture rates can be achieved and sustained over time. The operational parameters of the systems of the invention can be monitored and adjusted to attain and maintain removal or capture rates at these high levels.

As mentioned above, the reacted or loaded sorbent can be recycled and/or regenerated after being removed from a reaction zone. For recycling purposes the reacted sorbent may simply be reintroduced into another reaction zone. For example with reference to FIG. 4, the system has first and second reaction zones 30, 38 which are connected to feeder 20 which contains unreacted or virgin sorbent. Gas from external gas source 15 is introduced into first reaction zone 30 along with sorbent fed from feeder 20. The gas is contacted with sorbent for a time sufficient to remove a target pollutant, such as SO$_X$, and after being rendered free of solids is vented from the first reaction zone 30. The gas is then introduced in the second reaction zone 38 along with sorbent from feeder 20. In the second reaction zone 38, the gas is contacted with gas for a time sufficient to remove another target pollutant, here NO$_X$. During operation, the level of NO$_X$ loading on the reacted sorbent in second reaction zone 38 reaches the point where the sorbent no longer efficiently removes NO$_X$. When the point is reached, the NO$_X$. reacted sorbent is removed from the second reaction zone 38 and conveyed or transported to NO$_X$ reacted sorbent feeder 21. The NO$_X$ reacted sorbent, which has unused reactive sites available for further SO$_X$ capture, is fed or introduced into the first reaction zone 30 for additional loading or reaction with SO$_X$ in the gas introduced from external gas source 15. When the recycled NO$_X$ reacted sorbent reaches the point where SO$_X$ capture can no longer be achieved at a targeted rate of removal, the now NO$_X$ and SO$_X$ reacted (or loaded) sorbent is removed from the first reaction zone and routed for regeneration. In this way, the amount of virgin or unreacted sorbent that is utilized in the first reaction zone can be reduced and the additional load or reactive sites available on the NO$_X$ reacted sorbent can be utilized.

Figure 26:
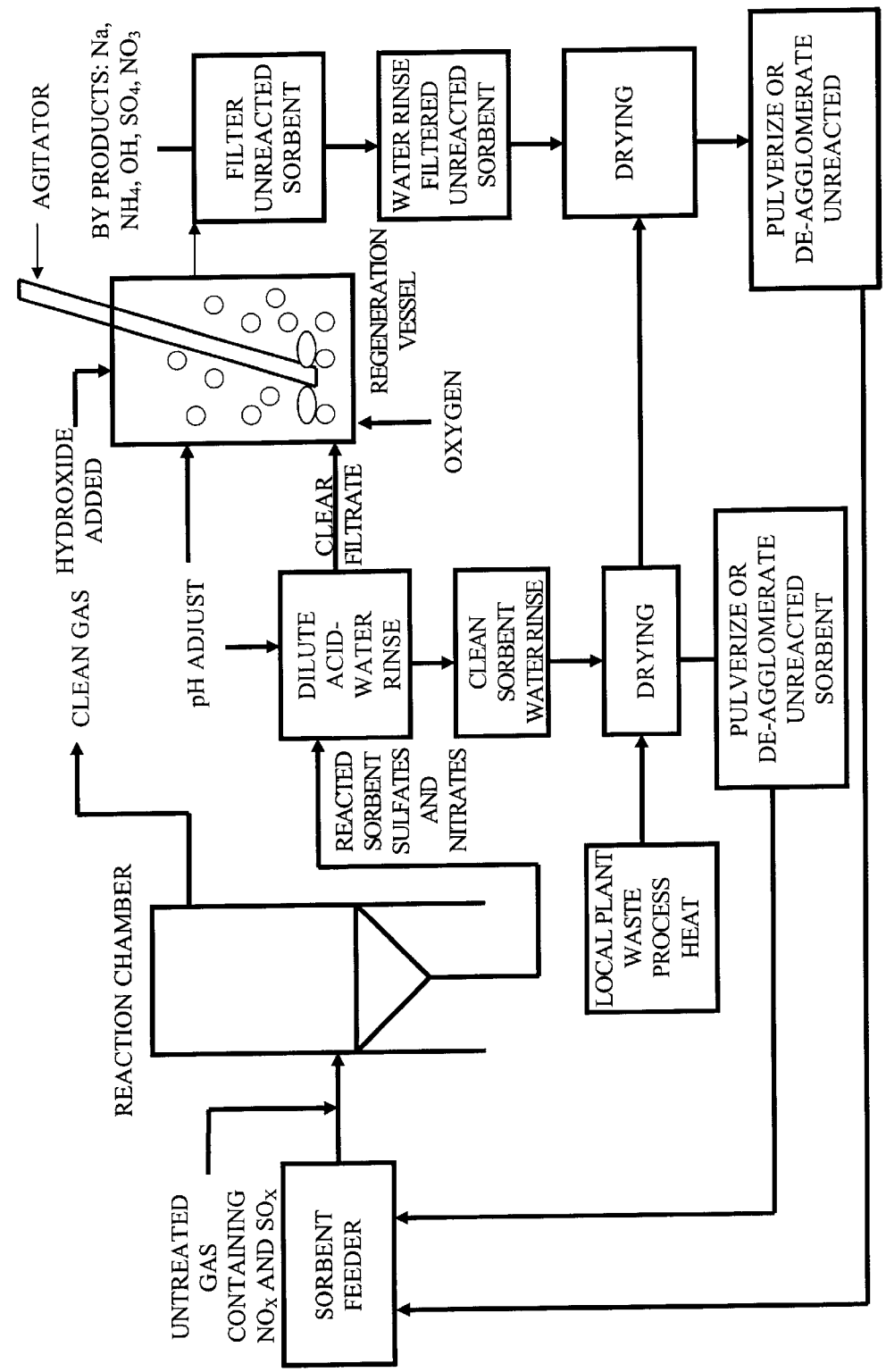
FIG. 26 is a block diagram of a system and process according to the invention.

During a wet regeneration process the reacted surfaces of the sorbent may be removed and the remaining sorbent may be refreshed. This will be understood with reference to FIG. 26. In a wet regeneration, reacted sorbent is removed from a reaction zone, a reaction chamber in FIG. 26, and washed in an aqueous dilute acid rinse. Since the interaction between pollutants and the sorbent is believed to be a surface-controlled phenomenon, only a small fraction of the oxides of manganese is reacted with the pollutant. It is this small fraction of the sorbent that can be removed by washing or rinsing which thereby "activates" the sorbent by making unreacted surface area available. The solubility in water of nitrates of manganese is greater than the solubility of sulfates of manganese by at least an order of magnitude in cold water and by at least several orders of magnitude in warm to hot water. This differential in solubility can be advantageously utilized in the regeneration process.

The sulfates and nitrates of manganese on the surface of the sorbent particles dissolve off into solution in the dilute acid bath, leaving clean sorbent that can be readily separated from the rinse or bath by known means, such as settling and decanting, filtering, centrifuging or other suitable techniques. As is further discussed below, the clear filtrate or solution containing dissolved sulfates and/or nitrates of manganese are directed to a regeneration vessel for regeneration of sorbent and production of useful by-products. The clean sorbent is then dried in, for example, a kiln to remove excess moisture. The heat for this drying step may be waste heat generated by combustion which is transferred or exchanged from combustion or process gases at an industrial or utility plant. After drying, the clean sorbent may be pulverized as necessary to reduce the clean sorbent to particle sizes useful in the system of the invention. The cleaned or "activated" sorbent is then conveyed or otherwise transported to the unreacted sorbent feeder(s) and thus, recycled.

Again with reference to FIG. 26, the regeneration of sorbent and production of useful by-products can be understood. The solution or filtrate containing the dissolved sulfates and nitrates of manganese is passed from the acidic bath to a regeneration vessel to which alkali hydroxides such as potassium hydroxide (KOH) or sodium hydroxide (NaOH), or ammonium hydroxide ($NH_4OH$) is added. The addition of these hydroxides, yield respectively, a solution containing nitrates and/or sulfates of potassium, sodium, or ammonium. These solutions can be made into fertilizer products or other products such as explosives. Air or oxygen is bubbled into or otherwise introduced into the reaction vessel to complete the regeneration, forming oxides of manganese, $MnO_X$ where X is between about 1.5 to 2.0.

The oxides of manganese are separated from the solution, much as the cleaned or reactivated sorbent after the acid wash step, and are then dried and pulverized before being conveyed to a virgin or unreacted sorbent feeder. The filtrate from the separation containing useful sulfates and nitrates that can then be further processed into marketable products.

Oxides of manganese may also be regenerated in a dry or thermal regeneration process, taking advantage of the thermal decomposition temperature(s) of nitrates of manganese. This regeneration process may be understood with reference to FIG. 27. The process illustrated and discussed herein is based upon a removal process where $NO_X$ is the target pollutant with nitrates of manganese being formed in the removal step in the reaction zone, a reaction chamber in FIG. 27. The $NO_X$ reacted sorbent is removed from the reaction chamber and conveyed to a first kiln. In the first kiln, the reacted sorbent is heated to a temperature at or above the thermal decomposition temperature(s) of nitrates of manganese and $NO_2$ desorbs or is otherwise driven off. Oxides of manganese, $MnO_X$ where X ranges from about 1.5 to 2.0 are formed in the first kiln which may be heated with waste process heat from the local plant. The regenerated oxides of manganese from the first kiln may be conveyed to a second kiln heated with waste process heat. Air or oxygen are introduced into the second kiln to more completely oxidize the regenerated sorbent so that the X of $MnO_X$ ranges from about 1.5 to 2.0.

If the sorbent was $SO_X$-reacted the thermal regeneration would proceed much as described for $NO_X$, except the first kiln would be heated to a temperature at or above the thermal decomposition temperature of sulfates of manganese and $SO_2$ would desorb or otherwise driven off. With out being bound by theory, Applicants believe that nitrates of manganese thermally decompose at temperatures between about 130° C. to about 260° C., while sulfates of manganese tend to liquefy at the temperatures over which nitrates of manganese thermally decompose. Applicants further believe that sulfates of manganese heated to these temperatures in the presence of a reducing agent, e.g., CO, $H_2$, etc., will decompose to $SO_2$ and MnO. Thus, if the sorbent were reacted with both $SO_X$ and $NO_X$, $NO_2$ could be driven off first by heating reacted sorbent in a kiln to a first temperature at which nitrates of manganese thermally decompose so that $NO_2$ can be generated and directed for further processing. A reducing agent could then be introduced and the reacted sorbent further heated to desorb $SO_2$. Alternatively, the reacted sorbent could be heated to a second temperature, the thermal decomposition temperature of sulfates of manganese with $SO_2$ being desorbed and directed for further processing. The desorbed $SO_2$ can be directed to a wet scrubber containing water and an optional oxidant to form sulfuric acid. This acid liquor can then be marketed as is or further processed. This further processing would involve the addition of an ammonium or alkali hydroxide solution to form useful sulfates. In either case, the regenerated sorbent is further heated in an oxidizing atmosphere to more completely oxidize the regenerated sorbent so that the X of $MnO_X$ ranges from about 1.5 to 2.0.

Figure 27:
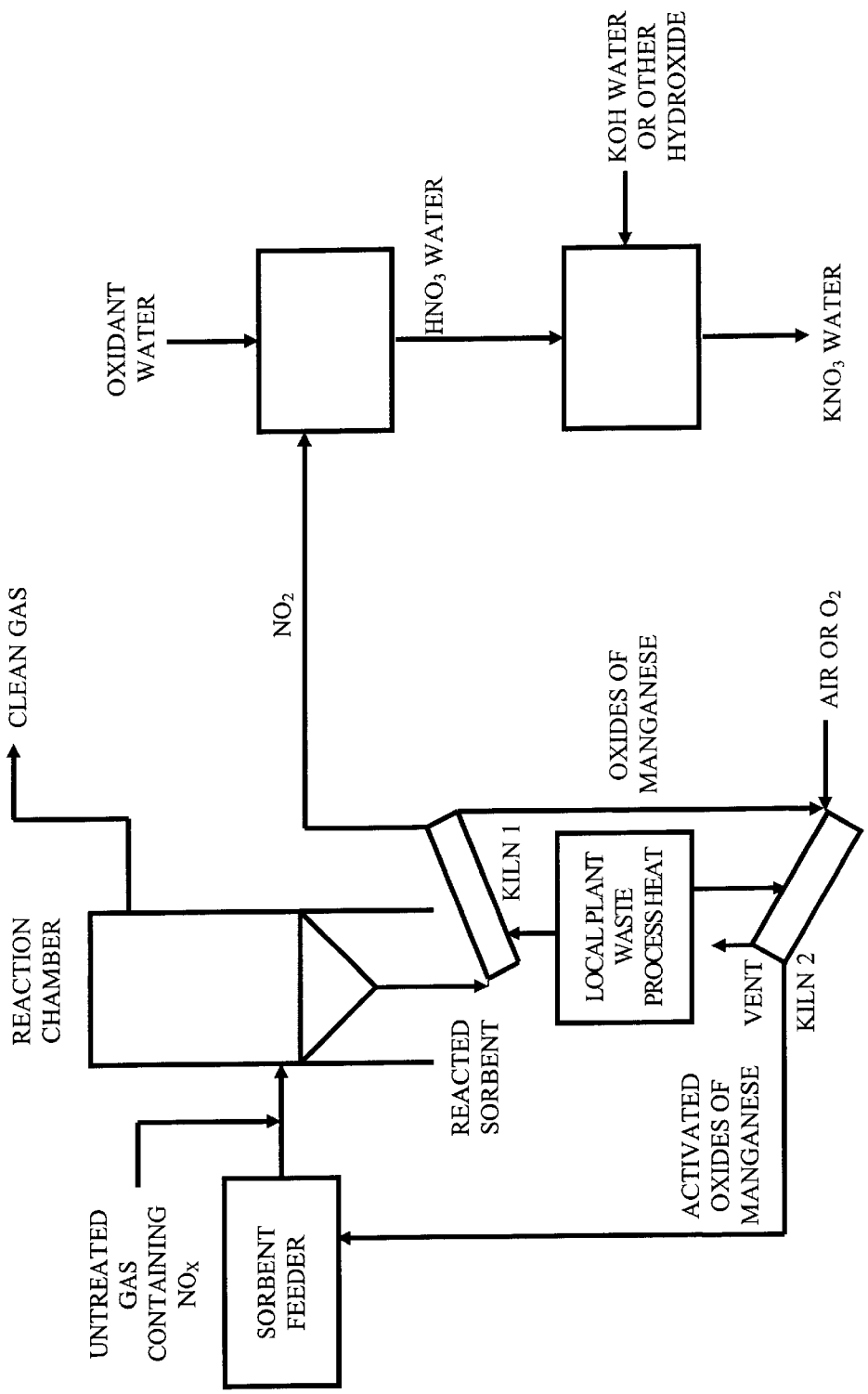
FIG. 27 is a block diagram of a system and process according to the invention.

Referring back to FIG. 27, the desorbed $NO_2$ can be directed to a wet scrubber containing water and an oxidant to form nitric acid. This acid liquor can then be marketed as is or further processed. This further processing would involve the addition of an ammonium or alkali hydroxide solution to form useful nitrates, such as KOH as illustrated in FIG. 27.

In addition to regeneration of sorbent and production of useful by-products from the sulfates and nitrates of manganese, elemental mercury can be recovered for $NO_X$, $SO_X$ reacted sorbent that further has mercury compounds adsorbed thereon can be processed to generate and recover elemental mercury. The reacted sorbent is removed from a reaction zone of a system according to the invention and conveyed to a first kiln, the reacted sorbent is heated to a first temperature to desorb $NO_2$ which is routed for further processing into marketable products. The reacted sorbent is then heated a second temperature to desorb elemental mercury which is routed to a condenser for recovery as a marketable product. The sorbent is then rinsed to wash away any ash and to dissolve sulfates of manganese into solution to form a liquor. Any ash in the liquor is separated out and the ash routed for further handling. Alkali or ammonium hydroxide is added to the liquor to form an unreacted sorbent precipitate of oxides of manganese and a liquor containing alkali or ammonium sulfates. The liquor contains rinsed sorbent. The rinsed sorbent and unreacted sorbent precipitate and are separated from the liquor and the liquor is routed for further processing into marketable products or for distribution and/or sale as a useful by-product. The rinsed sorbent and sorbent precipitate are dried to form unreacted sorbent which can then be pulverized to de-agglomerate the unreacted sorbent.

Liquid mercury can also be recovered from mercury adsorbed to alumina in an alumina reactor. The mercury-reacted alumina from the reactor is heated to drive off or desorb mercury. The mercury vapor is then directed to a condenser where it is condensed to form liquid mercury which is a marketable product.

The above examples of regeneration processes are provided by way of example and are not intended to limit the processes, both known and unknown, for regeneration of oxides of manganese and for recovery of useful and marketable by-products that may be incorporated into the processes of the invention.

The combustion of fossil fuels (e.g., coal, oil, and natural gas) liberates three major air pollutants: (1) particulates (2) sulfur dioxide ($SO_2$) and (3) oxides of nitrogen ($NO_X$). Wet scrubbing, electrostatic precipitators and bag houses can remove particulates such as fly ash. Using mechanical filters or electrostatic precipitators does not remove $SO_2$, $SO_3$, $NO_2$, $N_2O_4$, NO, or $N_2O_3$. Prior technologies have used wet scrubbing for the process as a means of sorbing $SO_X$ and $NO_X$. Water is effective as a scrubbing medium for the removal of $SO_2$; removal efficiencies can be improved by the addition of chemical absorbents such as calcium, magnesium and sodium. However, nitrogen oxide (NO) is essentially insoluble in water, even with the use of sorbtion chemicals. Residence times required and liquid-to-gas surface areas have proven to be impractical where high gas flow rates are encountered such as boiler flue gas.

Some of the economics involved in the wet scrubbing process involve high-energy consumption; on the average 4–5% of a plant gross power generation is consumed in the process. For example: (1) high differential pressure of a venturi/absorber tower requires 30" of WC or a bag house and scrubber combination requires even higher static pressures. (2) Large volumes of high pressure scrubbing liquor injected through nozzles into the scrubbing apparatus. (3) Slurry tanks requiring continual vigorous agitation. (4) High horsepower required to force water-saturated non-buoyant flue gas up the stack.

Environmental drawbacks of existing systems include large quantities of minerals used as sorbents and the insoluble sulfites or sulfate formed from the scrubbing reaction. The precipitate is then taken to landfills or holding ponds. Some other disadvantages of existing systems are fouling of the internal scrubber components with hard scale, increasing operational labor and maintenance costs. Some complex regenerative systems use large quantities of chemicals required to react with the millions of gallons of slurry used every day.

The dry scrubbing process described in this patent is effective in removing nearly all $NO_X$ and $SO_X$. Differential pressure requirements through the scrubber should typically not exceed 10 inches of water column and residence times within the sorbent cake are typically less than 1 second. Volumes of sorbent used in this invention in comparison to the wet slurry volumes are miniscule and recharging of reaction zones are done periodically. While stack gases remain dry and hot, some waste heat will be used in the drying of washed and re-generated sorbent. Operational costs of the reaction zone(s) are similar to operating an ash bag house; also capital expenditures are estimated to be reasonable requiring standard off-the-shelf equipment and instrumentation.

As a summary, the equipment is used in the dry scrubbing process is much less complex than the wet scrubber process thus requiring lower operational maintenance costs and a reduced operating staff. Chemical and raw material costs are expected to be similar with less waste effluent produced. The major cost savings will be in the reduced power consumption expected to be significantly less than that of a wet scrubbing system, with fan horsepower reduction making up the majority of the savings.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. A process for dry removal of $SO_X$ and $NO_X$ from a gas stream in a single reaction zone, comprising the steps of:
   a. providing a continuous process system having a single reaction zone for dry removal of $SO_X$ at a removal rate of at least 99% and of $NO_X$ at a removal rate of at least 96% from a gas stream in the reaction zone, the process comprising the steps of:
      i. configuring a dry sorbent-reactant feeder for controlled feed of a supply of dry sorbent-reactant of regenerable oxides of manganese and/or regenerated oxides of manganese, wherein the feeder is configured to handle and feed the dry sorbent-reactant in particle form;
      ii. connecting the reaction zone to the sorbent-reactant feeder and to a source of a gas containing $SO_X$ and $NO_X$, the reaction zone having a first portion and a second portion, the first portion being configured for introduction of the dry sorbent-reactant and the gas and the second portion being configured to receive the gas and the dry sorbent-reactant from the first portion; the reaction zone being configured to substantially strip the gas of $SO_X$ at a targeted $SO_X$ capture rate set point of at least 99% through formation of sulfates of manganese, to substantially strip the gas of $NO_X$ at a targeted $NO_X$ capture rate set point of at least 96% through formation of nitrates of manganese, and to render the gas free of the sorbent-reactant prior to the gas being vented from the reaction zone;
   b. selecting and introducing the dry sorbent-reactant into the feeder, the dry sorbent reactant being oxides of manganese selected so that upon regeneration the sorbent-reactant is in particle form and has the chemical formula $MnO_X$, where X is about 1.8 to 2.0, the oxides of manganese having a particle size ranging from about 6 microns to about 500 microns and a BET value ranging from about 135 to about 1000 m²/g;
   c. operating the system so that the dry sorbent-reactant and gas are introduced into the first portion of the reaction zone, the gas being at temperatures ranging from ambient temperature to about 350° F., and so that the gas and the dry sorbent-reactant are in contact for a time sufficient to effect $SO_X$ capture at a targeted $SO_X$ capture rate set point of at least 99% and to effect $NO_X$ capture at a targeted $NO_X$ capture rate set point of at least 96%;
   d. routing the gas and the dry sorbent-reactant into the first portion of the reaction zone and then into the second portion of the reaction zone so that the gas and the dry sorbent-reactant are in contact for a time sufficient to effect $SO_X$ capture at the targeted $SO_X$ capture rate set point of at least 99% and to effect $NO_X$ at the targeted $NO_X$ capture rate set point of at least 96%, the $SO_X$ being captured through formation of sulfates of manganese and the $NO_X$ being captured through the formation of nitrates of manganese;
   e. rendering the gas in the reaction zone free of the dry sorbent-reactant; and
   f. venting the gas from the reaction zone.

2. A process for dry removal of $SO_X$ and $NO_X$ from a gas stream in a single reaction zone, comprising the steps of:
   a. providing a continuous process system having a single reaction zone for dry removal of $SO_X$ at a removal rate of at least 99% and of $NO_X$ at a removal rate of at least 96% from a gas stream in the reaction zone, the process comprising the steps of:
      i. configuring a dry sorbent-reactant feeder for controlled feed of a supply of dry sorbent-reactant of regenerable oxides of manganese and/or regenerated oxides of manganese, wherein the feeder is configured to handle and feed the dry sorbent-reactant in particle form;
      ii. connecting the reaction zone to the sorbent-reactant feeder and to a source of a gas containing $SO_X$ and $NO_X$, the reaction zone having a first portion and a second portion, the first portion being configured for introduction of the dry sorbent-reactant and the gas and the second portion being configured to receive the gas and the dry sorbent-reactant from the first portion; the reaction zone being configured to substantially strip the gas of $SO_X$ at a targeted $SO_X$ capture rate set point of at least 99% through formation of sulfates of manganese, to substantially strip the gas of $NO_X$ at a targeted $NO_X$ capture rate set point of at least 96% through formation of nitrates of manganese, and to render the gas free of the sorbent-reactant prior to the gas being vented from the reaction zone;

b. selecting and introducing the dry sorbent-reactant into the feeder, the dry sorbent-reactant being oxides of manganese selected so that upon regeneration the sorbent-reactant is in particle form and has the chemical formula $MnO_X$, where X is about 1.5 to 2.0, the oxides of manganese having a particle size ranging from about 6 microns to about 500 microns and a BET value ranging from about 1 to about 1000 $m^2/g$;

c. operating the system so that the dry sorbent-reactant and gas are introduced into the first portion of the reaction zone, the gas being at temperatures ranging from ambient temperature to about 350° F., and so that the gas and the dry sorbent-reactant are in contact for a time sufficient to effect $SO_X$ capture at a targeted $SO_X$ capture rate set point of at least 99% and to effect $NO_X$ capture at a targeted $NO_X$ capture rate set point of at least 96%;

d. routing the gas and the dry sorbent-reactant into the first portion of the reaction zone and then into the second portion of the reaction zone so that the gas and the dry sorbent-reactant are in contact for a time sufficient to effect $SO_X$ capture at the targeted $SO_X$ capture rate set point of at least 99% and to effect $NO_X$ at the targeted $NO_X$ capture rate set point of at least 96%, the $SO_X$ being captured through formation of sulfates of manganese and the $NO_X$ being captured through the formation of nitrates of manganese;

e. rendering the gas in the reaction zone free of the dry sorbent-reactant; and f. venting the gas from the reaction zone.

3. The process of claim 1 or claim 2, wherein the targeted $NO_X$ capture rate set point is at least 97.0% and $NO_X$ is removed a capture rate of at least 97.0%.

4. The process of claim 1 or claim 2, wherein the targeted $NO_X$ capture rate set point is at least 98.0% and $NO_X$ is removed at a capture rate of at least 98.0%.

5. The process of claim 1 or claim 2, wherein the targeted $NO_X$ capture rate set point is at least 99.0% and $NO_X$ is removed at a capture rate of at least 99.0%.

6. A process for dry removal of $SO_X$ and $NO_X$ from a gas stream in a single reaction zone, comprising the steps of:

a. providing a continuous process system having a single reaction zone for dry removal of $SO_X$ at a removal rate of at least 98% and of $NO_X$ at a removal rate of at least 90% from a gas stream in the reaction zone, the process comprising the steps of:

i. configuring a dry sorbent-reactant feeder for controlled feed of a supply of dry sorbent-reactant of regenerable oxides of manganese and/or regenerated oxides of manganese, wherein the feeder is configured to handle and feed the dry sorbent-reactant in particle form;

ii. connecting the reaction zone to the sorbent-reactant feeder and to a source of a gas containing $SO_X$ and $NO_X$, the reaction zone having a first portion and a second portion, the first portion being configured for introduction of the dry sorbent-reactant and the gas and the second portion being configured to receive the gas and the dry sorbent-reactant from the first portion; the reaction zone being configured to substantially strip the gas of $SO_X$ at a targeted $SO_X$ capture rate set point of at least 99% through formation of sulfates of manganese, to substantially strip the gas of $NO_X$ at a targeted $NO_X$ capture rate set point of at least 96% through formation of nitrates of manganese, and to render the gas free of the sorbent-reactant prior to the gas being vented from the reaction zone;

b. selecting and introducing the dry sorbent-reactant into the feeder, the dry sorbent-reactant being oxides of manganese selected so that upon regeneration the sorbent-reactant is in particle form and has the chemical formula $MnO_X$, where X is about 1.5 to 2.0, the oxides of manganese having a particle size ranging from about 6 microns to about 500 microns and a BET value ranging from about 1 to about 1000 $m^2/g$;

c. operating the system so that the dry sorbent-reactant and gas are introduced into the first portion of the reaction zone, the gas being at temperatures ranging from ambient temperature to about 350° F., and so that the gas and the dry sorbent-reactant are in contact for a time sufficient to effect $SO_X$ capture at a targeted $SO_X$ capture rate set point of at least 98% and to effect $NO_X$ capture at a targeted $NO_X$ capture rate set point of at least 90%;

d. routing the gas and the dry sorbent-reactant into the first portion of the reaction zone and then into the second portion of the reaction zone so that the gas and the dry sorbent-reactant are in contact for a time sufficient to effect $SO_X$ capture at the targeted $SO_X$ capture rate set point of at least 98% and to effect $NO_X$ at the targeted $NO_X$ capture rate set point of at least 90%, the $SO_X$ being captured through formation of sulfates of manganese and the $NO_X$ being captured through the formation of nitrates of manganese;

e. rendering the gas in the reaction zone free of the dry sorbent-reactant; and f. venting the gas from the reaction zone.

7. The process of claim 6, wherein the targeted $SO_X$ capture rate set point is at least 99.0%, $SO_X$ is removed at a capture rate of at least 99.0%, the targeted $NO_X$ capture rate set point is at least 92.0% and $NO_X$ is removed at a capture rate of at least 92.0%.

8. The process of claim 6, wherein the targeted $SO_X$ capture rate set point is at least 99.0%, $SO_X$ is removed at a capture rate of at least 99.0%, the targeted $NO_X$ capture rate set point is at least 94.0% and $NO_X$ is removed at a capture rate of at least 94.0%.

9. The process of claim 6, wherein the targeted $SO_X$ capture rate set point is at least 99.0%, $SO_X$ is removed at a capture rate of at least 99.0%, the targeted $NO_X$ capture rate set point is at least 95.0% and $NO_X$ is removed at a capture rate of at least 95.0%.

10. A process for dry removal of $SO_X$ and $NO_X$ from a gas stream in a single reaction zone, comprising the steps of:

a. providing a continuous process system having a single reaction zone for dry removal of $SO_X$ at a removal rate of at least 60% and of $NO_X$ at a removal rate of at least 60% from a gas stream in the reaction zone, the process comprising the steps of:

i. configuring a dry sorbent-reactant feeder for controlled feed of a supply of dry sorbent-reactant of regenerable oxides of manganese and/or regenerated oxides of manganese, wherein the feeder is configured to handle and feed the dry sorbent-reactant in particle form;

ii. connecting the reaction zone to the sorbent-reactant feeder and to a source of a gas containing $SO_X$ and $NO_X$, the reaction zone having a first portion and a second portion, the first portion being configured for introduction of the dry sorbent-reactant and the gas and the second portion being configured to receive the gas and the dry sorbent-reactant from the first portion; the reaction zone being configured to substantially strip the gas of $SO_X$ at a targeted $SO_X$ capture rate set point of at least 60% through formation of sulfates of manganese, to substantially strip the gas of $NO_X$ at a targeted $NO_X$ capture rate set point of at least 60% through formation of nitrates of manganese, and to render the gas free of the sorbent-reactant prior to the gas being vented from the reaction zone;

b. selecting and introducing the dry sorbent-reactant into the feeder, the dry sorbent-reactant being oxides of manganese selected so that upon regeneration the sorbent-reactant is in particle form and has the chemical formula $MnO_X$, where X is about 1.5 to 2.0, the oxides of manganese having a particle size ranging from about 6 microns to about 500 microns and a BET value ranging from about 1 to about 1000 m²/g;

c. operating the system so that the dry sorbent-reactant and gas are introduced into the first portion of the reaction zone, the gas being at temperatures ranging from ambient temperature to about 350° F., and so that the gas and the dry sorbent-reactant are in contact for a time sufficient to effect $SO_X$ capture at a targeted $SO_X$ capture rate set point of at least 60% and to effect $NO_X$ capture at a targeted $NO_X$ capture rate set point of at least 60%;

d. routing the gas and the dry sorbent-reactant into the first portion of the reaction zone and then into the second portion of the reaction zone so that the gas and the dry sorbent-reactant are in contact for a time sufficient to effect $SO_X$ capture at the targeted $SO_X$ capture rate set point of at least 60% and to effect $NO_X$ at the targeted $NO_X$ capture rate set point of at least 60%, the $SO_X$ being captured through formation of sulfates of manganese and the $NO_X$ being captured through the formation of nitrates of manganese;

e. rendering the gas in the reaction zone free of the dry sorbent-reactant; and f. venting the gas from the reaction zone.

11. The process of claim 10, wherein the targeted $SO_X$ capture rate set point is at least 70.0%, $SO_X$ is removed at a capture rate of at least 70.0%, the targeted $NO_X$ capture rate set point is at least 70.0% and $NO_X$ is removed at a capture rate of at least 70.0%.

12. The process of claim 10, wherein the targeted $SO_X$ capture rate set point is at least 80.0%, $SO_X$ is removed at a capture rate of at least 80.0%, the targeted $NO_X$ capture rate set point is at least 80.0% and $NO_X$ is removed at a capture rate of at least 80.0%.

13. The process of claim 10, wherein the targeted $SO_X$ capture rate set point is at least 90.0%, $SO_X$ is removed at a capture rate of at least 90.0%, the targeted $NO_X$ capture rate set point is at least 90.0% and $NO_X$ is removed at a capture rate of at least 90.0%.

14. The process of any one of claims 1, 2, 6 or 10, wherein the process further comprises the steps of:

removing the sorbent-reactant from the reaction zone of the system;

washing the sorbent-reactant in a dilute acid rinse to dissolve sulfates and/or nitrates of manganese on the surface of sorbent-reactant particles into solution and thereby cleaning the sorbent-reactant;

separating the cleaned sorbent-reactant from the acid rinse;

conveying the cleaned sorbent-reactant to a dryer;

drying the cleaned sorbent-reactant;

conveying the cleaned sorbent-reactant to a pulverizer;

de-agglomerating and sizing the cleaned sorbent-reactant; and conveying the de-agglomerated and sized clean sorbent-reactant to the sorbent-reactant feeder for reintroduction into the system.

15. The process one of any one of claims 1, 2, 6 or 10, wherein the process further comprises the steps of:

removing the sorbent-reactant from the reaction zone of the system;

washing the sorbent-reactant in a dilute acid rinse to dissolve sulfates and/or nitrates of manganese on the surface of sorbent-reactant particles into solution and thereby cleaning the sorbent-reactant;

separating the cleaned sorbent-reactant from the acid rinse to provide a filtrate containing dissolved sulfates and/or nitrates of manganese;

adding alkali or ammonium hydroxide to the filtrate to form a sorbent-reactant precipitate of oxides and hydroxides of manganese and a liquor containing alkali or ammonium sulfates and/or nitrates;

separating the sorbent-reactant precipitate from the liquor, the liquor being routed for further processing into marketable products or for distribution and/or sale as a useful by-product;

rinsing the sorbent-reactant precipitate;

drying the sorbent-reactant precipitate to form sorbent-reactant in an oxidizing atmosphere; and de-agglomerating and sizing the sorbent-reactant; and conveying the dc-agglomerated and sized sorbent-reactant to the feeder.

16. The process of any one of claims 1, 2, 6, or 10, wherein the process further comprises the steps of:

removing sorbent-reactant from the reaction zone of the system;

heating the sorbent-reactant to a temperature ranging from about 350° F. to about 1742° F. to thermally decompose the nitrates of manganese, to desorb $NO_2$, and to regenerate sorbent-reactant;

passing the desorbed $NO_2$ through a wet scrubber containing water and an oxidant to form a nitric acid liquor;

routing the nitric acid liquor for further distribution and/or sale as a useful product or on for further processing.

17. The process of any one of claims 1, 2, 6 or 10, wherein the process further comprises the steps of:

removing sorbent-reactant from the reaction zone of the system where primarily $NO_X$ capture occurred by reacting with the sorbent to form nitrates of manganese;

heating the sorbent-reactant to a temperature ranging from about 350° F. to about 1742° F. to thermally decompose the nitrates of manganese, to desorb $NO_2$, and to regenerate sorbent-reactant;

passing the desorbed $NO_2$ through a wet scrubber containing water and an oxidant to form a nitric acid liquor;

adding an ammonium or alkali hydroxide to the acid liquor to form a liquor containing ammonium or alkali nitrates; and routing the liquor for distribution and/or sale as a useful by-product or for further processing into marketable products.

18. The process of any one of claims 1, 2, 6 or 10, wherein the process further comprises the steps of:

removing sorbent-reactant from the reaction zone of the system;

heating the sorbent-reactant to a temperature ranging from about 350° F. to about 1742° F. to desorb $NO_2$, the desorbed $NO_2$ being routed for further processing and/or handling;

heating the sorbent-reactant to a temperature above 1742° F. to desorb $SO_X$ and to regenerate the sorbent-reactant, the desorbed $SO_X$ being routed for further processing and/or handling; and routing the regenerated sorbent-reactant to the feeder.

* * * * *